US011250493B2

(12) United States Patent
Isaacson et al.

(10) Patent No.: US 11,250,493 B2
(45) Date of Patent: Feb. 15, 2022

(54) SYSTEM AND METHOD FOR PERFORMING SOCIAL MEDIA CRYPTOCURRENCY TRANSACTIONS

(71) Applicant: Monticello Enterprises LLC, Huntingtown, MD (US)

(72) Inventors: Thomas M. Isaacson, Huntingtown, MD (US); Ryan Connell Durham, Santa Clara, UT (US)

(73) Assignee: Monticello Enterprises LLC, Huntingtown, MD (US)

( * ) Notice: Subject to any disclaimer, the term of this patent is extended or adjusted under 35 U.S.C. 154(b) by 149 days.

(21) Appl. No.: 16/527,335

(22) Filed: Jul. 31, 2019

(65) Prior Publication Data
US 2019/0356641 A1 Nov. 21, 2019

Related U.S. Application Data

(63) Continuation-in-part of application No. 16/445,297, filed on Jun. 19, 2019, now Pat. No. 10,511,580, (Continued)

(51) Int. Cl.
*G06Q 30/00* (2012.01)
*G06Q 30/06* (2012.01)

(52) U.S. Cl.
CPC ..... *G06Q 30/0633* (2013.01); *G06Q 30/0625* (2013.01); *G06Q 30/0635* (2013.01); *G06Q 30/0641* (2013.01)

(58) Field of Classification Search
CPC .............. G06Q 30/00; G06Q 30/0601; G06Q 30/0625; G06Q 30/0633; G06Q 30/0635; G06Q 30/0641
See application file for complete search history.

(56) References Cited

U.S. PATENT DOCUMENTS

| 5,960,411 A | 9/1999 | Hartman |
| 6,731,788 B1 | 5/2004 | Agnihotri |

(Continued)

FOREIGN PATENT DOCUMENTS

WO WO 2012/075304 6/2012

OTHER PUBLICATIONS

Miraz, Mahdi H., and Marie Haikel-Elsabeh. "Analysis of Users' Behaviour and Adoption Trends of Social Media Payment Platforms." 2019 International Conference on Computing, Electronics & Communications Engineering (iCCECE). IEEE, 2019. (Year: 2019).*

(Continued)

*Primary Examiner* — Christopher B Seibert

(57) ABSTRACT

A method includes receiving, at a social media software module operating on a user device, input from a first user associated with a payment from the first user to a second user, wherein the social media software module provides a social media interaction which enables communication between the first user and the second user, receiving, in connection with use of the social media software module for the social media interaction, a payment authorization from the first user for the payment to the second user and initiating, from the social media software module and based on the payment authorization, a blockchain-based payment from the first user to the second user. This approach incorporates a cryptocurrency wallet into a social media application to reduce friction and enable easy payments between users of the social media application using a cryptocurrency for at least part of the transfer of value from one user to another.

8 Claims, 29 Drawing Sheets

Related U.S. Application Data which is a continuation of application No. 16/420,785, filed on May 23, 2019, now Pat. No. 10,726,472, and a continuation of application No. 16/279,685, filed on Feb. 19, 2019, now Pat. No. 10,643,266, said application No. 16/420,785 is a continuation-in-part of application No. 16/279,685, filed on Feb. 19, 2019, now Pat. No. 10,643,266, and a continuation-in-part of application No. 16/176,425, filed on Oct. 31, 2018, now Pat. No. 11,004,139, said application No. 16/279,685 is a continuation-in-part of application No. 16/126,541, filed on Sep. 10, 2018, now Pat. No. 10,832,310, which is a continuation-in-part of application No. 15/947,395, filed on Apr. 6, 2018, now Pat. No. 10,152,756, which is a continuation-in-part of application No. 15/720,878, filed on Sep. 29, 2017, now Pat. No. 10,497,037, said application No. 15/678,664 is a continuation of application No. 15/678,378, filed on Aug. 16, 2017, now Pat. No. 10,621,653, said application No. 15/270,878 is a continuation-in-part of application No. 15/678,664, filed on Aug. 16, 2017, now abandoned, said application No. 15/678,378 is a continuation-in-part of application No. 15/602,868, filed on May 23, 2017, now Pat. No. 9,922,381, said application No. 15/600,599 is a continuation of application No. 15/600,388, filed on May 19, 2017, now Pat. No. 10,504,193, said application No. 15/602,868 is a continuation of application No. 15/600,599, filed on May 19, 2017, now Pat. No. 9,922,380, said application No. 15/600,388 is a continuation-in-part of application No. 15/586,999, filed on May 4, 2017, now Pat. No. 10,121,186, which is a continuation-in-part of application No. 15/269,451, filed on Sep. 19, 2016, now Pat. No. 9,767,520, said application No. 15/720,878 is a continuation-in-part of application No. 15/263,057, filed on Sep. 12, 2016, now Pat. No. 9,824,408, said application No. 15/269,451 is a continuation of application No. 15/263,066, filed on Sep. 12, 2016, now Pat. No. 10,002,396, said application No. 15/263,057 is a continuation of application No. 15/018,954, filed on Feb. 9, 2016, now Pat. No. 9,734,526, said application No. 16/279,685 is a continuation-in-part of application No. 15/018,939, filed on Feb. 9, 2016, now Pat. No. 10,332,170, said application No. 15/263,066 is a continuation of application No. 15/018,954, filed on Feb. 9, 2016, now Pat. No. 9,734,526, said application No. 15/018,939 is a continuation of application No. 14/853,579, filed on Sep. 14, 2015, now Pat. No. 9,396,491, said application No. 15/018,954 is a continuation of application No. 14/853,579, filed on Sep. 14, 2015, now Pat. No. 9,396,491, which is a continuation of application No. 14/822,368, filed on Aug. 10, 2015, now Pat. No. 9,292,871, which is a continuation of application No. 14/672,876, filed on Mar. 30, 2015, now Pat. No. 9,361,638, which is a continuation-in-part of application No. 14/230,864, filed on Mar. 31, 2014, now Pat. No. 9,430,794.

(60) Provisional application No. 62/818,440, filed on Mar. 14, 2019, provisional application No. 62/812,153, filed on Feb. 28, 2019, provisional application No. 62/809,170, filed on Feb. 22, 2019, provisional application No. 62/725,855, filed on Aug. 31, 2018, provisional application No. 62/569,841, filed on Oct. 9, 2017, provisional application No. 62/560,261, filed on Sep. 19, 2017, provisional application No. 62/475,578, filed on Mar. 23, 2017, provisional application No. 62/450,900, filed on Jan. 26, 2017, provisional application No. 62/399,761, filed on Sep. 26, 2016, provisional application No. 61/973,287, filed on Apr. 1, 2014, provisional application No. 61/972,834, filed on Mar. 31, 2014, provisional application No. 61/972,890, filed on Mar. 31, 2014, provisional application No. 61/972,865, filed on Mar. 31, 2014, provisional application No. 61/972,878, filed on Mar. 31, 2014, provisional application No. 61/972,861, filed on Mar. 31, 2014, provisional application No. 61/972,843, filed on Mar. 31, 2014, provisional application No. 61/972,848, filed on Mar. 31, 2014, provisional application No. 61/972,892, filed on Mar. 31, 2014, provisional application No. 61/972,879, filed on Mar. 31, 2014.

(56) References Cited

U.S. PATENT DOCUMENTS

| | | | | |
|---|---|---|---|---|
| 8,375,325 | B2 | 2/2013 | Wuttke | |
| 8,458,053 | B1 | 6/2013 | Buron | |
| 8,548,872 | B1 | 10/2013 | Gupta | |
| 8,660,912 | B1 | 2/2014 | Dandekar | |
| 8,762,475 | B2 | 6/2014 | Cheung et al. | |
| 8,768,838 | B1 | 7/2014 | Hoffman | |
| 8,843,125 | B2 | 9/2014 | Kwon et al. | |
| 8,977,554 | B1* | 3/2015 | Hertschuh | G10L 15/26 704/270 |
| 9,022,286 | B2 | 5/2015 | Wyatt | |
| 9,137,576 | B2 | 9/2015 | McRae | |
| 9,182,243 | B2 | 11/2015 | Van Os | |
| 9,224,083 | B2 | 12/2015 | Wyatt | |
| 9,224,167 | B2* | 12/2015 | Lampert | G06Q 30/0633 |
| 9,418,672 | B2 | 8/2016 | Pylappan | |
| 9,430,765 | B2 | 8/2016 | Wyatt | |
| 9,443,017 | B2 | 9/2016 | Borisovich | |
| 9,536,238 | B2 | 1/2017 | Garrett et al. | |
| 9,613,160 | B2* | 4/2017 | Houle | G06F 16/9577 |
| 9,760,884 | B2 | 9/2017 | Wyatt | |
| 10,013,693 | B2 | 7/2018 | Wyatt | |
| 10,339,520 | B2 | 7/2019 | Wyatt | |
| 10,628,820 | B2 | 4/2020 | Wyatt | |
| 2004/0103197 | A1 | 5/2004 | Benson | |
| 2004/0254891 | A1 | 12/2004 | Blinn | |
| 2006/0041485 | A1 | 2/2006 | Tarvydas | |
| 2006/0143094 | A1 | 6/2006 | Kohout | |
| 2006/0224973 | A1* | 10/2006 | Albrecht | G06F 9/451 715/760 |
| 2007/0050406 | A1 | 3/2007 | Byers | |
| 2007/0106570 | A1 | 5/2007 | Hartman et al. | |
| 2007/0112647 | A1* | 5/2007 | Borders | G06Q 30/0633 705/7.35 |
| 2007/0294240 | A1 | 12/2007 | Steele | |
| 2008/0167946 | A1 | 7/2008 | Bezos | |
| 2008/0201304 | A1 | 8/2008 | Sue | |
| 2008/0244721 | A1* | 10/2008 | Barrus | G06F 21/6254 726/9 |
| 2009/0037291 | A1 | 2/2009 | Dawson et al. | |
| 2009/0089260 | A1 | 4/2009 | Chong | |
| 2009/0132347 | A1* | 5/2009 | Anderson | G06Q 30/02 705/14.52 |
| 2009/0157479 | A1* | 6/2009 | Caldwell | G06Q 30/0601 705/14.54 |
| 2009/0235196 | A1 | 9/2009 | MacBeth | |
| 2009/0271735 | A1 | 10/2009 | Anderson | |
| 2009/0300476 | A1 | 12/2009 | Vogel et al. | |
| 2010/0114654 | A1 | 5/2010 | Lukose et al. | |
| 2010/0280909 | A1 | 11/2010 | Zhang | |
| 2010/0309512 | A1 | 12/2010 | Onoda | |

(56) References Cited

U.S. PATENT DOCUMENTS

| | | |
|---|---|---|
| 2011/0282785 A1 | 11/2011 | Chin |
| 2012/0136756 A1 | 5/2012 | Jitkoff et al. |
| 2012/0191569 A1* | 7/2012 | Shah ............... G06Q 20/405 705/26.41 |
| 2012/0203776 A1 | 8/2012 | Nissan |
| 2012/0221437 A1* | 8/2012 | Yoo ................ G06Q 20/384 705/26.41 |
| 2012/0233020 A1 | 9/2012 | Eberstadt |
| 2012/0233170 A1 | 9/2012 | Musgrove et al. |
| 2012/0310738 A1* | 12/2012 | Mesaros ........... G06Q 30/0222 705/14.57 |
| 2013/0013427 A1 | 1/2013 | Gonsalves et al. |
| 2013/0066987 A1* | 3/2013 | Levinson ............ H04L 51/04 709/206 |
| 2013/0066988 A1* | 3/2013 | Levinson ........... G06Q 10/107 709/206 |
| 2013/0076788 A1* | 3/2013 | Ben Zvi ............ G06F 16/951 345/633 |
| 2013/0290149 A1* | 10/2013 | Rashwan ........... G06Q 30/0641 705/27.1 |
| 2013/0307765 A1 | 11/2013 | Li |
| 2013/0325980 A1* | 12/2013 | Ohayon ............ H04L 51/066 709/206 |
| 2013/0339229 A1* | 12/2013 | Li ..................... H04L 12/1403 705/40 |
| 2013/0345959 A1 | 12/2013 | Van Os |
| 2014/0019367 A1* | 1/2014 | Khan ................ G06Q 20/425 705/75 |
| 2014/0025521 A1 | 1/2014 | Alsina |
| 2014/0095583 A1* | 4/2014 | Houle .............. G06F 16/9577 709/203 |
| 2014/0136334 A1* | 5/2014 | Lagassey ........... G06Q 30/0273 705/14.66 |
| 2014/0136990 A1 | 5/2014 | Gonnen |
| 2014/0207462 A1 | 7/2014 | Bangalore |
| 2014/0229339 A1 | 8/2014 | Massiere |
| 2014/0249968 A1 | 9/2014 | MacKinnon Keith |
| 2014/0279266 A1* | 9/2014 | Lampert ........... G06Q 30/0629 705/26.64 |
| 2014/0297362 A1 | 10/2014 | Kumar |
| 2014/0297537 A1 | 10/2014 | Kassemi |
| 2015/0052061 A1 | 2/2015 | Anderson |
| 2015/0059191 A1 | 2/2015 | Khan et al. |
| 2015/0088655 A1* | 3/2015 | Taylor .............. G06Q 30/0264 705/14.61 |
| 2015/0088686 A1 | 3/2015 | Glassberg |
| 2015/0095238 A1 | 4/2015 | Khan et al. |
| 2015/0142640 A1* | 5/2015 | Kneen .............. G06Q 20/12 705/39 |
| 2015/0149168 A1 | 5/2015 | Stent |
| 2015/0317698 A1 | 11/2015 | Kalyvas |
| 2015/0324789 A1 | 11/2015 | Dvorak |
| 2015/0348017 A1* | 12/2015 | Allmen ............ G06Q 20/401 705/76 |
| 2021/0241256 A1* | 8/2021 | Caldwell ............ G06Q 20/3224 |

OTHER PUBLICATIONS

Google Wallet: Shopping Safe and Sound, Aug. 21, 2012 https://www.youtube.com/watch?v=yLHW7suDVDI.

What is ISIS? Jan. 23, 2014 https://www.nerdwallet.com/blog/credit-cards/isis/.

Meng, Jian, and Liang Ye, "Secure mobile payment model based on WAP." 2008 4th International Conference on Wireless Communications, Networking and Mobile Computing, IEEE, 2008.

Hong, Feng, et al., "Waving authentication: your smartphone authenticate you on motion gesture," Proceedings of the 33rd Annual ACM Conference Extended Abstracts on Human Factors in Computing Systems, 2015.

U.S. Appl. No. 61/884,926, filed Sep. 30, 2013, Khan et al.
U.S. Appl. No. 61/989,107, filed May 6, 2014, Khan et al.
U.S. Appl. No. 62/002,721, filed May 23, 2014, Khan et al.
U.S. Appl. No. 62/004,182, filed May 28, 2014, Khan et al.

www.travelocity.com, [online], Mar. 21, 2012 [retrieved from archive.org on Aug. 26, 2014].

www.tripadvisor.com, [online], Mar. 15, 2012 [retrieved from archive.org on Aug. 26, 2014].

Van den Poel, D. and W. Buckinx, "Predicting online-purchasing behavior," Jul. 28, 2004 [online]. European Journal of Operational Research 166 pp. 557-575. Retrieved from www.sciencedirect.com.

Hudaib, Adam Ali Zare. "E-payment Security Analysis in Depth." International Journal of Computer Science and Security (IJCSS) 8.1 (2014): 14. (Year: 2014).

Luttge, Karsten, "E-charging api: outsource charging to a payment service provider", Intelligent Network Workshop, 2001, IEEE. (Year: 2001).

Kraft, Ben; Mannes, Eric; and Moldow, Jorday, "Security research of a social payment app.", 2014 (Year 2014).

Constantinides, Efthymios. "Foundations of social media marketing." Procedia-Social and behavioral sciences 148 (2014): 40-57, (Year: 2014).

Malaga, Ross A. "Search engine optimization—black and white hat approaches." Advances in Computers, vol. 78, Elsevier, 2010, 1-29. (Year: 2010).

Naylor, Rebecca Walker, Cait Poynor Lamberton, and Patricia M. West. "Beyond the "like" button: The impact of mere virtual presence on band evaluations and purchase intentions in social media settings." Journal of Marketing, 76.6, (2012): 105-120. (Year: 2012).

Lopes, Christian T., et al., "Cytoscape Web: an interactive web-based network browser," Bioinformatics—Applications Note, vol. 26, No. 18, pp. 2347-2348, 2010.

Dogru, Tarik, et al., "Blockchain Technology & it Implications for the Hospitality Industry," Boston University, Winter 2018.

Miraz, Mahdi H., et al., "Analysis of Users' Behaviour and Adoption Trends of Social Media Payment Platforms," 2019 International Conference on Computing, Electronics & Communications Engineering (iCCECE), IEEE, 2019.

\* cited by examiner

SYSTEM AND METHOD FOR PERFORMING SOCIAL MEDIA CRYPTOCURRENCY TRANSACTIONS

PRIORITY CLAIM

This application is a continuation-in-part of U.S. patent application Ser. No. 16/445,297, filed Jun. 19, 2019, which is a continuation of U.S. patent application Ser. No. 16/279,685, filed Feb. 19, 2019, which is a continuation-in-part of U.S. patent application Ser. No. 16/126,541, filed Sep. 10, 2018, which is a continuation-in-part of U.S. patent application Ser. No. 15/947,395, filed Apr. 6, 2018, which is a continuation-in-part of U.S. patent application Ser. No. 15/720,878, filed Sep. 29, 2017, which is a continuation-in-part of U.S. patent application Ser. No. 15/678,664, filed Aug. 16, 2017, which is a continuation of U.S. patent application Ser. No. 15/678,378, filed Aug. 16, 2017, which is a continuation-in-part of U.S. Nonprovisional patent application Ser. No. 15/602,868, filed May 23, 2017, which is a continuation of U.S. Nonprovisional patent application Ser. No. 15/600,599, filed May 19, 2017, which is a continuation of U.S. Nonprovisional patent application Ser. No. 15/600,388, filed May 19, 2017, which is a continuation-in-part of U.S. Nonprovisional patent application Ser. No. 15/586,999, filed May 4, 2017, which is a continuation-in-part of U.S. Nonprovisional patent application Ser. No. 15/269,451, filed Sep. 19, 2016, which is a continuation of U.S. Nonprovisional patent application Ser. No. 15/263,066, filed Sep. 12, 2016, which is a continuation of U.S. Nonprovisional patent application Ser. No. 15/018,954, filed Feb. 9, 2016, which is a continuation of U.S. Nonprovisional patent application Ser. No. 14/853,579, filed Sep. 14, 2015, now U.S. Pat. No. 9,396,491, Issued on Jul. 19, 2016, which is a continuation of U.S. Nonprovisional patent application Ser. No. 14/822,368, filed Aug. 10, 2015, now U.S. Pat. No. 9,292,871, Issued on Mar. 22, 2016, which is a continuation of U.S. Nonprovisional patent application Ser. No. 14/672,876, filed Mar. 30, 2015, now U.S. Pat. No. 9,361,638, Issued on Jun. 7, 2016, which claims priority to U.S. Provisional patent application Ser. No. 61/973,287, filed Apr. 1, 2014 and also is a continuation-in-part of U.S. Nonprovisional patent application Ser. No. 14/230,864, filed 31 Mar. 2014, now U.S. Pat. No. 9,430,794, Issued on Aug. 30, 2016, and also claims priority to U.S. Provisional Patent Application No. 61/972,843, filed Mar. 31, 2014, U.S. Provisional Patent Application No. 61/972,834, filed Mar. 31, 2014, U.S. Provisional Patent Application No. 61/972,848, filed Mar. 31, 2014, U.S. Provisional Patent Application No. 61/972,865, filed Mar. 31, 2014, U.S. Provisional Patent Application No. 61/972,879, filed Mar. 31, 2014, U.S. Provisional Patent Application No. 61/972,861, filed Mar. 31, 2014, U.S. Provisional Patent Application No. 61/972,878, filed Mar. 31, 2014, U.S. Provisional Patent Application No. 61/972,892, filed Mar. 31, 2014, U.S. Provisional Patent Application No. 61/972,890, filed Mar. 31, 2014, the contents of each of which are herein incorporated by reference in their entireties.

This application is a continuation-in-part of U.S. patent application Ser. No. 16/445,297, filed Jun. 19, 2019, which is a continuation of U.S. patent application Ser. No. 16/279,685, filed Feb. 19, 2019, which is a continuation-in-part of U.S. patent application Ser. No. 16/126,541, filed Sep. 10, 2018, which is a continuation-in-part of U.S. patent application Ser. No. 15/947,395, filed Apr. 6, 2018, which is a continuation-in-part of U.S. patent application Ser. No. 15/720,878, filed Sep. 29, 2017, which is continuation-in-part of U.S. patent application Ser. No. 15/678,664, filed Aug. 16, 2017, which claims priority to U.S. Provisional Patent Application No. 62/475,578, filed Mar. 23, 2017, U.S. Provisional Patent Application No. 62/450,900, filed Jan. 26, 2017, U.S. Provisional Patent Application No. 62/399,761, filed Sep. 26, 2016, the contents of each of which are herein incorporated by reference in their entireties.

This application is a continuation-in-part of U.S. patent application Ser. No. 16/445,297, filed Jun. 19, 2019, which is a continuation of U.S. patent application Ser. No. 16/279,685, filed Feb. 19, 2019, which is a continuation-in-part of U.S. patent application Ser. No. 16/126,541, filed Sep. 10, 2018, which is a continuation-in-part of U.S. patent application Ser. No. 15/947,395, filed Apr. 6, 2018, which is a continuation-in-part of U.S. patent application Ser. No. 15/720,878, filed Sep. 29, 2017, which claims the benefit of U.S. Provisional Patent Application No. 62/560,261, filed Sep. 19, 2017, the contents of which are herein incorporated by reference in their entireties.

This application is a continuation-in-part of U.S. patent application Ser. No. 16/445,297, filed Jun. 19, 2019, which is a continuation of U.S. patent application Ser. No. 16/279,685, filed Feb. 19, 2019, which is a continuation-in-part of U.S. patent application Ser. No. 16/126,541, filed Sep. 10, 2018, which claims priority to U.S. Provisional Patent Application No. 62/569,841, filed Oct. 9, 2017, the contents of which are herein incorporated by reference in their entireties.

This application is a continuation-in-part of U.S. patent application Ser. No. 16/445,297, filed Jun. 19, 2019, which is a continuation of U.S. patent application Ser. No. 16/279,685, filed Feb. 19, 2019, which is a continuation-in-part of U.S. patent application Ser. No. 15/018,939, filed Feb. 9, 2016, which is a continuation of U.S. patent application Ser. No. 14/853,579, Sep. 14, 2015, now U.S. Pat. No. 9,396,491, issued Jul. 19, 2016, the contents of each of which are incorporated herein by reference in their entirety.

This application is a continuation-in-part of U.S. patent application Ser. No. 16/445,297, filed Jun. 19, 2019, which is a continuation of U.S. patent application Ser. No. 16/420,785, filed May 23, 2019, which is a continuation-in-part of U.S. patent application Ser. No. 16/176,425, filed Oct. 31, 2018, which claims the benefit of U.S. Patent Provisional Application No. 62/725,855, filed Aug. 31, 2018, the contents of which are incorporated herein by reference in their entirety.

This application is a continuation-in-part of U.S. patent application Ser. No. 16/445,297, filed Jun. 19, 2019, which is a continuation of U.S. patent application Ser. No. 16/420,785, filed May 23, 2019, which is a continuation-in-part of U.S. patent application Ser. No. 16/279,685, filed Feb. 19, 2019, and also claims the benefit of U.S. Provisional Application No. 62/809,170, filed Feb. 22, 2019, U.S. Provisional Application No. 62/812,153, filed Feb. 28, 2019, and U.S. Provisional Application No. 62/818,440, filed Mar. 14, 2019, the contents of which are herein incorporated by reference in their entireties.

RELATED APPLICATIONS

This application is related to U.S. Nonprovisional patent application Ser. No. 14/853,545, filed Sep. 14, 2015, now U.S. Pat. No. 9,373,138, Issued on Jun. 21, 2016, U.S. Nonprovisional patent application Ser. No. 15/018,432, filed Feb. 8, 2016, now U.S. Pat. No. 9,449,338, Issued on Sep. 20, 2016, U.S. Nonprovisional patent application Ser. No. 15/018,457, filed Feb. 8, 2016, now U.S. Pat. No. 9,466,081, Issued on Oct. 11, 2016, U.S. Nonprovisional patent application Ser. No. 15/018,497, filed Feb. 8, 2016, now U.S. Pat. No. 9,436,957, Issued on Sep. 6, 2016, U.S. Nonprovisional patent application Ser. No. 15/018,514, filed Feb. 8, 2016, now U.S. Pat. No. 9,524,519, Issued on Dec. 20, 2016, U.S. Nonprovisional patent application Ser. No. 15/018,934, filed Feb. 9, 2016, U.S. Nonprovisional patent application Ser. No. 15/018,923, filed Feb. 9, 2016, now U.S. Pat. No. 9,430,790, Issued on Aug. 30, 2016, and U.S. Nonprovisional patent application Ser. No. 15/018,939, filed Feb. 9, 2016, the contents of each of which are incorporated herein by reference in their entirety.

BACKGROUND

1. Technical Field

The present disclosure relates to various examples of providing social media payments including cryptocurrency payments within a social media entity or social media environment. The social media environment can be an application having a cryptocurrency wallet integrated therein or a social media website that coordinates with a cryptocurrency wallet to easily enable payments using a cryptocurrency at least in part of the process.

2. Introduction

Making payments from an individual to another individual or company has not been easy in many contexts. There are only a few scenarios in which making a payment has been properly simplified. In the context of the Amazon.com environment, once a user identifies a product they would like to purchase, Amazon.com has stored the payment information and delivery information such that the user can easily make the purchase and have the product delivered. Generally, the Amazon purchasing processes have been called "one-click" because the user can achieve a payment and initiate a delivery process with the single click on the Amazon.com site.

Outside of Amazon.com, the payment processes have been fractured and often difficult which leads to reduced conversions. This is particularly true in the context of bitcoin and cryptocurrency payments which are complicated to achieve. Cross-border money transactions are also complicated and expensive, particularly for individuals who are not banked in many parts of the world.

SUMMARY

The present disclosure provides a number of innovations to address the various issues as set forth above. The solutions disclosed herein will provide a streamlined and consistent approach to the payment process in a purchasing transaction that makes the process for any website or application similar to an Amazon.com-type one-click (or greatly reduced number of interactions) process. The main solutions disclosed herein relate to a new cryptocurrency payment approach within social media applications or entities and can include a new payment request API between a site and a browser which acts as an agent to manage the payment process. Another API is the payment handler API which can be used to communicate between the browser and a web-based payment service such as PayPal or a cryptocurrency. The focus of this application will be on how these APIs will work in the context of cryptocurrencies. Similar APIs can also be deployed between applications downloaded on a device and a software module such as a software toolkit which includes the API functionality and enables applications to make API calls according to the protocol and easily implement payments.

A first aspect addresses a method including receiving, at a social media software module operating on a user device, input from a first user associated with a payment from the first user to a second user, wherein the social media software module provides a social media interaction which enables communication between the first user and the second user, receiving, in connection with use of the social media software module for the social media interaction, a payment authorization from the first user for the payment to the second user and initiating, from the social media software module and based on the payment authorization, a blockchain-based payment from the first user to the second user. This approach incorporates a cryptocurrency wallet into a social media application to reduce friction and enable easy payments between users of the social media application using a cryptocurrency for at least part of the transfer of value from one user to another. The cryptocurrency could be used as a bridge currency as well such that the first user could pay in a first fiat currency, and exchanges (like Binance or CoinBase) could be used to convert to the cryptocurrency, and then back into a second fiat currency for the second user. The social media entity could manage these exchanges so that it is simple for the users. Users could request through an interaction with an object presented by the social media entity to receive a value or a payment in a certain format such as yen, dollars, bitcoin, airline points, etc., and the social media entity could manage the use of an exchange in the background to convert the value from the giver or payer to the desired type of value or currency and then transfer the value to the recipient.

Another aspect includes a method from the standpoint of the social media entity. The method includes receiving a social media application and identification of a first user and a second user, wherein the social media application includes an integrated cryptocurrency wallet which enables a transfer of a value from the first user to the second user utilizing a blockchain-based system in which a distributed consensus protocol operating on a plurality of distributed compute nodes updates a distributed ledger when transactions occur and in which multiple copies of the distributed ledger exist across the plurality of distributed compute nodes. The method can include receiving a confirmation from the first user of a payment of an amount of currency to the second user within the social media application and, based on the confirmation, initiating a transaction which results in the payment from the first user to the second user of the amount of the currency which is recorded on the blockchain-based system in which the transaction is added to a block in the blockchain-base system according to the distributed consensus protocol.

Another aspect can be from the standpoint of a recipient of a payment through a social media application. A method includes engaging, by a first user, in a social media interaction with a second user using a social media application, receiving a confirmation of an authorized payment within the social media application of a blockchain-based payment from the second user to the first user, wherein the social media application includes an integrated cryptocurrency wallet which enables a transfer of a value from the second user to the first user utilizing a blockchain-based system in which a distributed consensus protocol operating on a plurality of distributed compute nodes updates a distributed ledger when transactions occur and in which multiple copies of the distributed ledger exist across the plurality of distributed compute nodes. The method can include receiving, as managed by the social media application, the blockchain-based payment at a first wallet associated with the first user from a second wallet associated with the second user. Again, the wallets could be built into or integrated into the social media application.

Another aspect is discussed from the standpoint of a device or a browser that has been programmed with an application programming interface to present a payment experience for a user that is similar to an Amazon one-click purchasing experience, without the need of manually entering in payment information including cryptocurrency data into a cryptocurrency wallet. A method includes receiving, from a site, at a browser and via an application programming interface that defines a protocol for communicating data between the site and the browser, a request associated with a potential purchase, wherein the request includes an identification of a cryptocurrency payment method accepted by the site, transmitting, to the site, from the browser and via the application programming interface, data indicating that a user of the browser can pay for the potential purchase via the cryptocurrency payment method accepted by the site and receiving, via a user interface associated with the application programming interface, a confirmation from the user to process the potential purchase using the cryptocurrency payment method. The API can also be part of a toolkit on a device that is configured to interact via use of the API with an application on the device.

The method further includes receiving, based on the confirmation from the user and via the application programming interface, cryptocurrency payment information for the potential purchase and populating a cryptocurrency wallet with the cryptocurrency payment information to enable the cryptocurrency wallet to make a payment. Other steps can include initiating, via the application programming interface, the cryptocurrency wallet.

The browser or software module, acting as an agent between the cryptocurrency or wallet, the user, and the merchant site or application such that it's programming as well as the programming of the site/application and the programming of the cryptocurrency wallet are modified so as to enable automatic or automated initiation and population of data fields and initiation of a cryptocurrency transaction. The cryptocurrency payment information can include at least one of a site address for receiving the payment, a private key of a buyer, a public key of a recipient, an email address, recipient identification information, a payment amount, and/or a user comment. Any other data necessary can be included for initiating the payment, the recipient cryptocurrency or wallet for receiving the payment. The browser or software module can act as the agent between any entity or wallet necessary to achieve a cryptocurrency payment. For example, having received the confirmation from the user via an application programming interface, the browser or software module can receive, via the API, the recipient wallet identification data, the cryptocurrency amount, and can initiate a buyer cryptocurrency wallet. The browser or software module can utilize that data to populate the necessary fields of the buyer cryptocurrency or wallet and initiate a transaction on a Blockchain, which is a vast public ledger for recording cryptocurrency transactions. Depending on the type of wallets used in the transaction, API can also communicate with the site which can initiate the recipient cryptocurrency wallet and, if necessary, interact with the recipient cryptocurrency wallet to receive the payment. If necessary, a transaction identification can be utilized to coordinate the transfer of cryptocurrency.

It is noted that as used herein, one aspect relates to a browser for websites or a software module for applications and these terms can be generally used such that references to a browser can also apply to a software module applicable to coordination with applications, and the opposite is possible as well.

The cryptocurrency wallet can include at least one of stored locally on a device that is running the browser and web-based. The basic interactions disclosed herein will essentially be the same whether the wallet is stored locally, integrated into an application or is web-based. When the cryptocurrency wallet is web-based, the method can further include transmitting the cryptocurrency payment information to the cryptocurrency wallet via an application programming interface for processing the payment. This can be the payment handler API, or any other API. The request can identify a supported payment method used by the site in addition to the cryptocurrency payment method. For example, the request may indicate that the site accepts Bitcoin, Visa and Apple Pay.

Another aspect can include transmitting, from the site, to a browser and via a payment request application programming interface that defines a protocol for communicating data between the site and the browser, a request associated with a potential purchase, wherein the request includes an identification of a cryptocurrency payment method accepted by the site, receiving, at the site, from the browser and via the payment request application programming interface, data indicating that a user of the browser can pay for the potential purchase via the cryptocurrency payment method accepted by the site and transmitting, based on a confirmation from the user to process the potential purchase using the cryptocurrency payment method and via the payment request application programming interface, cryptocurrency payment information for use in populating a cryptocurrency wallet for initiating a purchase from the site. Again, the site can be an application and the browser can be a software module operating to coordinate with application.

Receiving the cryptocurrency payment information further can include receiving a cryptocurrency payment at a site cryptocurrency wallet from the cryptocurrency wallet. The cryptocurrency payment information can include at least one of data that identifies the site cryptocurrency wallet and an amount.

When the cryptocurrency payment method is selected by a user for a purchase, programming of the system or the method can perform an additional step of generating a blended user interface via the payment request application programming interface which blends a payment interaction interface and a cryptocurrency wallet interface for use by the user to confirm the payment.

Another aspect relates to a method including receiving, from a site, at a browser and via an application programming interface that defines a protocol for communicating data between the site and the browser, a request associated with a potential purchase, wherein the request includes an identification of a cryptocurrency payment method accepted by the site and transmitting, to the site, from the browser and via the application programming interface, data indicating that a user of the browser can pay for the potential purchase via the cryptocurrency payment method accepted by the site. This is a "canmakepayment" exchange in which the site and the browser determine the overlap between payment methods. In this example, a cryptocurrency is common to both the site and the browser/user. The method includes receiving, via a user interface associated with the application programming interface, a confirmation from the user to process the potential purchase using the cryptocurrency payment method and retrieving, based on the confirmation from the user and via the payment request application programming interface, cryptocurrency payment information for the potential purchase. The retrieving can involve gathering the input to the transaction which can include the buyer's private key, data about the address of the person who transferred the cryptocurrency to the buyer, the seller's public key, a password and/or any other data for processing the cryptocurrency transaction. The cryptocurrency wallet can be local to the device, integrated into an application or web-based. Such wallets in one aspect are registered with the browser, like any other payment method, such that they are usable and the necessary data for the transaction can be provided to the browser as the agent managing the transaction. The method includes, in one aspect, transmitting from the browser and via the application programming interface, the cryptocurrency payment information. A software module can be used in place of the browser for use in applications. In some cases, the processing and communication can also be within an application where a wallet is integrated within the application, such as a social media application.

The request can further be associated with a user-initiated action indicating an intent by a user to make a purchase. Transmitting the cryptocurrency payment information to the site can enable the site to process a purchase or confirms to the site that a payment service processed the purchase. In this scenario, a web-based cryptocurrency wallet for the user may have provided the input data for the transaction on the blockchain outside of the payment request API.

The request can identify a supported payment method used by the site, such as Visa and Apple Pay, for example, in addition to the cryptocurrency payment method. The cryptocurrency payment information can include a private key that identifies a user cryptocurrency wallet. The wallet can be of any type and can be local or web-based, for example the wallet can be stored on a device operating the browser or a web-based device separate from the device operating the browser. The wallet can be integrated into an application as well.

Transmitting the cryptocurrency payment information further can include transmitting a message signed with a private key to a cryptocurrency network for verification. The message further can include an amount of cryptocurrency and a site address for receiving the amount of cryptocurrency. The amount can be obtained through data transmitted through the payment request API. In some cases, a conversion from dollars to bitcoin, for example, (or other cryptocurrency) may be necessary by the site or a third party.

The message can further include a record of a cryptocurrency address used to send cryptocurrency to the user cryptocurrency wallet. The cryptocurrency payment information can be stored at the browser, accessed by the browser from a separate entity, or delivered to the site from a third party as instructed by the browser or software module.

In another aspect, the method can include processing from the site standpoint and include transmitting, from a site, to a browser and via an application programming interface that defines a protocol for communicating data between the site and the browser, a request associated with a potential purchase, wherein the request includes an identification of a cryptocurrency payment method accepted by the site and receiving, at the site, from the browser and via the application programming interface, data indicating that a user of the browser can pay for the potential purchase via the cryptocurrency payment method accepted by the site. The method can further include transmitting, based on a confirmation from the user to process the potential purchase using the cryptocurrency payment method and via the application programming interface, cryptocurrency payment information for the potential purchase. Receiving the cryptocurrency payment information further can include receiving a cryptocurrency payment at a site cryptocurrency wallet from a user cryptocurrency wallet. The cryptocurrency payment information can include a private key that identifies a user cryptocurrency wallet. The user cryptocurrency wallet can also be stored on one of a device operating the browser, integrated into an application, or a web-based device separate from the device operating the browser.

One solution disclosed herein focuses on how users can choose from among a number of different payment methods when making a purchase. Users often have different accounts, credit cards, debit cards, cryptocurrencies, Paypal or other web-based payment applications. This solution focuses on how to manage multiple payment accounts in an API context. The method includes, in this aspect, receiving, at a browser and via an application programming interface that defines a protocol for communicating information about purchases between a site and the browser, a payment request having data associated with a purchase of a product from the site for a user, presenting via the browser or a browser interface, a choice between a first payment method and a second payment method for purchasing the product, wherein the first payment method and the second payment method each include or require one of payment data stored on a user device, payment data stored on a network server, and a payment service. It includes receiving a selection of a payment method from the user of one of the first payment method and the second payment method to yield a selected payment method and, based on the selected payment method, and in response to the payment request, transmitting, from the browser and via the application programming interface, data associated with the selected payment method to the site. This method is from the standpoint of the browser. The concept can also be covered from the standpoint of the merchant site as well as from the standpoint of a payment processor. Again, this approach can also work for an application and a software module communicating via an API or a wallet built into an application such as a social media application.

Another solution relates to a credential management application programming interface which enables a site to request via the API user login credentials from either a browser or a network-based entity for simplifying the login process for the user. A method in this regard includes receiving, from a site, at a browser and via a browser credential management application programming interface that defines a protocol for communicating data between the site and the browser for enabling a user to login to the site, a request associated with a login credential required for the site, retrieving, based on the request, user data (from the browser and/or from a network entity) and transmitting, to the site, from the browser and via the browser credential management application programming interface, a response to the request. The response can include login credentials for the user, such as one or more of a username, a password, a code, a biometric such as a fingerprint, iris scan, or facial recognition, or any combination of this data which can enable the site to log the user in without the user needing to manually type in or enter such data. Examples of this credential management API can be from the standpoint of the browser, from the standpoint of the site, or the standpoint of a network entity which stores the user data. One or more APIs could also be used in combination to ultimately achieve the passing of login credentials to the site via an API. Logging in can relate to logging into a cryptocurrency wallet or needing to log in to sign a message that will transfer cryptocurrency.

Another solution disclosed herein relates to how to manage a payment process with a payment processor through multiple application programming interfaces with the browser. A method in this regard includes receiving input from a user indicating a desire to purchase a product from a merchant site (the input can be a click, voice input as part of a dialog, virtual reality input, or any kind of input) and receiving, based on the input, at a browser and via a first application programming interface that defines a first protocol between the browser and the merchant site, a payment request from the merchant site for payment data of the user for purchasing the product.

In response to the payment request, the method includes communicating, from the browser and via a second application programming interface that defines a second protocol for communicating payment information between the browser and a payment service, a payment request event to the payment service, wherein the payment service can process a payment for the product based on the payment request event. The method includes receiving, at the browser and from the payment service and via the second application programming interface, a confirmation of the payment for the product and communicating, from the browser and via the first application programming interface to the merchant site, the confirmation of the payment for the product. The payment service can be a service like Paypal, a cryptocurrency or the like. The approach enables a common interface between the merchant and a payment service utilizing the browser and several APIs in a new manner.

The first application programming interface can define the first protocol for communicating at least one of payment data and address data between the browser and the merchant site. The second application programming interface can include the second protocol for communicating data associated with payment of the product between the browser and the payment service. The payment request further can include a request for an address of the user. Thus, the payment could be performed by the payment service provider and the address could be provided by the browser through the first API.

The method can further include, based on the payment request, transmitting from the browser and through the first application programming interface, the address of the user to the merchant site for use in delivering the product to the user. The first application programming interface can include a payment request application programming interface in that it involves a request from the merchant site for payment data and/or other data about the user. The second application programming interface can be called a payment handler application programming interface in that it more specifically involves payment handling by the payment processor. This aspect of the disclosure can also have examples from the standpoint of the merchant as well as from the standpoint of the payment processor. The browser of course can be a software module and the site can be an application operating on a device.

Another solution disclosed herein relates to how to provide a product purchasing experience within a spoken dialog. An example method in this regard includes receiving, via a messenger application and as part of a dialog between a merchant site (or a person in the dialog) and a user, a spoken input from the user, presenting user text associated with the spoken input in the messenger application, responding, as part of the dialog and by the merchant site, to the spoken input with a spoken response, presenting response text associated with the spoken response in the messenger application, and identifying a product the user desires to purchase from the merchant site via the dialog. Based on a spoken buy interaction by the user via the dialog, the method includes receiving, at a browser or application and via an application programming interface, a payment request, from the merchant site, for payment data of the user for purchasing the product and, in response to the payment request, communicating, from the browser and via the application programming interface, payment information for the user, wherein the merchant site uses the payment information to process a payment for the product. A cryptocurrency wallet can also be built into the social media or messaging application or in communication with the application to enable users of the social media entity can make payments to each other. In this scenario, communication of information, requests, responses or other necessary communications to achieve the payment can be performed within the social media entity.

The method can include receiving, at the browser and via the application programing interface, an address request, from the merchant site, for address data for the user. In response to the address request, the method can include communicating, from the browser and via the application programming interface, the address data for the user to the merchant site. The merchant site processes the payment using the payment information. The payment information can include payment account information for the user that the merchant site can use to process the payment for the product. A browser can present the messenger application to the user. The dialog could also be a text dialog as well and not a spoken dialog. The method could also be claimed from the standpoint of the merchant site. The messenger application can be a social media application having a cryptocurrency wallet integrated therein, such that the social media application manages the payment process from one person to another using at least in part a cryptocurrency.

Other innovations include transitioning techniques from a search field to a destination site using a number of solutions, applying an API to turn any website into a "one-click" or fewer click purchasing experience than was traditionally available, as well as other social media innovations address the various issues set forth above, and other issues as well.

The present disclosure addresses other needs identified above as well. For example, the need to improve the purchasing experience of users on the Internet is addressed herein. Form filling shopping cart purchasing models require too much user input and interaction and reduce the number of users actually completing the process to make a purchase. Disclosed is an updated browser having a payment request application programming interface for communicating payment data between the browser and a site for processing payments of purchases and to reduce the number of user interactions needed for a purchasing process. The method includes receiving, via the user interface, an interaction by a user with an object associated with a site, the interaction indicating a user intent to make a purchase. The method includes receiving, based on the interaction and via an application programming interface, a request from the site for payment data in connection with the purchase and transmitting, to the site and via the application programming interface, the payment data. The payment data confirms the purchase or can be used to process or deliver a product associated with the purchase. The payment data can include any type of payment data necessary for processing the purchase. It can include an account number, a private key for cryptocurrency payments, a password, a tokenized version of payment data, address information, preferences, shipping choices, other user data, and so forth. A software module on a device may perform operations such as generating keys, hashing operations, evaluation digital signatures, and encryption in connection with cryptocurrency payments or transactions. The software module may also generate symmetric keys for transactions.

Yet another aspect relates to processing from the browser or search engine side when communicating payment data via an API to a merchant site. The method includes presenting, on a graphical user interface, a presentation, the presentation being received from a site over a network. It includes receiving, via the user interface and from a user, an interaction with the presentation and receiving, via an application programming interface, a request from the site for payment account data for the user. The method also includes transmitting, to the site and via the application programming interface, the payment account data, such that the payment account data can be used to populate payment fields for payment processing on the site, or perform more advanced processing using the payment data to simplify the user interaction. The presentation can include one of a product for purchase and a service. The method can include enabling the site to process a payment for an item or a service using the payment account data for the user to make the payment. The graphical user interface can be associated with a browser or an application. In one aspect, the API communicates data between the site (merchant site) and a browser that can store the payment account data for the user.

The method can further include updating the presentation to include a buy option which is configured, based on a confirmation from the user, to enable the site to utilize the payment account data received through the API to process a purchase of an item or service without a need of the user to fill in the payment fields on the site. The browser or other agent communicating via the API can also provide the graphic for a "pay now" type of button to integrate with site graphics. The payment account data can further include one or more of address data for the user, a payment account number, an expiration date, a security code, a cardholder name and shipping instructions for the user. In one aspect, the payment account data can include multiple methods of payment such as multiple credit cards, for example.

The request through the API can further include one or more of a supported payment method for the site, a total amount value for a purchase, items that may be displayed for purchase, shipping options, payment modifiers, a request for a user email address, a request for a user's phone number, a request for a private key of a cryptocurrency wallet and a request to update information. A user agent similar to or separate from the browser can communicate the payment account data between the application programming interface and the site.

In another aspect, the method includes the concept from the standpoint of the site. The method in this context includes transmitting, for viewing on a graphical user interface, a presentation, the presentation being transmitted from a site over a network to a device having the graphical user interface, and receiving, via the network and from a user, an interaction with the presentation. The method includes transmitting, to an application programming interface, a request for payment account data of the user, and receiving, at the site and via the application programming interface, the payment account data and populating payment data fields associated with a payment process with the payment account data for the user to yield populated payment data fields. The site can process a payment for an item or a service using the payment account data for the user. The payment data can be a tokenized packet of data for a one-time payment process. The payment data could be a private key, tokenized or not, for use in processing a cryptocurrency payment on the blockchain. The API can coordinate data between the browser and the site such that the browser stores the payment account data for the user. Upon receiving a confirmation from the user to make a purchase of an item or service associated with the presentation, the method can include processing a payment for the product using the received data.

The method can further include, upon receiving the payment account data, updating the presentation to include a buy option which is configured, based on a confirmation from the user, to enable the site to utilize the payment account data to process a purchase of a product or service without a need of the user to manually fill in the payment data fields on the site. The payment account data can further include one or more of a token, a private key of the user's cryptocurrency wallet, a password, an address data for the user, a payment account number, an expiration date, a security code, a cardholder name and shipping instructions for the user. Fingerprint authorization or other biometric authorization such as an iris scan or facial recognition can occur as well. The presentation can further include one or more of a supported payment method for the site, a total amount value for a purchase, items that may be displayed for purchase, shipping options, payment modifiers, a request for a user email address, a request for a user's phone number, and a request to update information. A user agent can also communicate the payment account data between the application programming interface and the site. In another aspect, a method includes presenting, on a graphical user interface, a presentation, the presentation being received from a site over a network and receiving, via the user interface and from a user, an interaction with the presentation The method includes receiving, via an application programming interface, a request from the site for payment account data for the user, autopopulating a payment field associated with the presentation with the payment account data and transmitting, to the site and via the application programming interface, the payment account data. The site can process a payment based on the payment account data for the user. The method can also include receiving a confirmation from the user of a purchase after the payment field is autopopulated.

The present disclosure also addresses the problem of managing a user account of on-line purchases, such as is offered by amazon.com, but expanded to correlate purchases across multiple different venues such as google.com, facebook.com, amazon.com, and so forth. Disclosed is an API that is designed to communicate information to and from multiple different types of sites that currently manage purchases individually. For example, the API can receive conversion data about purchases made through the Google Buy Button (Purchases on Google), the Facebook Buy Button, the Pinterest Buy Button, Amazon.com purchases, and so forth. A purchase management engine receives the various pieces of data and correlates the data into a single user account that spans multiple purchasing platforms. The account can be stored on a blockchain as well. The present approach differs from the amazon.com user account because it is maintained only for purchases made at amazon.com and not for purchases from different types of sites such as google.com or facebook.com. However, the correlated data could be transmitted to an interface like amazon.com such that in addition to all of the advantages of managing purchases on amazon.com, the user account of amazon.com can also be populated with google.com, facebook.com, instagram.com, pinterest.com, youtube.com, and other site purchases. The complete correlated data can actually be presented at any of the traditional non-merchant sites, individual merchant sites (like walmart.com or widgets.com) as well as amazon.com. The way the correlated data is presented is user-definable as it is with amazon.com with addition of features that are not contemplated by amazon.com, such as which buy button site the purchase was made from. Thus, the user interface could present products purchased from google.com, followed by facebook.com, followed by amazon.com.

Thus, the concepts disclosed herein expand upon the "micro-moments" from involving just the moment when someone wants to make a purchase, make a payment to another person, to other purchasing related options. The micro-moment a user may experience can perhaps be a desire to cancel a purchase made the previous day, or to buy another product like the one purchase yesterday. In this manner, through a drop-down menu on a site, or positioned near a buy option, an option in a messaging application, the system can present a "user account" access option which enables the user to access their account and make further changes/modifications. Because of the correlation and the API, the modifications can easily be made across all platforms. Thus, on one user interface, the user could buy an extra widget in addition to the one purchased via Google's Buy Button the day before, as well as cancel the purchase made that morning via Facebook or make a payment from one person in a social media network to another.

Because the purchases described above are often coordinated between multiple entities such as a site (Google, Facebook, Apple Pay, Android Pay, Samsung Pay, etc.), the merchant (which may or may not handle the payment but typically handles the delivery), a bitcoin or cryptocurrency wallet either stored on a device or held at a network based location, and a delivery service (Federal Express, UPS, etc.), the present API will interface with multiple different sites and service providers as necessary to coordinate whatever action is necessary. Thus, one or more of the following actions can be divided up on either side of the API between the purchase management engine, a merchant, amazon.com (or the like), and the buy button site (Google, Facebook, Instagram, etc.): (1) processing an additional purchase; (2) canceling a purchase; (3) implementing a buy it again choice; (4) providing a return of the product; (5); writing a product review; (6); tracking a package; (7) altering a delivery schedule; (8) changing a payment method; (9) lodging a complaint; and (10) transmitting a notification of any action taken to one or more of the buyer, a recipient, a merchant, a delivery provider, a buy button site, and more.

The product management engine can coordinate the various actions necessary across the different platforms. Thus, if a user, via a Facebook site for example, cancels a purchase, the product delivery engine can coordinate the various actions such as notifying the merchant, the site, the delivery service, and so forth, to implement the cancellation.

In another aspect, knowledge and data that is gained through management of products via the product management engine can be provided further to advertisers who can then more intelligently provide advertisements or buy button options through any of the sites. Additionally, data can be shared with friends or associates through social networking sites if a user permits it. For example, data about what size or color of an item a particular person usually purchases for themselves can be shared for future gifting opportunities. Friends or associates on social networks can use the product management engine to determine if a user has purchased a particular item in the past to avoid duplicating an item as a gift. For example, a user can query the engine to determine if his friend Bob has purchased any Lego sets in the past year. A decision to purchase a Lego set as a gift for Bob can be made after the query results are received.

The "account button" from which a user can access the user account can also be presented creatively to the user. For example, when a buy button is presented as disclosed herein, a "manage purchases" or the like can be presented as well. Such a button can also be offered one or more layers into the process. For example, often when a buy option is interacted with, the user is presented with more details about a product, information about the merchant selling the product, and an opportunity to buy through the buy option (using purchase account information stored elsewhere from the merchant site as disclosed herein). At this stage (after interacting the buy option but before actually converting into a complete purchase), the "manage purchases" option can be presented as the user is known to be in the mode of considering a purchase and they may want to check/manage their purchase history. Information from their purchase account can also be used to perhaps tailor the advertisements or presentation of the response to their interaction with the buy option.

Yet another innovation includes applying the payment request API in other contexts such as virtual reality, media viewing, and so forth. Any user interface can be considered a browser and the basic structure and protocols of the payment request API can also be implemented in other scenarios such that one click purchasing opportunities can be made available.

DETAILED DESCRIPTION

Figure 1A:
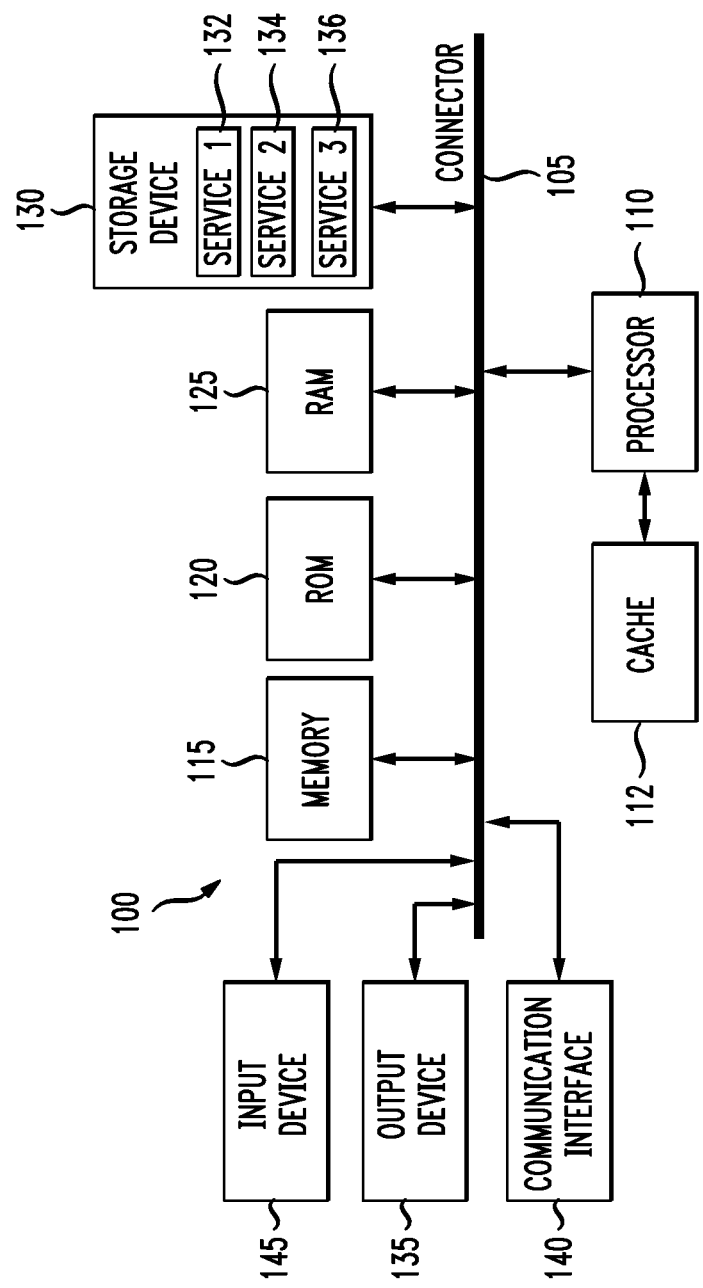
FIG. 1A illustrates a system architecture.

The following disclosure describes a number of different innovations related to simplifying online purchases, providing an application programming interface for improved purchasing experiences, enabling cryptocurrency payment via the payment request API, enabling smart contracts to handle in a trustless environment purchasing transactions using the payment request API, and improving social media networks, as well as other innovations. APIs can be built into software modules for coordinating with applications and cryptocurrency wallets can be integrated into applications such as, for example, social media applications for easily enabling payments between members of the social media applications. Accordingly, the disclosure will step from one innovation to another and any individual feature can be utilized in connection with any other feature or example.

The following is an example of a Bitcoin transaction. Assume Alice (the buyer) wants to use her Bitcoin to buy pizza from Bob (the seller). She would send him, through her bitcoin wallet, her private "key," a private sequence of letters and numbers, which contains her source transaction of the coins, an amount, and Bob's digital wallet address. Bob's "address" would be another public sequence of letters and numbers. The transaction thus has three pieces of information: An input, which is a record of which bitcoin address was used to send the bitcoins to Alice in the first place (she received them from her friend, Eve); the amount, which is the amount of bitcoins that Alice is sending to Bob; and an output, which is Bob's bitcoin address. The browser, agent, software module, or application disclosed herein will obtain the necessary information via an API from the merchant site and/or the buyer in order to enable a transaction utilizing the three pieces of information necessary for a cryptocurrency transaction. For example, if the user selects bitcoin to make a payment on merchants.com, within an API interface, the interface can convert from showing the amount of the purchase in dollars to the amount of the purchase in bitcoin. When the user confirms that they want to make the payment, the input data, which is the record of which bitcoin address was used to send the bitcoins to the buyer in the first place, the amount of bitcoins which is available via the API, the seller's bitcoin address or the source address, and/or the buyer public key or wallet address can all be wrapped up to and into a single data packet or tokenized data packet for processing on the peer to peer network. The wallet or functionality can be accessed via an API or via communication within an application integrated with a cryptocurrency wallet.

In another aspect, the API may only provide the buyer's input data such as their private key, the data which contains the source transaction of the coins for the buyer, and/or any other data through the API. The merchant has the amount already and their own public key address for receiving the electronic coins. The merchant can then provide the package of data to the peer-to-peer network for processing. Of course notifications will have to be customized to the buyer for monitoring the progress of the transaction. In another aspect, the buyer wallet can be initiated via instructions from the browser or application acting as the agent in the process. The API can provide the merchant public key to the buyer wallet, and the amount of cryptocurrency, and cause the wallet to carry out the transaction. Rather than the buyer needing to manually open their wallet, enter in the public key of the merchant wallet, entering the amount, and so forth, the wallet would be modified so as to be enabled to communicate with the agent via an API, which can communicate both data and functional instructions to the wallet. In this manner, the API can be utilized to enable a one click type purchasing transaction for cryptocurrencies. Where the wallet is built into a social media application, the concept or communication via an API can be also performed within an application via the API or another communication protocol.

Bob can scan the "key" with his smartphone to decode it. At the same time, Alice's transaction is broadcast to all the other network participants (called "nodes") on the ledger, and, approximately, ten minutes later, is confirmed, through a process of certain technical and business rules called "mining." This "mining" process gives Bob a score to know whether or not to proceed with Alice's transaction.

Further to the discussion above, to send bitcoins, the buyer needs two things: a bitcoin address and a private key. A bitcoin address is generated randomly and is simply a sequence of letters and numbers. The private key is another sequence of letters and numbers, but unlike a bitcoin address, this is kept secret. Think of a bitcoin address as a safe deposit box with a glass front. Everyone knows what is in it, but only the private key can unlock it to take things out or put things in. When Alice wants to send the bitcoins to Bob, she uses her private key to sign a message with the input (the source transaction(s) of the coins), amount, and output (Bob's address). Because the transaction must be verified by miners, the parties to the purchase are sometimes forced to wait until they have finished mining. The bitcoin protocol is set so that each block takes roughly 10 minutes to mine. Some merchants may make a customer wait until this block has been confirmed, meaning that the customer may have to make a cup of coffee and come back again in a short while before he can download the digital goods or take advantage of the paid service.

In the context of the API disclosed herein or an integrated wallet into an application, the user is not likely to want to sit and wait for ten minutes for the transaction to process. Thus, a notice is likely going to be provided which indicates that a text, or an email, or another user interface will be presented to the user at the completion of the mining process for that transaction. The browser, agent or application of course can maintain this contact information and can receive the notification of the completion of the mining process and initiate a communication to the user that the mining process is complete. In this way, the browser, agent or application has additional functionality built in, while it maintains the position of being the agent or primary managing entity for the transactions.

On the other hand, some merchants won't make the buyer wait until the transaction has been confirmed. They effectively take a chance on the buyer, assuming that the buyer won't try and spend the same bitcoins somewhere else before the transaction confirms. This often happens for low value transactions, where the risk of fraud isn't as great. The API disclosed herein could also manage this waiting process by including a timer or a block that does not let two bitcoin transactions to occur back to back or until the confirmation is received via the API to enable another bitcoin transaction. Other cryptocurrencies operate quickly and do not have a delay in transactions as bitcoin does. Use of these faster cryptocurrencies could increase the use for small transactions or peer to peer money transfers.

Because bitcoins exist only as records of transactions, a person can end up with many different transactions tied to a particular bitcoin address. Perhaps Jane sent Alice two bitcoins, Philip sent her three bitcoins and Eve sent her a single bitcoin, all as separate transactions at separate times. These are not automatically combined in Alice's wallet to make one file containing six bitcoins. They simply sit there as different transaction records.

When Alice wants to send bitcoins to Bob, her wallet will try to use transaction records with different amounts that add up to the number of bitcoins that she wants to send Bob. The chances are that when Alice wants to send bitcoins to Bob, she won't have exactly the right number of bitcoins from other transactions. Perhaps she only wants to send 1.5 BTC to Bob.

None of the transactions that she has in her bitcoin address are for that amount, and none of them add up to that amount when combined. Alice can't just split a transaction into smaller amounts. She can only spend the whole output of a transaction, rather than breaking it up into smaller amounts. Instead, she will have to send one of the incoming transactions, and then the rest of the bitcoins will be returned to her as change.

Alice sends the two bitcoins that she received from Jane to Bob. Jane is the input, and Bob is the output. But the amount is only 1.5 BTC, because that is all she wants to send. So, her wallet automatically creates two outputs for her transaction: 1.5 BTC to Bob, and 0.5 BTC to a new address, which it created for Alice to hold her change from Bob.

As we shall see below, implementing a cryptocurrency payment process into the API or other application will involve converting the data to the cryptocurrency amounts and making adjustments such that the data pass through the API or managed to be passed to a different location will encompass the input, the amount and the output data that can be broadcast to the ledger for confirmation of the transaction. Built into the system could be a later confirmation (it is not real-time as in a normal payment process that can be confirmed through the API interface) to a cell phone number, email address, social media entity, or other user interface that the score received by Bob confirms the transaction. The API can also have built into it the exchange of addresses, private keys, or any other data necessary to make a payment in bitcoin and process the "change" from the merchant to the buyer with the new address for Alice as noted above. In this regard, the process would work essentially in reverse and the API would be utilized to provide the necessary input, amount, and output data flowing from the merchant (Bob) to the buyer (Alice) such that the secondary change transaction could also occur. In this case, Alice's wallet identification would be received via the API, an amount would be provided, and the information delivered to the merchant wallet with instructions to populate the data fields of the wallet and carry out the transaction of transferring the change amount from the merchant wallet to Alice's wallet. This can all work within the context of a social media application for payments between users.

Mining, or processing, keeps the Bitcoin process secure by chronologically adding new transactions (or blocks) to the chain and keeping them in the queue. Blocks are chopped off as each transaction is finalized, codes decoded, and bitcoins passed or exchanged.

Having provided a basic introduction, this disclosure now turns to a general example system disclosed in FIG. 1A, which can provide some basic hardware components making up a server, node or other computer system. FIG. 1A illustrates a computing system architecture 100 wherein the components of the system are in electrical communication with each other using a connector 105. Exemplary system 100 includes a processing unit (CPU or processor) 110 and a system connector 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules/services can control or be configured to control the processor 110 to perform various actions. Other system memory 115 may be available for use as well. The memory 115 can include multiple different types of memory with different performance characteristics. The processor 110 can include any general purpose processor and a hardware module or software module/service, such as service 1 132, service 2 134, and service 3 136 stored in storage device 130, configured to control the processor 110 as well as a special-purpose processor where software instructions are incorporated into the actual processor design. The processor 110 may essentially be a completely self-contained computing system, containing multiple cores or processors, a bus (connector), memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software services 132, 134, 136 for controlling the processor 110. Other hardware or software modules/services are contemplated. The storage device 130 can be connected to the system connector 105. In one aspect, a hardware module that performs a particular function can include the software component stored in a computer-readable medium in connection with the necessary hardware components, such as the processor 110, connector 105, display 135, and so forth, to carry out the function.

Variations on FIG. 1A include any cloud-based computing resources as well as any virtualization processes of hardware components. Any compute environment can be utilized to implement the processes described herein.

Figure 1B:
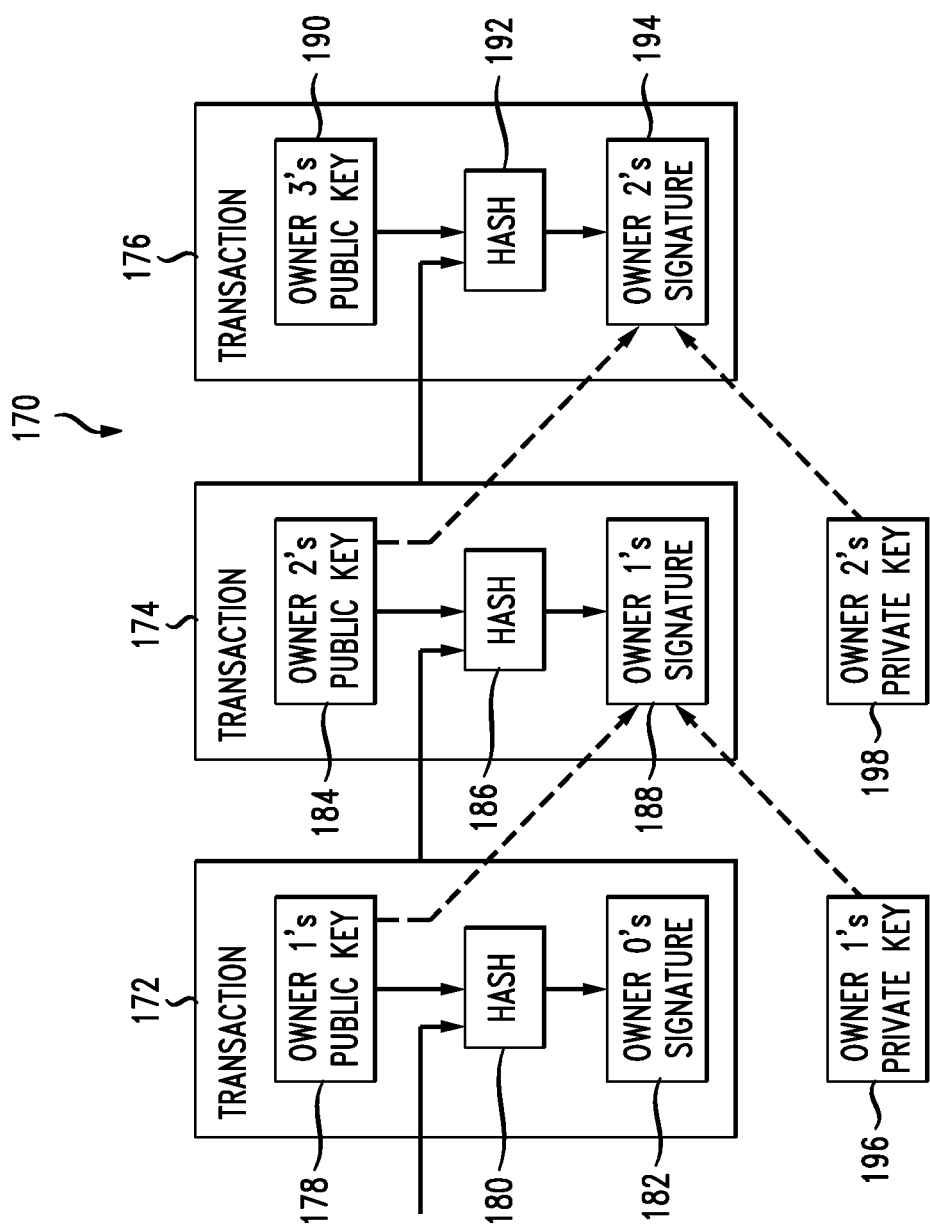
FIG. 1B illustrates the basic process of providing bitcoin blockchain transactions.

Having introduced the basic computing components which can be applicable to examples associated with this disclosure, the disclosure now turns to FIG. 1B. The present disclosure focuses on the use of the API for a cryptocurrency, blockchain-based transition. A discussion of these types of transactions follows. Reference to bitcoin will be provided but the basic principles can apply to any currency such as Ethereum, Dash, Ripple, etc. Any currency in which transactions are stored on a blockchain via this process can apply. The principles also apply to a social media site or application having a cryptocurrency wallet integrated therein.

As is shown in FIG. 1B, system 170 illustrates the transaction of transferring one electronic coin to another person. The first transaction 172 illustrates Owner 3's public-key 178, a hash 180 and owner 0's signature 182. Each owner transfers the coin to the next by digitally signing a hash of the previous transaction and the public key of the next owner and adding these to the end of the coin. A payee can verify the signatures that verify the chain of ownership. Owner 1 verifies their public key and signs the transaction with owner 1's private key which becomes owner 1's signature as part of transaction 174. Owner 2's public-key 184 is hashed 186 with data from the first transaction 172 and with the owner 1 signature 188.

The same process can be repeated again in transaction 176, such that owner 2 can verify the transaction with their public key 184 and sign the transaction using their private key 198, yielding owner 2 signature 194. Thus, utilizing owner 3's public-key 190, the hash 192, and owner 2's signature 194, owner 3 can receive the electronic coin as part of transaction 176.

Bitcoin works on a vast public ledger, also called a blockchain, where all confirmed transactions are included as so-called 'blocks.' As each block enters the system, it is broadcast to the peer-to-peer computer network of users for validation. In this way, all users are aware of each transaction, which prevents stealing and double-spending, where someone spends the same currency twice. The process also helps blockchain users trust the system.

A proof of work algorithm is run on the peer-to-peer network to verify each transaction. The steps to run the network include, new transactions are broadcast to all nodes, each node collects new transactions into a block, each node works on finding a difficult proof of work for its block, and when a node finds a proof of work, it broadcasts the block to all nodes. Nodes accept the block only if all transactions in it are valid and not already spent. Nodes express their acceptance of the block by working on creating the next block in the chain, using the hash of the accepted block as the previous hash. In some cases, like with bitcoin, this process can take ten minutes. In other words, there is likely to be a period of time between submitting the transaction into the peer to peer network and receiving a confirmation that it is complete. One aspect of this disclosure is how the API would manage this timeframe.

The unit of account of the bitcoin system is bitcoin (or ether for Ethereum, etc.). As of 2014, symbols used to represent bitcoin are BTC, XBT, and others. Small amounts of bitcoin used as alternative units are millibitcoin (mBTC), microbitcoin (μBTC, sometimes referred to as bit), and satoshi. Named in homage to bitcoin's creator, a satoshi is the smallest amount within bitcoin representing 0.00000001 bitcoin, one hundred millionth of a bitcoin. A millibitcoin equals to 0.001 bitcoin, one thousandth of a bitcoin. One microbitcoin equals to 0.000001 bitcoin, one millionth of a bitcoin.

The blockchain public ledger records bitcoin transactions. The system accomplishes this without any trusted central authority: the maintenance of the blockchain is performed by a network of communicating nodes running bitcoin software. Transactions of the form payer X sends Y bitcoins to payee Z are broadcast to this network using readily available software applications. It is this process of managing a cryptocurrency transaction that will be woven into the API or within the social media application that is disclosed herein. The ultimate goal is to make a cryptocurrency purchase as easy as a one-click type purchase or payment transaction between two social media users, which can be made through a social media application or Apple pay, Android pay, Amazon.com, and so forth. In one aspect, this process could also be implemented through an Amazon.com type approach in which no API exists between the site and a browser, but the information is stored locally with the site but the same basic functionality can be provided.

Network nodes can validate transactions, add them to their copy of the ledger, and then broadcast these ledger additions to other nodes. The blockchain is a distributed database—to achieve independent verification of the chain of ownership of any and every bitcoin amount, each network node stores its own copy of the blockchain. Approximately six times per hour, a new group of accepted transactions, a block, is created, added to the blockchain, and quickly published to all nodes. This allows bitcoin software to determine when a particular bitcoin amount has been spent, which is necessary in order to prevent double-spending in an environment without central oversight. Whereas a conventional ledger records the transfers of actual bills or promissory notes that exist apart from it, the blockchain is the only place that bitcoins can be said to exist in the form of unspent outputs of transactions.

Unlike traditional currencies, which are issued by central banks, bitcoin has no central monetary authority. Instead it is underpinned by a peer-to-peer computer network made up of its users' machines, akin to the networks that underpin BitTorrent, a file-sharing system, and Skype, an audio, video and chat service. Bitcoins are mathematically generated as the computers in this network execute difficult number-crunching tasks, a procedure known as bitcoin "mining". The mathematics of the bitcoin system were set up so that it becomes progressively more difficult to "mine" bitcoins over time, and the total number that can ever be mined is limited to around 21 million. There is therefore no way for a central bank to issue a flood of new bitcoins and devalue those already in circulation.

The system works via the use of a cryptocurrency wallet to put bitcoins in. There are three different applications or flavors of bitcoin wallets. A full client is like a standalone email server that handles all aspects of the process without relying on third-party servers. A user would control the whole transaction from beginning to end. Full clients verify transactions directly on a local copy of the blockchain (over 110 GB as of May 2017[45]), or a subset of the blockchain (around 2 GB[46]). Because of its size and complexity, the entire blockchain is not suitable for all computing devices.

A lightweight client is a standalone email client that connects to a mail server for access to a mailbox. It would store the user's bitcoins, but it needs a third-party-owned server to access the network and make the transaction. Lightweight clients consult a full client to send and receive transactions without requiring a local copy of the entire blockchain (see simplified payment verification—SPV). This makes lightweight clients much faster to set up and allows them to be used on low-power, low-bandwidth devices such as smartphones. When using a lightweight wallet however, the user must trust the server to a certain degree. When using a lightweight client, the server cannot steal bitcoins, but it can report faulty values back to the user. With both types of software wallets, the users are responsible for keeping their private keys in a secure place. Any of these wallets can be built into or integrated into a social media application or site to enable easy transactions between users of the social media entity.

A web client is the opposite of "full client" and resembles webmail in that it totally relies on a third-party server. The third party replaces the user and operates the entire transaction. Wallets typically come in five main types: Desktop, mobile, web, paper and hardware. Each of these has its advantages and disadvantages. Besides software wallets, Internet services called online wallets offer similar functionality but may be easier to use. In this case, credentials to access funds are stored with the online wallet provider rather than on the user's hardware. As a result, the user must have complete trust in the wallet provider. A malicious provider or a breach in server security may cause entrusted bitcoins to be stolen. Physical wallets store the credentials necessary to spend bitcoins offline. Examples combine a novelty coin with these credentials printed on metal. Others are simply paper printouts. Another type of wallet called a hardware wallet keeps credentials offline while facilitating transactions.

Buying and selling stuff with bitcoins involves a particular process. There are no physical traces of them as of dollars. All that exists are only records of transactions between different addresses, with balances that increase and decrease in their records that are stored on the blockchain.

Figure 2:
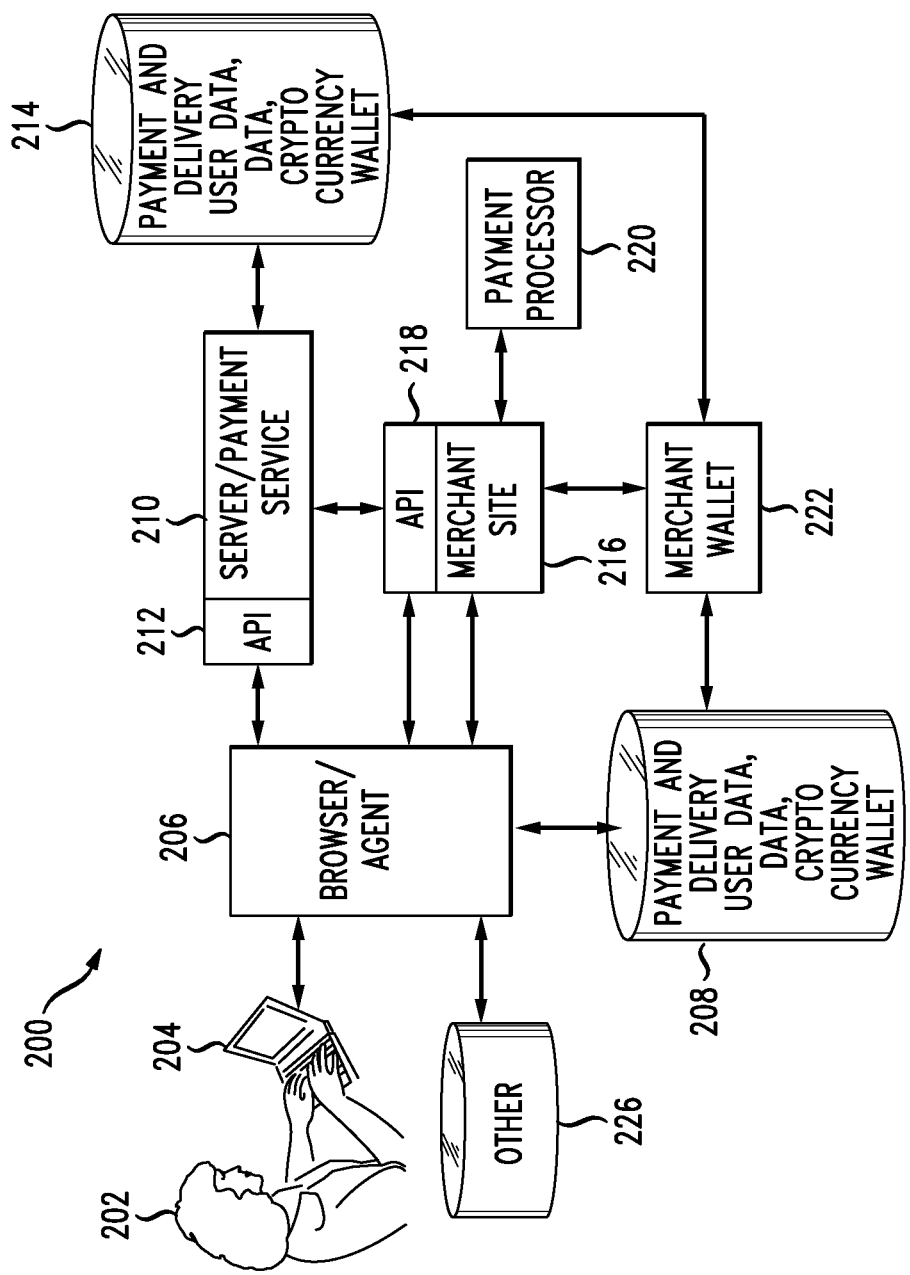
FIG. 2 illustrates an example architecture for use of the payment request API and the payment handler API.

Having introduced cryptocurrencies, this disclosure now turns to FIG. 2 for the discussion of the API and a payment handler API ecosystem and how one or more of these APIs could be implemented to manage cryptocurrency payments. In another aspect, a cryptocurrency wallet could be integrated into an application to more easily facilitate payments between users.

Overall Architecture for One-Click Payments

FIG. 2 illustrates an example architecture 200 for pre-populating a merchant shopping cart, as well as for using a payment request API and/or a payment handler API. While the example is primarily focused on merchant sites and browsers, the principles also apply to software modules configured with a similar API and configured to coordinate with an application, as well as an application having a cryptocurrency wallet integrated there. In this example, a user 202 of a computing device 204 running a web browser 206 loads a web page with a unified input field or any other site such as a social networking entity or a merchant site. In one aspect, focused on in this present case, the browser 206 is presenting a view of the merchant site 216 and the user 202 operating their computing device 204 to run the browser 206 desires to make a purchase from the merchant site 216.

In the ecosystem shown in FIG. 2, the goal is to enable the user 202 to easily make a purchase on the merchant site 216 without needing to manually enter a credit card, a private key, a delivery address, a phone number, and email address, a password, or any other manual data. With the use of one or more of the API 218, and the payment handler API 212, the ecosystem enables either locally stored information or locally stored apps on the device 204 or within the browser 206 to provide requested payment data and/or other data to the merchant site 216 through the defined protocols of the API 218. Payment and delivery data, user data, cryptocurrency, the wallet data, private keys, passwords, and any other data associated with a particular payment method can be stored locally at the browser 208, or on the device 204. In some cases, the browser 206 might reach out to some other database as well to access needed data 226.

Where a payment method is not one that is stored on the browser 206 or the local device 204, but where payment and delivery data, user data, cryptocurrency, the wallet data, or any other data is stored at a web-based location 214, the payment handler API 212 can be utilized to access a server or payment service 210, which has access to or stores the web-based payment data 214. One example of this scenario would be if the user has a PayPal account and the payment service 210 represents PayPal. PayPal can store the payment and delivery data of the user 214 and can either provide it directly to the merchant site via an API or other communication or can provide information through the payment handler API 212 to the browser 206 which then provides the data through the payment request API 218 to the merchant site 216. The payment data can be raw data such as a credit card number, expiration date, name, or can be a tokenized version of the data which is configured for a one time use for that particular transaction. A cryptocurrency wallet can be built into a social media application for enabling cryptocurrency-based payments to be made between users of the social media application.

Another aspect of this disclosure relates to the user interacting with the server 210 in which the server is running a search engine such as google.com. This scenario involves how one might transition from a google.com site 210 to a merchant site 216 to enable a purchase without needing to manually enter in payment data at the merchant site 216. The server 210 can represent any site or application and can include payment service applications. As the user 202 enters data in the unified input field on the site 210, or interacts with the site in any other way based on its respective functionality, such as social media functionality, the browser 206 sends the data, via the API 212, to the server 210. The server 210 can analyze the data to identify that the intent of the user 202 is to make a purchase, based on the data entered in the unified input field. The server 210 can identify a merchant website 216 that sells the desired item and communicates with that merchant website 216 via its associated API 218, if available. In one aspect in this scenario, the payment data stored 214 can enable the site 210 to process the payment and communicate via the API with the merchant the payment details and information to the merchant 216 to deliver the product. If an API is not available, the server 210 can communicate with the merchant website 216 via HTTP and can navigate through the website in an automated fashion as if a user were clicking or entering data on the merchant website 216. The server 210 can use a network-based database 214 of payment and delivery data or other personal data about the user 202 to populate data fields at the merchant website 216.

However, if a network-based database 214 is incomplete or does not exist, the server 210 can, via the API 212, request data from a database of payment and delivery data 208 local to the browser 206 or to the computing device 204. The payment data 208 can be any payment data stored on the local device (or at a network-based service), even if for other purposes such as a YouTube account, or associated with an email account, or an iTunes account. If a user is logged into their browser, or their email account or any other type of account, and there is payment data stored, the system can utilize or access that payment data to initiate a commerce purchase. When the user is making a purchase, the system can present the various payment accounts stored, such as a credit card in Google Wallet, plus a Play Store account, and let the user choose amongst the available payment options including cryptocurrencies. This can also occur across platforms such as information stored in Chrome plus an Amazon account stored on Amazon.com. In this scenario, the Amazon.com data can be represented by the server 210 and data 214 and can be provided to the browser 206 through an API 212 or other means. The browser 206 can access and utilize any stored payment data for simplifying the payment process. Data can be stored with a social media application as well with an integrated cryptocurrency wallet.

The server 210 can continuously receive additional data entered by the user in the unified input field via, and update or modify data entered at the merchant website 216, products selected for purchase at the merchant website 216, or even switch to a different merchant website altogether. The server 210 can transmit a response to the browser 206, via the API 212, so the browser 206 can present actions or destinations to the user 202 based on the data entered in the unified input field. Then, if the user selects one of the actions or destinations, the browser 206 can navigate to that page and communicate with the merchant website 216 directly, or without the server 210, although the server 210 may continue to communicate with the browser 206 to track behavior of the user 202 at the merchant website 216. For instance, the server 210 may track eventual purchase details referred through the unified input field. The server 210 can update the network-based payment and delivery data 214 from time to time based on information processed from the local payment and delivery data 208, or based on user input. The payment request API 218 establishes the basic protocols for communicating information between the merchant site 216 and a browser 206 for simplifying the payment process. The browser 206 can also represent any device such as a voice-controlled assistant or an appliance. The payment data that is communicated from the browser 206 through the API 218 to the merchant site 216 can be tokenized for security purposes. The merchant site 216 can then process a payment for the product with their payment processor 220. The benefit of this approach is that the same payment infrastructure can be used by the merchant and only minor changes to a site are needed to utilize the browser API 218 to obtain the necessary data for processing a payment. As shown in FIG. 2, communications between the merchant site 216 via the API 218 with the browser 206 to obtain any kind of data 208, can occur in both directions. Thus, the merchant 216 can initiate a request for data through the browser API and receive that data for any purpose such as payment data to avoid the user needing to manually fill in payment account, address information, as well as any other data such as shirt size, pant size, shoe size, color preferences, one-click purchasing parameters etc.

For example, if the merchant site 216 is amazon.com and the site already has the payment account and address of the user landing on amazon.com, a one-click purchasing authorization or parameter may need to be set on the browser 206 for the destination state to be a "one-click" purchasing state. In the transition from the server 210 to the site 216, the process can include accessing or confirming that the one-click purchasing state is "on" for the browser to enable the user to land on the site 216 and have the next interaction be a one-click to purchase the product.

Various example aspects of implementing the payment request API 218 are disclosed herein. It is noted that the payment and/or delivery data, as well is any other data (such as user profile data, one-click purchasing data, settings, parameters and so forth) that may be used for processing a purchase, can be stored 208 locally, on a user device 204 or may be retrieved from a network server or service, or a combination of both. For example, when the browser 206 receives a payment request through the API 218, it may communicate data with a network server associated with a purchase. A network server can encrypt data and create a token which is transmitted back to the user device, for passing on to the merchant for processing the payment. The server 210 can also represent any site other than search sites, such as social media sites, and the respective functionality associated with the respective site will apply to how one might transition from an interaction with the first site 210 to a destination merchant entity site 216. In other words, the initiating transitional interaction may not be entering data into an input field but could be any interaction associated with the respective site, such as interacting with an advertisement or an interaction associated with a game, map application, conferencing application and so forth.

In one aspect, as is shown in FIG. 2, the site 216 can also request via the API 218 payment data from the server 210, which can have access to the payment data, user data and/or other data. Thus, for example, a site could present a buy button as the user navigates for a product and decides to make a purchase, and to turn that purchase into a one-click type experience, the site could perform an API call to a server, such as a Google based server or an Amazon based server, for example, and retrieve payment information and/or other data stored with Google or Amazon, or any other entity, which can be passed through the API to the merchant site for processing the payment and potentially delivery of the product to the buyer. Thus, payment data stored in say Google Play, or with an email address or YouTube, or at Amazon, could be accessed and provided quickly and easily such that the user does not have to manually enter the data to make a purchase. The server 210 might also access payment data stored in connection with the browser 206 to make a payment. Indeed, the API 218 and/or API 212 could be used to present a number of different payment options via a user interface, such as one payment option stored in a browser 208 and one payment option stored at a Google server 214, or Android Pay, for example, and enable the user to choose which payment account to use for a payment. Information about the chosen payment account can be passed through the API 218 to the site 216 for processing.

Figure 3A:
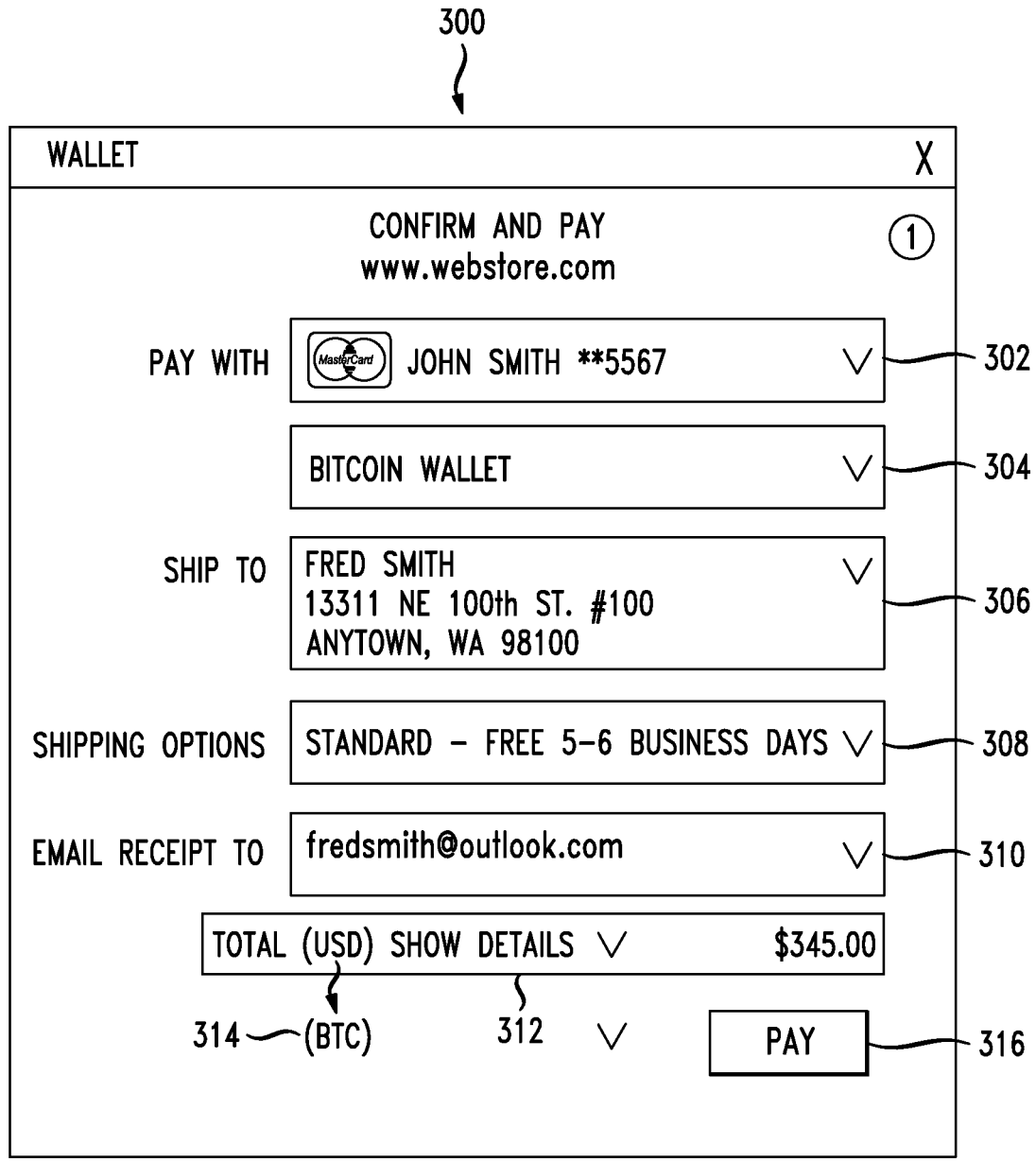
FIG. 3A illustrates a payment request API user interface.

One aspect of this disclosure is how to utilize the ecosystem with the APIs disclosed in FIG. 2 for cryptocurrency transactions. In such a scenario, the merchant site 216, would typically provide data through the API 218 that it can process a cryptocurrency payment. The browser 206 would likely already have registered that cryptocurrency to a wallet as part of the user data 208. Thus, if the merchant site accepts bitcoins, and the browser stores data indicating a user has a bitcoin wallet and is authorized to make purchases via bitcoin, then an API interface 300 can be presented with bitcoin as an optional payment method as is shown in FIG. 3A.

This exchange of overlapping payment methods can occur via the API 218 between the browser 206 and the merchant site 216. The benefit of this approach is to reduce the number of clicks or interactions from the user by automating as much of the payment process as possible. Where the wallet is integrated into a social media application, options to make a payment or to request a payment all within a social media interaction (such as a messaging context) can easily enable a payment between to entities that are already identified as being part of the communication.

An aspect of this disclosure relates to a method including receiving, from a site or application, at a browser, software module or at a cryptocurrency wallet built into an application and via an application programming interface that defines a protocol for communicating data between the site or application and the browser or agent, a request associated with a potential purchase or money transfer, wherein the request includes an identification of a cryptocurrency payment method accepted by the site or application. The method can include transmitting, to the site or application, from the browser/agent and via the application programming interface, or other protocol, data indicating that a user of the browser or application can pay for the potential purchase or make the transfer via the cryptocurrency payment method accepted by the site or application or other user. This is a "canmakepayment" exchange in which the site or application and the browser or agent determine the overlap between accepted payment methods. In this example, a cryptocurrency method is common to both the site or application and the browser/user. The method includes receiving, via a user interface associated with the application programming interface, a confirmation from the user to process the potential purchase using the cryptocurrency payment method and retrieving, based on the confirmation from the user and via the application programming interface, cryptocurrency payment information for the potential purchase. The retrieving can involve gathering the input to the transaction which can include the buyer's private key, data about the address of the person who transferred the cryptocurrency to the buyer, the seller's public key, a password and/or any other data for processing the cryptocurrency transaction. The cryptocurrency wallet can be local to a device, built into the social media application or web-based. Such wallets in one aspect are registered with the browser, integrated into the application, like any other payment method, such that they are usable and the necessary data for the transaction can be provided to the browser as the agent managing the transaction or to the social media application. The method includes, in one aspect, transmitting from the browser and via the application programming interface, the cryptocurrency payment information.

Assume in one example that the user is utilizing a cryptocurrency payment method for a transaction or payment transfer within a social media network. In this scenario, there are several factors that need to be taken into account. One factor may be the type of wallet that each of the buyer and the seller have. Thus, a different set of parameters may be communicated for a full-service wallet which performs all necessary functions of spending and receiving cryptocurrencies such as generating private keys, deriving the corresponding public keys, distributing public keys, monitoring for outputs spent, creating and signing transactions, spending those outputs, and broadcasting the signed transactions. Full-service wallets are the most popular type of wallets, they are easy to use and a single program can manage spending and receiving cryptocurrencies. Such wallets could be integrated into a social media entity application or website.

In one scenario, if the user does select a cryptocurrency for a transaction, the payment request API interface 300 could be modified from an original currency, such as dollars, to the cryptocurrency amount, such as bitcoins. Typically, the user will confirm a shipping address, other shipping information, or any other information associated with the transaction. The API can be used to receive the confirmation, such as "pay" interaction with the user interface. Next, the API can be used to communicate with the buyer's cryptocurrency wallet 208 to provide instructions to send 0.02 Bitcoin to the merchant or recipient wallet 222. There may need to be some additional user interface presented as part of the API interface which indicates or instructs the user that their bitcoin wallet will be sent an instruction to send the payment associated with the transaction to the merchant or recipient wallet. The API could be used to receive the necessary public key data for the merchant's wallet, of course, the amount is provided, and can manage the interaction with the buyer's wallet automatically such that the transaction gets initiated on the peer to peer network. The other database 226, which is indicated in FIG. 2 can represent the peer to peer network in which the browser 206 can provide data to manage the transaction. The wallet 208 of the buyer could also send the transaction to the peer to peer network 226 such that the merchant is paid in bitcoin. Such processes also apply within the context of an application with a built in wallet or an application that communicates via an API with a software module on a device which enables the cryptocurrency payments.

One aspect disclosed herein is a smart contract used in connection with a payment request API user interface. The interface 300 can include a selectable option to process the transaction on a smart contract or blockchain-based smart contract. This option may be presented by the merchant (e.g., as instructed through a parameter in an API communication) or as an option selected by the user, which data can be stored in the browser. The interface can be part of a social media entity and initiated within the context of a social media interaction in which the giver and a recipient are identified in that they are in a dialog, messaging to each other, viewing a posting from a person, or some other context. Typically, within a social media environment, depending on the application, people are communicating with each other, and therefore prior to initiating a payment transaction, the participants are already identified at least in part. The interface 300 may also just include a notice that the transaction will be managed through a smart contract. In one aspect, if additional data is needed to manage the process using a smart contract, a further interface can be presented or fields can be presented which enable the user to provide the information needed for the smart contract to function or perform its operations. This could be a password, a fingerprint ID, a login name, a captcha request, a document, a picture, a security question, or any other data which might be needed for a smart contract to manage the purchasing process. The implementation of the smart contract could be based on the user confirming the smart contract use or could be based on a requirement by one or both of the parties to the transaction that they require the smart contract.

The smart contract could also be used in connection with social media interactions such as postings, messaging, payments, or other social media interactions.

Any communication of data or instruction that needs to be transmitted or received is contemplated as within the ecosystem of FIG. 2. For example, if the user maintains a web-based wallet 214, and an additional indication is necessary between the browser, software module or social media entity and the web-based wallet 214, then that data can be communicated be the via the payment handler API 212 to a server or service 210. The server or service can perform the same functionality of providing the necessary data in order to implement a transaction from the buyer's wallet 214 with the necessary public key, signature, private key, and so forth to initiate the transaction. A social media entity can also coordinate the necessary data with a blockchain-based system for recording transactions within the social media environment. As can be seen in FIG. 2, a transaction from a wallet 208 to the merchant wallet 222 is provided, as well as a transaction from wallet 214 to the merchant wallet 222. As has been noted above, in some scenarios, a user may transmit two bitcoin to the merchant and receive change of 0.5 bitcoin. All of these transactions and change, if necessary, can be communicated between wallets via the payment request API 218 or within the social media environment. The essence of this process is to enable a single pipeline for varying payment methods to correspond to both a buyers list of available payment methods, and the list of available payment methods available at the merchant 216, or between two individuals in a social media network communication.

Another aspect of this disclosure involves how to handle the timing of elements with cryptocurrency payments. With bitcoin, it can take ten minutes to mine a new transaction. It would not be anticipated that the user would see a spinning indicator on a payment request API user interface indicating the payment is processing for ten minutes. Accordingly, another aspect of this disclosure with the browser 206 acting as an agent to make the entire purchasing transaction easier, could include a peer to peer network that, when they provide the confirmation of a completed transaction, could send the confirmation to the browser 206 which can take further steps such as initiating a message transmitted to the buyer via their cell phone, via email, or via another payment request API interface. When a confirmation is received at a cryptocurrency or wallet 208, 222, or 214, and having established a communication with the wallet, via the browser API 218, 212, the wallet can provide confirmation data of the transaction back to the API in any pathway. Again, the browser can then actually initiate a communication to the user in any number of channels indicating that the cryptocurrency transaction is complete on the Blockchain.

The browser API 218 has a number of characteristics that can distinguish it from APIs between the site and a payment server, such as a PayPal scenario, and from general hypertext markup language (HTML) protocols. HTML is a markup language that web browsers use to interpret and compose text, images, and other material into visual or audible web pages. Web browsers will receive HTML documents from a Web server or from local storage and then render those webpages. HTML generally describes the structure of such webpages semantically and the instructions for the appearance of documents on the browser. Cascading style sheets and JavaScript can also be part of HTML. Default characteristics for every item of HTML markup are defined in the browser, and these characteristics can be altered or enhanced by the web page designer's additional use of CSS. In contrast, an application programming interface represents a set of subroutine definitions, tools, and protocols which outline a set of clearly defined structures for communication between various software components. It is an established API for communicating between a site, such as a merchant site, and the browser. APIs can also be used between applications and software modules or toolkits on a device, or between software components within a social media environment, such as between a messaging context and a cryptocurrency wallet integrated within the social media environment. As such, the browser, application or software module must be programmed with the routines, data structures, object classes, variables and/or remote calls to enable a respective site which desires to utilize the API to be able to make payment request calls and receive the appropriate data via the API for processing payments. The browser API may not be an HTML interface, nor is it an API that is designed for communication between the site and directly with a network-based payment server or payment service. We note that disclosed herein is a process in which the browser, software module or application can act as an agent and manage through other APIs between the browser, software module or application and network-based payment services, the process of making a payment or providing payment data, such as tokenized data, to a merchant site. However, in that scenario, the site does not need to make separate API calls to a network-based server because the browser is established as the agent to manage the process, thus simplifying the communication for the site such that only calls through the browser API need to be made for authentication, authorization, network-based processes, to occur. Thus, the API, which can be a set of HTTPS request messages, along with a definition of the structure of request messages and response messages, which can be established in an XML or JavaScript object notation format, is built into the browser, software module or application enabling the entity to act as an agent for providing authorized payment data, password data, login data, tokenized payment data, or to manage as an agent network-based payment processing or logging in processing, all through payment request or other calls made from the site through the browser API. Where the wallet is integrated into an application, other communication protocols can be implemented to enable easy payments from one user to another user.

The API manages the flow of data between the agent and the site or application and enables the agent to separately reach out for authentication, data, tokens, or other network based services. Where the agent is the application, the application would handle these functions. The API provides a consistent experience across payment methods, systems, platforms and merchants. Typical web based APIs have defined interfaces between the site and a web service and a novel concept disclosed herein is the new API that defines the architecture and programmable interface, data structures, and so forth, which are built into a browser, software module or application such that the respective entity can receive payment requests, retrieve authorized payment data, respond to the request, whether the process be a payment process or a login process, such that payment or login processes can be simplified and unified across sites or within an application context such as a social media application.

FIG. 3A illustrates an interface 300 with such information as the user's name, shipping address, shipping options 306, and email address 310 for a receipt. Options can be presented based on the correlation between payment methods such as pay with Mastercard 302 or bitcoin 304. If bitcoin is selected, then the total amount could be transitioned to bitcoin 314. The user can then click on pay 316. The challenge in integrating the payment request API with cryptocurrencies is how to maintain a simple interface that can be uniform across payment methods, and various cryptocurrency wallets. There are several solutions which are provided herein to handle behind the scenes communication of data such that the user can easily make a cryptocurrency payment via a payment request user interface, as is shown in FIG. 3A, or within a context of an application such as a social media application.

Figure 3B:
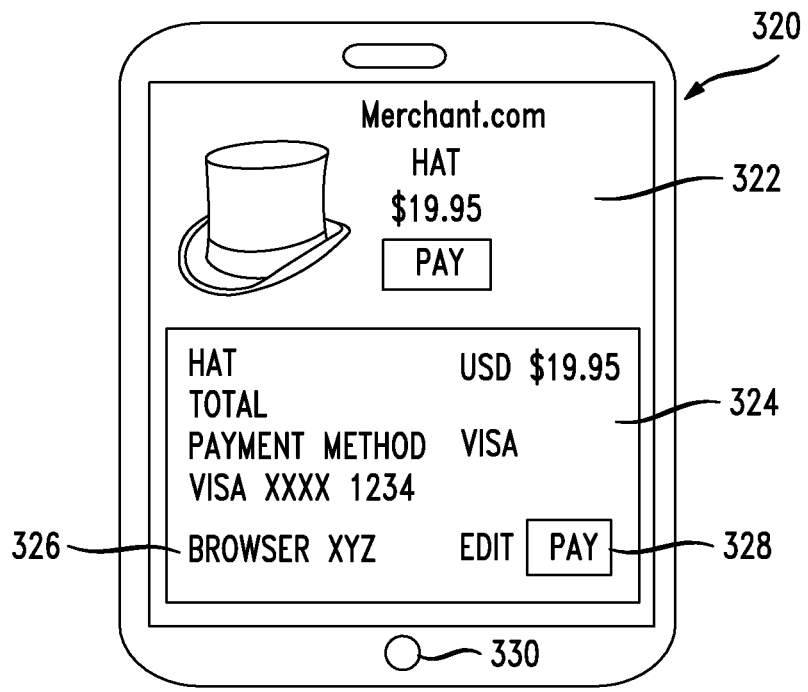
FIG. 3B illustrates a partial user interface overlay on top of a merchant site.

FIG. 3B illustrates a partial overlay of a payment user interface that covers at least a portion of the underlying merchant site. In this aspect, as part of a payment process, a user interface 320 could involve partially covering the underlying site 322 which the user interacts with to initiate the purchasing process. The process could include dynamically presenting an interface 324 that reveals at least a portion of an underlying site interface 322 and covers at least a part of the underlying site interface 322 as part of a payment process. The user can interact with the overlying interface 324 while viewing a portion of the underlying site interface 322. The overlaying interface 324 can include a number of different options with which the user can interact for performing functions associated with making purchases on the site or within the application. This can be termed a "tear" or other terms that indicate fundamentally an overlay interface 324 that the user can interact with which partially covers an underlying site that is selling a product to the user. This concept can involve a blending of the payment request API concept with the "tear" concept to enable the purchasing interaction with the site or application 322 to include an overlay browser API interface 324 that partially covers the site and enables the user to interact in an efficient manner. This represents one example of the integration of payment mechanisms like a cryptocurrency wallet blended with an application or site to enable multiple functions (i.e., a cryptocurrency payment and a social media messaging communication dialog) previously separated to be integrated or blended. The integration of the user interfaces of the two separate applications further enables coordination of data specific to each application in ways that improve the user experience. For example, by providing payment related options, buttons or functionality from a cryptocurrency wallet within a social media application improves the experience or reduces friction by being able to utilize an existing identification of people who are registered with the social media entity and who might currently be communicating, to be able to add a payment or other transfer of value or other transaction between the two or more individuals or entities (some might be computer bots or computerized processes) within the context of the social media entity. Users in some cases might have to select a recipient from their listing of social media connections but in other cases, users might already be in a messaging or other dialog and be able to easily transfer value between each other. A method can include integrating a cryptocurrency wallet into an application, integrating functionality of both the cryptocurrency wallet and the application, presenting objects for interaction by a user of the application, the objects associated with the functions of the cryptocurrency wallet and the objects presented in the context of the application, receiving an interaction with an object from a user, identifying a recipient of value, the recipient either being in a communication (such as a messaging dialog) with the user or being selected by the user and the recipient being registered with the application, coordinating, by the application, a transfer of value from the user to the recipient within the context of the application. In other words, the user does not have to transition to a cryptocurrency wallet to transfer the value. A record of the transaction of the transfer of value is handled as part of a new block in a blockchain system as described herein. The application can automatically identify the giver and the recipient of the value based on a social media communication context, such as two or more users in a messaging dialog. The process can be claimed here from the standpoint of the cryptocurrency wallet, the application, a social media application, the giver, the recipient (for example, if the recipient is a merchant selling goods or services), the cryptocurrency wallet or the blockchain network.

In one example, the user clicks or indicates via the interface 322 with a site within a browser, or via a spoken dialog, messaging dialog, social media interaction, or any other interactive modality, that they desire to initiate a purchase, pay another person, receive or request a payment, or perform some other task. An overlay interface 324 can be presented to the user which partially covers the visual presentation of the site 322 from which the purchase will be made. The overlay includes interactive components with which the user can interact with to complete the purchasing process. The overlay can be built into the graphical interface of an application to enable what was previously, for example, a social media interaction, to include payment options in the interface as well. The overlay 324 could be a payment request API interface or buttons, drop down menus or other object with one or more of payment, delivery, currency, cryptocurrency, smart contract options, amounts, address, and so forth. The interface enables the user to still see a portion of the underlying site or application 324 from which the purchase is being made. Once the user interacts with the object, such as finally confirming to "pay" 328, it can disappear or be removed leaving the user viewing the site or application after having made a purchase. Information on the user interface 324 can provide data about which browser API is being used to manage the payment process, such as Chrome, Mozilla, Apple Pay and so forth. In some cases, the interface 324 could also be integrated with a fingerprint reader 330 such that the number of clicks can be reduced. For example, at any stage in the process, the user may be asked to just provide their fingerprint or a faceprint to confirm payment. In this scenario, the user could click on the pay button in interface 322, the API interface 324 could slide up and partially cover the site interface 322, and the user could only need to review the material (make edits or changes as necessary) and then confirm the payment with a fingerprint only. No other interaction would be necessary. This can reduce the number of clicks required, for example, with Apple Pay where an extra "pay" click is used before providing the fingerprint.

Figure 4:
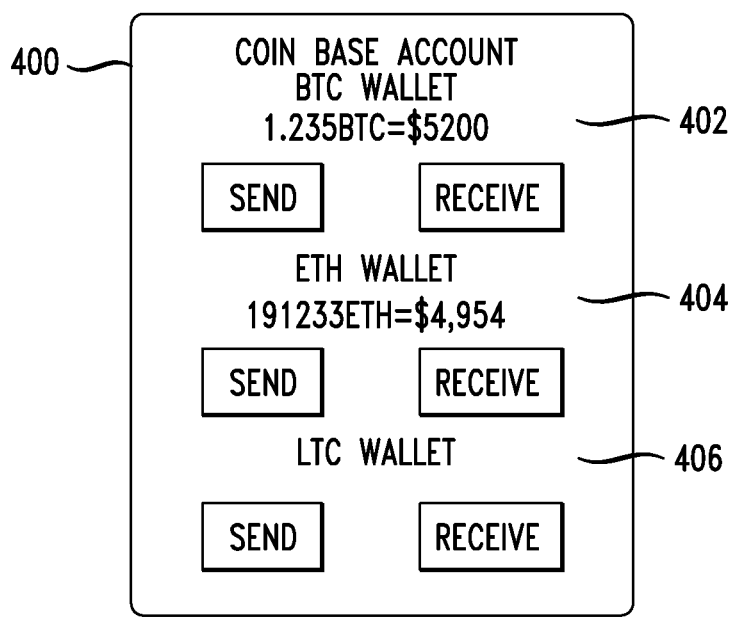
FIG. 4 illustrates an example cryptocurrency wallet interface.

FIG. 4 generally shows a Coinbase.com wallet 400 that a user can select to send or receive crypto currencies. This case includes data about three wallets for the user, a bitcoin wallet 402, an Ethereum wallet 404 and a Litecoin or LTC wallet 406. The user can click on send or receive for the respective cryptocurrency through the respective wallet. In one scenario, the interface shown in FIG. 3 presents the user with the option to pay using their CoinBase wallet or a wallet which enables the user to choose from a number of different cryptocurrencies. In such a scenario, using a slide up mechanism, or a modification approach to the user interface of FIG. 3, to enable the user to select the CoinBase wallet and then be presented essentially with a coin base wallet interface similar to what is shown in FIG. 4. At this stage, the user could then select which cryptocurrency they desire to use. In a social media context, the social media entity may develop a cryptocurrency and built in or integrate a wallet within a social media application, which would be selectable or usable for making payments within the social media ecosystem. If a social media ecosystem includes multiple different applications, payments could be made across different application as well.

Figure 5:
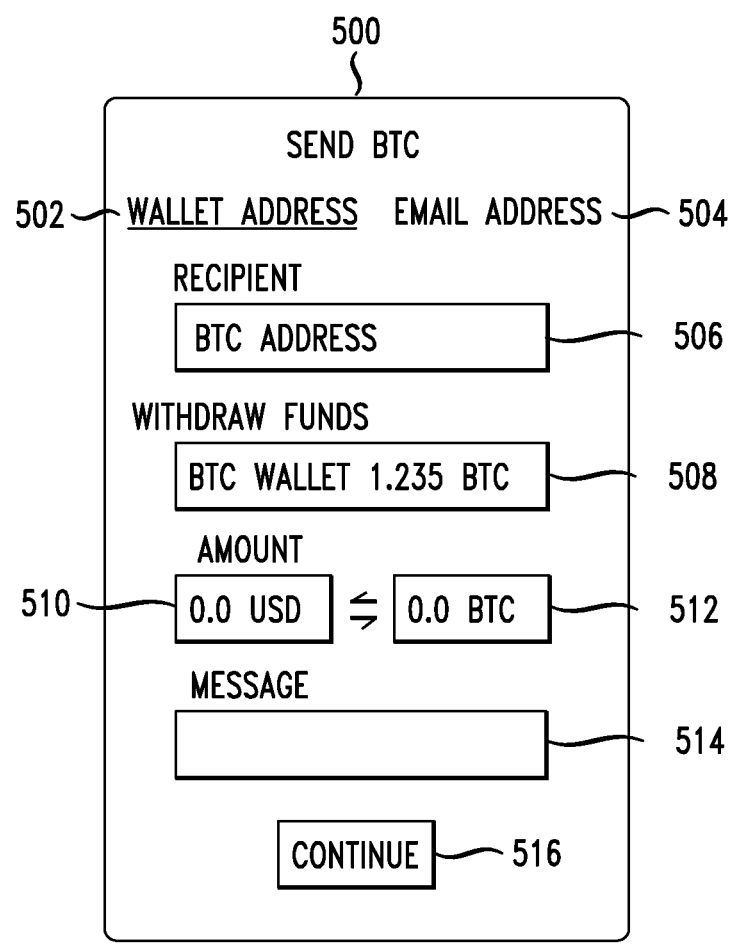
FIG. 5 illustrates another cryptocurrency wallet interface.

FIG. 5 illustrates the BTC Coinbase.com wallet interface 500. In this scenario, the user selected "send" from the BTC wallet shown in FIG. 4. The BTC wallet of FIG. 5 enables a person to identify the recipient either by wallet address 502, or by their email address 504. Being in a social media context can also automatically identify the parties to a transaction. FIG. 5 illustrates using the wallet address and the recipient field 506. The user has chosen to withdraw money from their BTC wallet as is shown in field 508. The amount in dollars is shown in 510 as well as in bitcoin in field 512. A message field 514 is provided, as well as a continue button 516 for the user to complete the payment.

One benefit of using the payment request API is that the interface, as is shown in FIG. 5 can include prepopulated fields such as the recipient address 506 and the dollar amount 510 and as well as the bitcoin amounts 512. The process with respect to a purchasing transaction can include a scenario where the user selects, bitcoin in the interface of FIG. 3, and the interface morphs into their traditional cryptocurrency wallet interface, with prepopulated data fields. Rather than needing to click pay 316 in FIG. 3, the next interaction could be to click continue or pay 516 from the cryptocurrency wallet interface. This can reduce the number of clicks necessary in order to achieve a cryptocurrency payment.

In one aspect, when the user registers a cryptocurrency wallet with their browser such that it can communicate with the payment request API, graphical data can be presented such that the standard interface can be integrated with the payment request API user interface. Essentially interacting with the payment request API interface could be a proxy for handling a payment via the user's cryptocurrency wallet with the underlying data being communicated behind the scenes to the wallet for carrying out the actual transaction. This can also apply to an application scenario where there is no browser but where the user interacts with an application and the wallet is integrated into the application with similar improvements and simplification of enabling payments between users of the social media application or environment.

Figure 6:
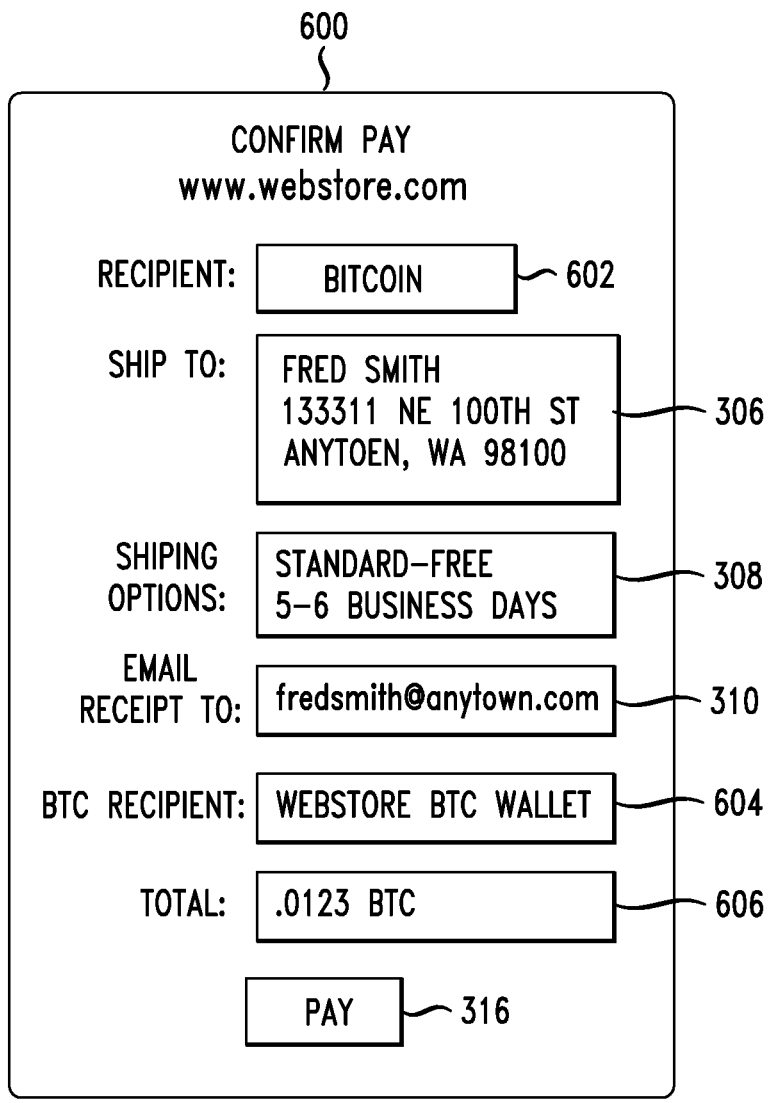
FIG. 6 illustrates a blended cryptocurrency and Payment Request API interface.

In another scenario, FIG. 6 illustrates a blending of the interface of a cryptocurrency wallet and the payment request API interface 600 or with an application interface. The blending could be very convenient inasmuch as there are elements of the payment transaction that are not usual for a cryptocurrency wallet payment and vice versa. The user interface 600 in this scenario can include all of the data in one single interface. This can include a social media environment where two users might be engaged in a messaging dialog and want to make a payment from one user to another.

The user has selected the pay with a cryptocurrency 602. The ship-to data is identified 306. The chosen shipping options are presented 308. The email address for a receipt is provided in field 310. Data received from the payment request API about the cryptocurrency, recipient address or email address for receiving cryptocurrency can be presented in field 604. The total can be presented in bitcoin or other cryptocurrency 606. The user can then click pay 316. What happens when the user clicks pay is that the blended interface receives that confirmation and communicates with the cryptocurrency wallet the necessary data such that the wallet can carry out the transaction and submit the transaction to the peer to peer network and the mining process to add a block to the blockchain. Where the user interacts with an application rather than a website, the similar functionality is built into the application for enabling a simplified approach to making payments.

In one aspect, the system can actually enable a user to use multiple forms of payment for one purchase transaction. For example, if a user has 0.5 BTC available in cryptocurrency for a purchase and desires to use it for the purchase the user may apply it towards a purchase transaction. When the cost of a purchase transaction exceeds that available in cryptocurrency or because of user preference, the system can allow the user to pay the remaining balance with one or more payment options such as PayPal or VISA, for example. Multiple currencies could be used for payment as well. In other cases, the API could be used to access miles, points, value, cryptocurrencies, or any other form of value to be exchanged individually or in combinations of currencies for a product. A dropdown menu 304 can be replaced with several dialog boxes for the user to input the amount he desires to use from each different payment method. Additionally, a toggle button can be used to display the cost of a transaction in cryptocurrency versus dollars or Euros, for example. Any number of combinations of payment methods for one or more purchase transactions is contemplated. The browser API can be used to manage the payment from the different payment methods to complete the full payment of the product or service. This of course can be built into a social media or other application where users can select payment mechanisms for transferring value from one person to another in the social media environment.

In some scenarios, the timing needed to confirm a cryptocurrency transaction can be ten minutes or any amount of time longer than the standard payment confirmation time the user typically waits when making a normal transaction. The user interface 600 can include an email address, telephone number, or other indicator in the field 310 where the buyer can receive a confirmation that the blockchain processing is complete and the payment has been made or added to the blockchain. This is a unique characteristic of some cryptocurrency transactions and that they are not done in real time, and there is a lag for the mining process to occur. In one scenario, the payment request API interface can remain until that processing is complete or can be removed with a later notification to the buyer and/or the seller that the payment is complete.

There are a number of ways in which payments can be carried out depending on the structure of the cryptocurrency wallet, such as whether the user needs to choose a cryptocurrency as in Coinbase or whether the wallet only carries a single cryptocurrency, such as a social media-based cryptocurrency. For example, if the user has a Coinbase account, and they select bitcoin as their cryptocurrency, the payment request API and/or payment handler API could be used to navigate behind the scenes into coinbase.com, and essentially drill down to a deep link into their bitcoin wallet and interact with the wallet with the data provided about the bitcoin amount, the recipient address, whether it is a public key or an email address that is used, and even enter in the optional message and commit the transaction. In this scenario, by virtue of interacting with the appropriate interface, and selecting a cryptocurrency, the user can implement a cryptocurrency payment without manually transitioning to their cryptocurrency wallet and manually entering in the data. In another example, a social media entity can perform all of these functions for users such that users in the environment can easily transfer value (money, cryptocurrencies, points, medical information, personal information, useful personal data such as browser history, etc.) to another person or entity.

It is contemplated that a cryptocurrency wallet would need to have some special programming to enable it to communicate via the APIs disclosed herein or to be integrated into an application or site. This would be similar to the programming necessary for any website to be able to make API calls and receive data according to the programmed protocol. In one aspect, a cryptocurrency wallet could be built right into a browser, the merchant site or an application. The processing that may be necessary is similar on both sides of the transaction. For example, from the merchant site, the merchant may need to click on a receive button, as is shown in FIG. 4 to receive crypto currencies. In a social media application context, a user may click a button to request a payment or another user may click a button to initiate a payment interaction. Again, with the proper programming to be of the interface with the payment request API or other protocol within an application or environment, the recipient wallet could also be opened and have the necessary interaction in order to receive cryptocurrencies via a simple interaction with the interface shown in FIG. 6 and other figures.

Figure 7:
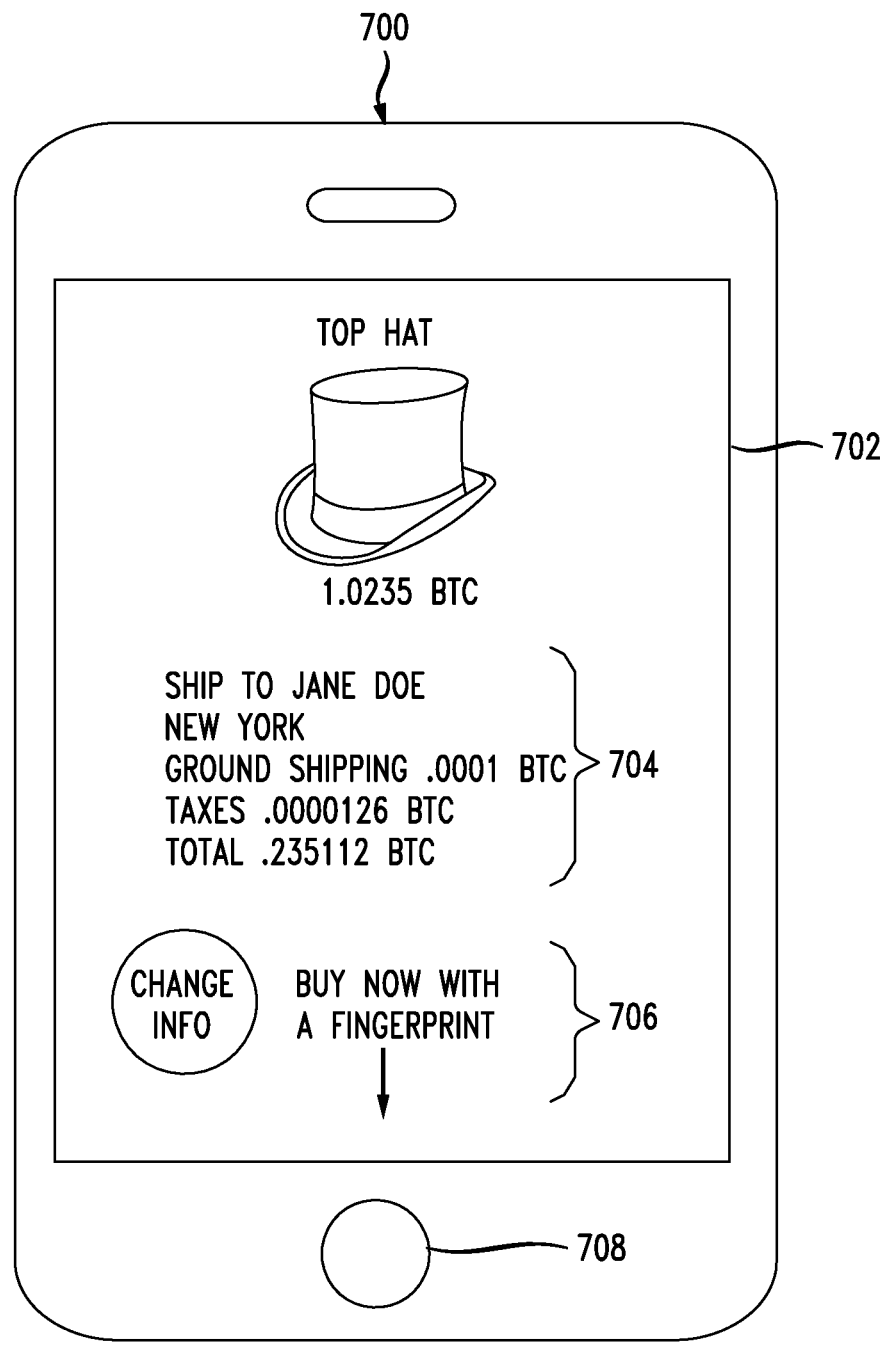
FIG. 7 illustrates another payment request API interface for a cryptocurrency payment.

FIG. 7 illustrates another example interface 702 on a mobile device 700 in which a hat is being purchased for 1.0235 BTC 704. The currency amounts in taxes, shipping and the total are all shown in bitcoin 706. In this scenario, the "pay" button is replaced with a fingerprint confirmation 708. The instruction is provided to buy now with a fingerprint 708. This interface illustrates a further simplified approach in which once the user selects to pay with bitcoin, the next interaction could be presented as a fingerprint confirmation. Other biometric confirmations such as iris scans and facial recognition are contemplated. This simplified approach can dramatically reduce the number of interactions necessary in order to carry out a cryptocurrency payment. While a merchant interface is shown in FIG. 7, a social media interface or other application or website interface can be shown in which some transaction occurs (rental of a scooter, opening a door, registering for a conference, getting on a plane, etc.) and in which a blockchain-based system is used to record that transaction, of any type. Where any transaction needs to be recorded, an interface can be integrated into a graphical user interface (or other modality) for performing that transaction.

Figure 8:
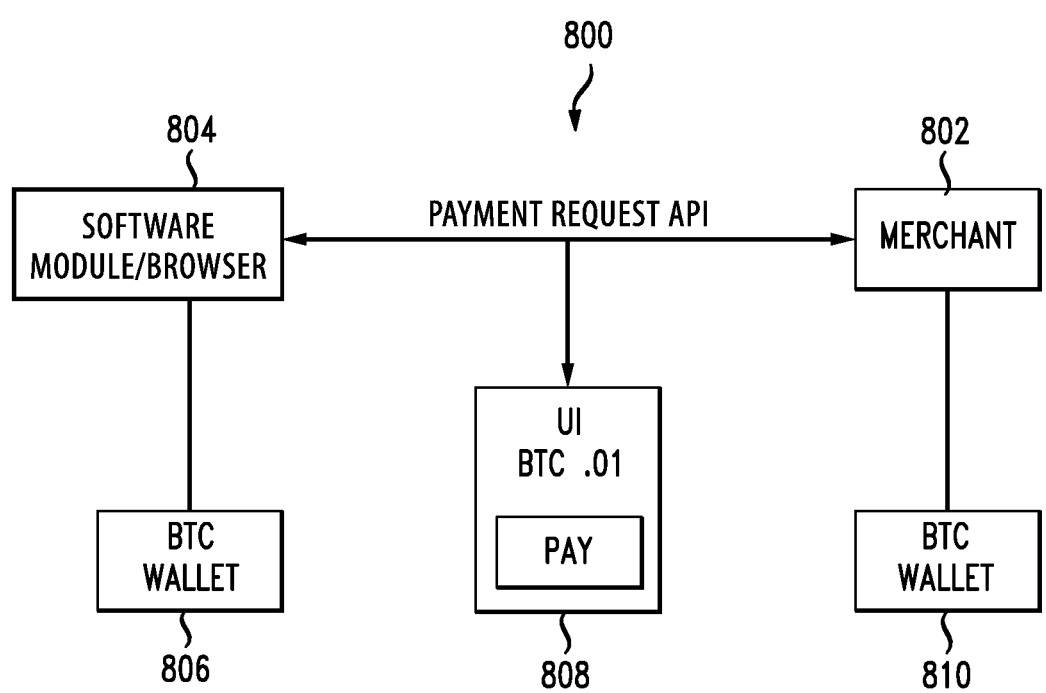
FIG. 8 illustrates a basic cryptocurrency payment method with a buyer wallet and a seller wallet.

FIG. 8 illustrates an ecosystem 800 which includes a browser 804, a merchant site 802 or application such as a social media application, a payment request API interface 808, a user bitcoin wallet 806 and the merchant bitcoin wallet 810. The component 804 can represent a software module communicating with an app on the device. It is assumed that the user wallet, 806 is programmed, registered, and configured to be able to communicate with the browser in the manner disclosed herein or is integrated into the application or site. The browser is also programmed to be able to activate and communicate with the wallet 806 as any other payment app. Similarly, the merchant wallet 810 and the merchant site 802 or application can both be programs to be able to interact as well. FIG. 8 illustrates the basic approach in which once a user selects a cryptocurrency in the interface 808 that the graphical interface can either be morphed into blending a cryptocurrency component or could slide up or transition to a pre-filled out cryptocurrency wallet interface that the user is familiar with. The interface can be part of a social media interface. This interface can be a transition to the cryptocurrency wallet 806 for purchase, or can be a proxy interface in which the look and feel of the cryptocurrency wallet is presented as part of the interface and the necessary data, and instructional interactions are passed via the payment request API, through the browser (in the case of a web site, or through an API or other means to an integrated wallet into an application), to the wallet 806 for carrying out the instructions. These and any other interactions that might be necessary are contemplated as within this disclosure to enable the user to easily select a cryptocurrency as a payment option and confirm the payment without needing to fill in manually private keys, public keys, recipient email addresses, cryptocurrency, amounts, and so forth, on a website or within an application that itself might have nothing to do originally with a payment mechanism. The processing can be shared between the browser/application 804 and the wallet 806 in any manner that might be necessary.

It is noted that different cryptocurrency wallets will have different interfaces and different requirements. A standardized protocol can be established within the payment request API for communicating the necessary input, amounts, and output data which are required for handling a cryptocurrency each transaction. By defining the basic data parameters and structures, any cryptocurrency wallet can easily be established as being selectable by the user as part of a purchasing, payment or other type of transaction.

Figure 9:
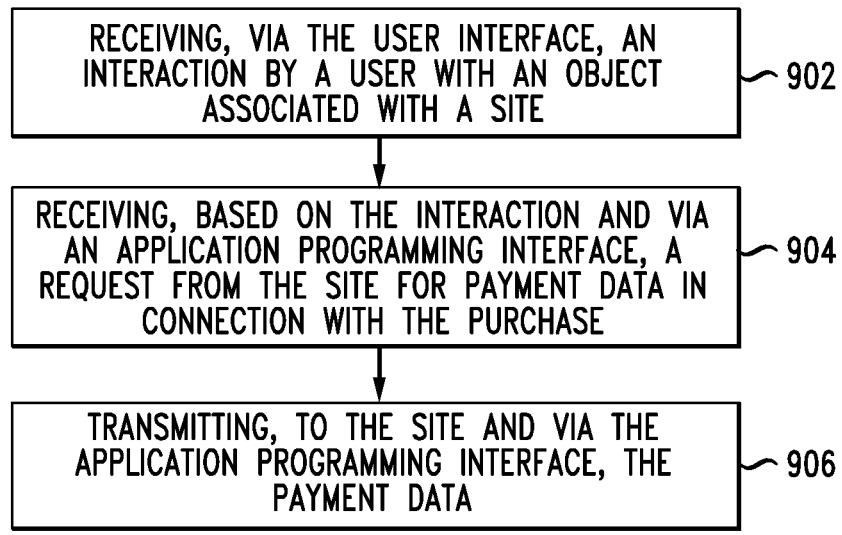
FIG. 9 illustrates an example method.

In another aspect, the disclosure covers, as is shown in FIG. 9 a browser receiving, via the user interface, an interaction by a user with an object associated with a site (902), the interaction indicating a user intent to make a purchase, receiving, based on the interaction and via an application programming interface, a request from the site for payment data in connection with the purchase (904) and transmitting, to the site and via the application programming interface, the payment data (906), wherein the payment data can be used to process a payment or deliver a product associated with the purchase. This approach is also applicable to a wallet integrated into an application or to an application that makes APIs calls to a software module which can communicate with a cryptocurrency wallet or API calls directly to a cryptocurrency wallet. For example, a social media application might make API calls to a cryptocurrency wallet and provide the necessary data for a transfer to occur from a first user to a second user of the social media entity.

The process can be performed as follows. After a user interacts with the object, the site can make the JavaScript API call for a payment request via a payment request API between the browser and the site. The API request can include data such as acceptable forms of payment for the site (Visa, Mastercard, Bitcoin, Ethereum, Dash, Apple Pay, Android Pay, CoinBase, etc.), the amount to be charged, what currency they expect, other data depending on the context of the purchase, and so forth. The API can be used to request can also include details about the transaction such as total amount, currency, how amounts are calculated, tax, discounts, shipping costs, etc. The browser can then determine a match between acceptable payments and available payments through stored credit card information, access to an altcoin wallet for the user, Apple Pay, Android Pay, PayPal, cryptocurrency or any other type of payment service. The system may present the user with current information and an opportunity to add a shipping address, correct data, or change any of the necessary data for the transaction. The system receives and updates any changed data. If options are presented to the user, the user can select which payment option to use for processing the transaction.

Assume in one example that the user selects a cryptocurrency for the transaction. The payment request API can be utilized to exchange any data that is needed to perform the transaction. For example, if the buyer's wallet is to be used to transmit the money to the recipient's wallet, then via the API, the buyers wallet can be activated in the background and delivered the amount, and the merchant's public-key or any other data necessary for the transaction. The type of wallets that are being used for the buyer and the merchant can be provided through the API. The dollar amount in connection with the cryptocurrency amount can also be provided. In some scenarios, actions have to be taken both on the sending wallet and the receiving wallet to confirm the transaction. For example, when sending cryptocurrency, such as bitcoin, a sending wallet can enter a BTC address of the recipient and continue with the transaction. All of these interactions could be handled by the payment request API who can receive the confirmation of the purchase, such as is shown in FIG. 8 and then carry out the interactions with the buyer's cryptocurrency wallet. In one example, wherein an email address would be used as the recipient address of the payment, the merchant could provide that data via the payment request API. In another aspect, where a "receive" input is required to confirm at the merchant wallet that the payment is provided, the payment request API could also have been used to establish a separate communication to the merchant wallet. Any interaction that is needed for a respective wallet to be able to transmit or receive a cryptocurrency payment can be managed via the payment request API and/or the payment handler API disclosed herein, such that the only clicking interaction that needs to occur from the user standpoint is the "pay" interaction shown in FIG. 3. In an application scenario, where a wallet is integrated into the application, similar functionality is applied to enable users of the social media application to make a transfer of value from one user to another user with little friction as the social media application handles all of the signaling the data necessary to handle the transaction and the users only need to identify an amount of the transfer.

In a scenario where a user selects a cryptocurrency as the payment process as part of a spoken dialog or messaging application, the "pay" interaction can be an audible signal to initiate the cryptocurrency payment or via a textual interaction. Accordingly, the payment request API, in this scenario, can be used to identify the confirmed transactions via the payment request API interface, access a buyer's wallet, initiate the wallet application, provide the recipient data, the amount data, and any other data such as a message that can be provided by the sender, and cause the wallet to initiate the transaction. If the merchant wallet also needs to be opened and interacted with to confirm the receipt of the payment, the browser API programming on the merchant side can achieve that processing. Similarly, within a social media application, the social media entity would perform these functions to enable a simple and easy transaction within the social media environment.

In some scenarios, a wallet enables the user to type in a message to the recipient. If there's any such additional data that might be desired as part of the cryptocurrency payment, or as part of any payment method disclosed herein, that data can be provided through the payment request API interface shown in FIG. 3 or through a similar data communication protocol within the social media environment. For example, a user comment field could be provided which would enable the user to type in a message that can be delivered to the merchant or recipient. In situations like Apple pay where a fingerprint confirmation is utilized as part of the secure payment processing, a similar scenario could also be provided where a fingerprint could be implemented to confirm or increase the security of the cryptocurrency payment. In this regard, a cryptocurrency wallet can be integrated into a messaging application for easy payments.

Next, the user can authorize the transaction depending on the type of payment account the user is using. A shipping address might be exchanged or used to include in a total amount a shipping charge. An interface can be presented to the user to confirm one or more of a payment method, a payment amount, a shipping address, and so forth. The payment method might be through a stored credit card in which the last 4 digits might be presented for confirmation. A user's cryptocurrency account might be presented as an option. If the credit card is chosen, then the credit card information (card number, expiration date, name, CVC) is transmitted through use of the API to the site for processing using the site's payment process system. This can be an encrypted transmission or some secure mechanism to maintain security such as a generated one-time use token. If a local payment is chosen through say a Google Wallet, Android Pay or Apple Pay type of service, then the chosen service can process the payment and a report through the API can be provided to the site. Other information about the user can be sent to the merchant as well such as email address, address, payer phone, social media data, contacts in social media etc. The merchant can then continue with a relationship with the buyer.

Figure 10:
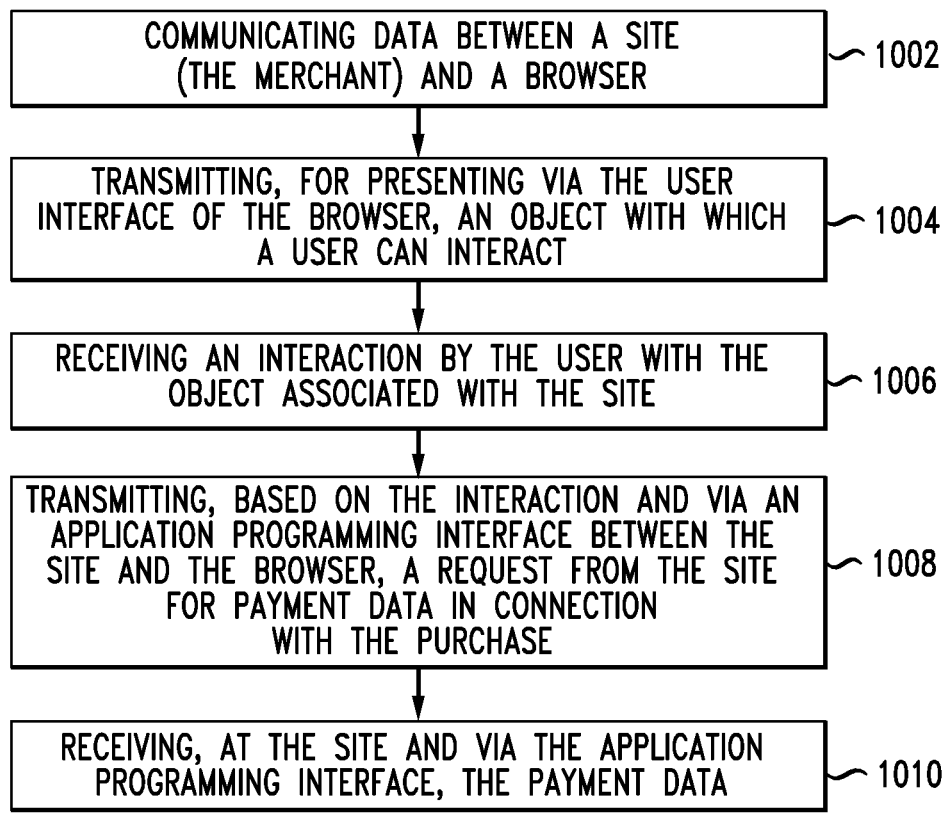
FIG. 10 illustrates another example method.

From the merchant or recipient standpoint, the method can generally proceed as follows and shown in FIG. 10. The method includes communicating data between a site (the merchant or application) and a browser (or software module) (1002). The method includes transmitting, for presenting via the user interface of the browser or application, an object with which a user can interact (1004), receiving an interaction by the user with the object associated with the site or application (1006), the interaction indicating a user intent to make a purchase or to transfer value, transmitting, based on the interaction and via an application programming interface between the site and the browser, a request from the site for payment data in connection with the purchase (1008). Step (1008) can include a transmitting or communicating of data associated with the proposed transaction to transmit value from one user to another user of a social media network to a wallet integrated into the social media application or network. The method further can include receiving, at the site (or application) and via the application programming interface, the payment data (1010), wherein the payment data confirms a payment or can be used to process a payment for a product or deliver the product associated with the purchase. The recipient user in a messaging dialog can receive the payment in their account or cryptocurrency wallet from the sender and be provided with a confirmation indication. As noted above, the payment processing can occur on either side of the API depending on what service the user is signed up for or the preferences of the user. When the site (if the recipient is a merchant site) processes the payment for the product, the payment data can include at least user payment account data such as a one-time use token. The method can further include the site processing the payment for the product based on the payment account data received from the browser via the application programming interface. When a payment service processes the payment for the product, the payment data can include a confirmation that the payment for the product has occurred by the payment service such that the site can deliver the product to the user. Alternately, if an altcoin approach is selected, the API protocols can include a feature for exchanging, in an encrypted fashion, information or personal keys, addresses, amounts, conversion data between currency and altcoin values, and any other data necessary to enable an altcoin wallet or payment service to make the altcoin payment to the merchant site or recipient and report the success of the payment. In this regard, the API protocol is structured such that the user can select various methods of payment, including payments occurring on the browser side of the API (through the browser or payment service associated with the browser or communicating with the browser, or an altcoin system) or on the merchant or recipient side of the API, through the merchant's standard payment processing structure for payment systems like Visa, Mastercard, Debit cards, PayPal, etc. Thus, in one user interface as the user is getting close to making a purchase, the user could see payment options such as "Visa ********1234" or "Android-Pay". Choosing the Visa payment method would cause the back-end processing between the merchant and the browser to have the Visa payment information, account number, security code, user name, address, etc. transmitted to the merchant site so the merchant can process the payment. Choosing Android Pay would result in the purchase amount, tax, shipping and/or any other necessary data to be transmitted through the API such that the Android Pay service could process the payment and report back a confirmation of a completed payment such that the merchant can deliver the product. In a social media context, the messaging application or social media entity would handle the transfer of value from one cryptocurrency wallet to another wallet such that the user's experience is simple and with very little friction.

In the scenario of a cryptocurrency, receiving the payment data (1010) can include receiving confirmation via the payment request API or other protocol within the social media entity that the buyer cryptocurrency wallet successfully received the merchant or recipient address (public key or email address, or other data to identify the merchant), the amount of the transaction, and that the transaction was submitted for processing on the blockchain. The merchant/recipient may need to also have processing on their side to affirmatively receive using the merchant cryptocurrency wallet the payment from the buyer. Thus, the processing described in FIG. 10 can be applied to a cryptocurrency payment with whatever variations are necessary by way of data communication, data processing, wallet functionality, and so forth to enable a cryptocurrency payment.

The above approach also can be applied to the drop down or drop up menus. With the API in place, the efficiency of making purchases from a drop down/up menu option can be increased. For example, a user's information such as hat size, shoe size, shirt size, pant size, etc. can be stored. User preferences for color, style, etc. can be stored and such information can also be accessed via social media sites or contact information. This data can be used to help autocomplete or select products to list in a drop down menu. Such information can be communicated via the browser API with merchants who sell products with parameters that can be filled in through such user data. If the user starts to type "green baseball cap", a drop down menu item could state "green baseball cap 7 8/5 inches, buy now with Visa, $11, buy now with Bitcoin, delivered by Walmart on Tuesday". As the user types the words, a correlation to a product database at a merchant site could lead to the merchant exchanging product information or make a request for a payment request through the payment request API. The user's address can be drawn upon to determine shipping costs, taxes, etc, quickly such that the drop down/up menu can include one or more of a charge, a payment option, delivery information, description of product, size information, personal user preferences for color or style, etc. The user merely clicks on that option to make the payment (on either side of the API depending on the capabilities of the merchant, user payment accounts, and so forth), and have the product delivered. If more than one payment option is available (Visa, Android Pay, Bitcoin), the item in the drop down menu can perhaps have multiple sub options to choose from perhaps in a left to right fashion. This would be a more dynamic drop down/up menu in which the user could drop down to select the row but then slide to the right or left until the cursor is over the Android Pay option. Releasing the cursor could cause the system to continue to exchange information via the API and process the payment through the Android Pay option and report that payment to the merchant. The menu option could report any number of different pieces of information for the product, such as a pickup location (For pickup at Walmart in Dunkirk), and so forth. Current drop down menus provide some options like to search for the item on Amazon.com or Yahoo.com but they do not provide the purchasing simplicity that can be achieved by tailoring the drop down/up choices through use of the browser API between the browser and merchant sites. Objects that the user can interface with can be presented in any location on the user interface, not just drop down menus.

Another benefit of this approach is that as the user is typing in the product information into the search field, the user can view the drop down/up results and narrow the scope as they go. For example, if a user types in "baseball cap", a drop down/up item could include items such as: "G"reen Baseball cap sold from "W"almart or "C"osco. The user could continue to type: "baseball cap G C" which could utilize the hints from the drop down menu to make it green and from Cosco. Perhaps two prices could be shown "$11 or $20" and the user continues to type "11" into the input field. The dynamic exchange of typing and feedback from the drop down/up menu item could also indicate which of a number of different drop down/up menu items the user is interacting with and continue to focus the search and the results on what the user is looking for. Throughout this process, it can quickly be assumed that a purchase intent is likely and the exchange of payment data and options can be presented and chosen by the user. For example, the drop down menu item may say "Green Baseball Cap, $11, "A"ndroid Pay, "V"isa or "B"itcoin"" and the user could continue to type "baseball cap G C V" which would indicate the choice of Visa as the payment method. Pictures can be dynamically presented through this process including the opportunity to click on a picture and continue providing information through the input field such that ultimately the user has chosen the item, its color, size, and so forth, the payment mechanism, and can confirm the payment. In one example, the menu item could be more dynamic than current menu items to let the user click on different objects within the item to choose payment options, size, color, merchant, delivery address, and so forth. As the user narrows down which drop down/up item the user wants to focus on, more information to complete a purchase could be provided such that the process becomes very quick and simple. The menu items could start out short and simple but as the user types more or interacts with a menu item, new data or objects could be presented which, in a dynamic fashion through interaction with the API, could lead to a quick finalizing of the item for purchase. For example, the user may initially choose "iPhone 8, from Bob's Audio Video", but then the merchant can communicate that it can handle Visa and Android Pay through the API. If the user also has these payment options available, then the menu item can add two selectable objects which the user could click on or alternately continue typing in the input field (since the user is already at the keyboard typing anyway) a "v" or an "a" to represent the choice. The system after interacting to confirm an item, an amount, a delivery address, a payment option, etc. can manage the payment as disclosed herein on either side of the API and instruct the merchant to make the delivery.

The process, through the browser API or similar functionality within an application context having a wallet built in, enables the exchange of payment data, one-click parameters or settings, any other data, and to process the payment in the manner chosen by the user. For cryptocurrency payments, the process can include initiating a cryptocurrency wallet app stored on a buyer device and/or integrated into an application, or can include communication between the browser API, or a second API, with an online cryptocurrency wallet in which the API is used to initiate a login process, and navigate to a point of data entry in the online cryptocurrency wallet in which data fields can be populated with the input, amount, and output data necessary to carry out a cryptocurrency payment from the buyers cryptocurrency wallet to the merchant or recipient cryptocurrency wallet. The merchant delivers the item if that is the scenario. The drop down/up menu concepts disclosed herein work in a different way with the API but achieve a similar result of more efficient purchasing process for the user. The disclosure covers the interactions both from the side of the browser interacting throughout the process through the API with the merchant and the processing from the merchant site where they manage their database of products and interact and exchange information, requests and so forth via the API with the browser.

The following discussion continues to relate to the use of an API or other protocol to communicate payment related data from a browser, site, agent, application, or other storage location to a merchant site or recipient for the purpose of populating payment fields for the user to simplify the purchasing process. In one aspect, the disclosure relates to how to transition a user from a search engine, social media site, or any site, to a merchant site or payment context using the API or using an integrated wallet within the application. In another aspect, the merchant site or recipient in a social media application can (independent of how the user navigated to the site) interact via the API with the browser/agent/entity/application to obtain the payment data for automatically populating the payment information to eliminate or reduce the need of the user to fill in data fields, which is particularly cumbersome on a mobile device.

In one aspect, a system, method and computer-readable storage devices are disclosed which prepopulate a shopping cart in an online vendor's website based on intent determined by a classifier that processes input provided to the unified input field. The user intent can be classified or determined in any manner. A user can be registered with and/or logged in with his or her browser, such as Chrome, Firefox, Internet Explorer, Samsung Internet, Microsoft Edge, Safari, or Opera, such that user's purchasing credit/debit card or other accounts and delivery addresses, and/or other data, are stored in a user profile. Then, if the user desires to make a purchase through a destination website that may have a product not found on their registered website, the browser (or system processing in a network) can handle negotiation (via an API) between the browser and the website such that the system can convert a shopping-cart based model website with which the user is not registered into a "one-click" purchasing experience for the user. For example, the system (through a service like Google Wallet, Apple Pay, Android Pay, a cryptocurrency wallet, or PayPal, etc.) can handle the payment for the item and communicate with the merchant site to handle delivery. Of course in this scenario, the process can initiate not from a search engine but merely from a state within the merchant site in which the user is in a position of making a purchase of an item. At that state, the merchant site could communicate via the API with the browser, agent, or search entity, to retrieve payment data for populating the necessary payment fields and present via the interface with the user a simplified purchasing experience. With payment data (one or more of account data, delivery data, dates, delivery options, preferences, etc.) communicated through the API to the merchant site, the merchant site can process a payment from the user's payment account using their normal payment system.

Assuming that appropriate permissions are in place, such as in a browser setting authorizing the browser to navigate and provide input in a website's purchasing, registration, or shopping cart process to automatically input name, address, credit card information, etc., the system can automatically populate a shopping cart, including even registering on behalf of the user at a website with which the user has not registered. This can occur as part of a transition from say a social networking site to a destination merchant site in a one-click purchasing state based on a setting in the browser that needs to be accessed in the transition. The user provides input in a unified input field, such as "buy acme toaster 4.5" which the system and the classifier categorize as a desire to make a purchase of a particular toaster model. The system determines, based on various criteria such as pricing, shipping, country, and so forth, a merchant website that offers that toaster model. The user has never registered or made a purchase at the merchant website offering the toaster for sale. Thus, if the user were to buy the toaster from that merchant website, the user would have to place the toaster in a virtual shopping cart, then enter personal information such as address, credit/debit card information, user name, password, and so forth to have the item shipped.

The system, in one aspect, can identify the merchant site based on the input provided via the unified input field or can initiate the process directly from the merchant site independent of a search to arrive at the merchant site. Then the system can navigate to the state in the merchant website where the user would normally click to place the item in the shopping cart. In this case, however, the system will navigate to the merchant website where the item can be placed in the shopping cart and determine that the user is not registered with this merchant website. Then the system can automatically communicate with the merchant website, such as via a new user registration page, or an API, to create a new account on behalf of the user using the user data available to the system and/or to the browser. Thus, the system can present to the user just the confirmation in a button to purchase via one click. The confirmation can be a double confirmation of authorization to create a new account and authorization to then place the order using the new account. The user can automatically authorize new registrations and can establish settings or preferences governing new profile registrations. The system can then enter all the necessary data, retrieved from the browser or some other location, to complete the registration and cause the item to be purchased and shipped without the need of further user input. This approach can turn non-one-click purchasing websites into one-click purchasing websites, via input through the unified input field. The system can also use the registered payment information to process the payment as well and coordinate with the merchant site for filling the order. The process of obtaining payment data through the API for automatically providing payment and/or delivery data can also occur simply between the merchant site and the browser through the API. The merchant site, at the appropriate state in which the user may make a purchase, can submit a request through the API for payment data which can be provided as stored by the browser or agent for simplifying the purchasing process. The data can also be provided from the browser to the merchant site via a tokenized process to protect payment account information. The interface the user views can be a combination of merchant information (picture of the product, reviews, other date) as well as a "buy now" or "buy through google" or "Android Pay" type of button which is provided via the API to the graphical interface.

In one aspect, the system stores whatever information is necessary to use the payment request API on the user device. For example, when a user adds a debit or credit card to a payment mechanism, the account information is encrypted and sent to a network server. The server(s) then link up with the user bank to verify the information. The bank can create an encrypted device account number that is transmitted back to the servers and stored on the secure element in the user device. The secure element can be embedded in a near field communication (NFC) chip on a device. This number is completely unique to the user device and to the credit and debit cards (or cryptocurrency or other forms of payment) associated with it. For example, a secure element can store a private key which is accessed and used to sign a transaction from a giver to a recipient (from and to their respect wallets) all within a social media entity, i.e., without leaving the social media entity.

When the user makes a purchase through use of the API, the secure element (which is a security chip) creates a unique code and sends that, along with the device account number, to the payment terminal in place of the card number. The card information, in one aspect, is not stored on the user device or in the servers and it may not be backed up to a cloud provider. The unique code is transmitted through the API to the merchant site for processing the payment. Thus, according to this aspect, the information stored on the user device may not specifically be the payment account number but is a particular account number which is associated with the payment account number of the user. The data could be a private key or any data used for a cryptocurrency payment or other blockchain-based transaction or act. The end result is the same as if the device transmitted the account number to the merchant site or application for payment. With some service providers, the device account number is used to identify the credit card or debit card used for the payment. The secure element can be used to store any private data such as private keys for cryptocurrency transactions, medical data, personal data, location data, future plan data, passwords, and so forth.

Figure 11:
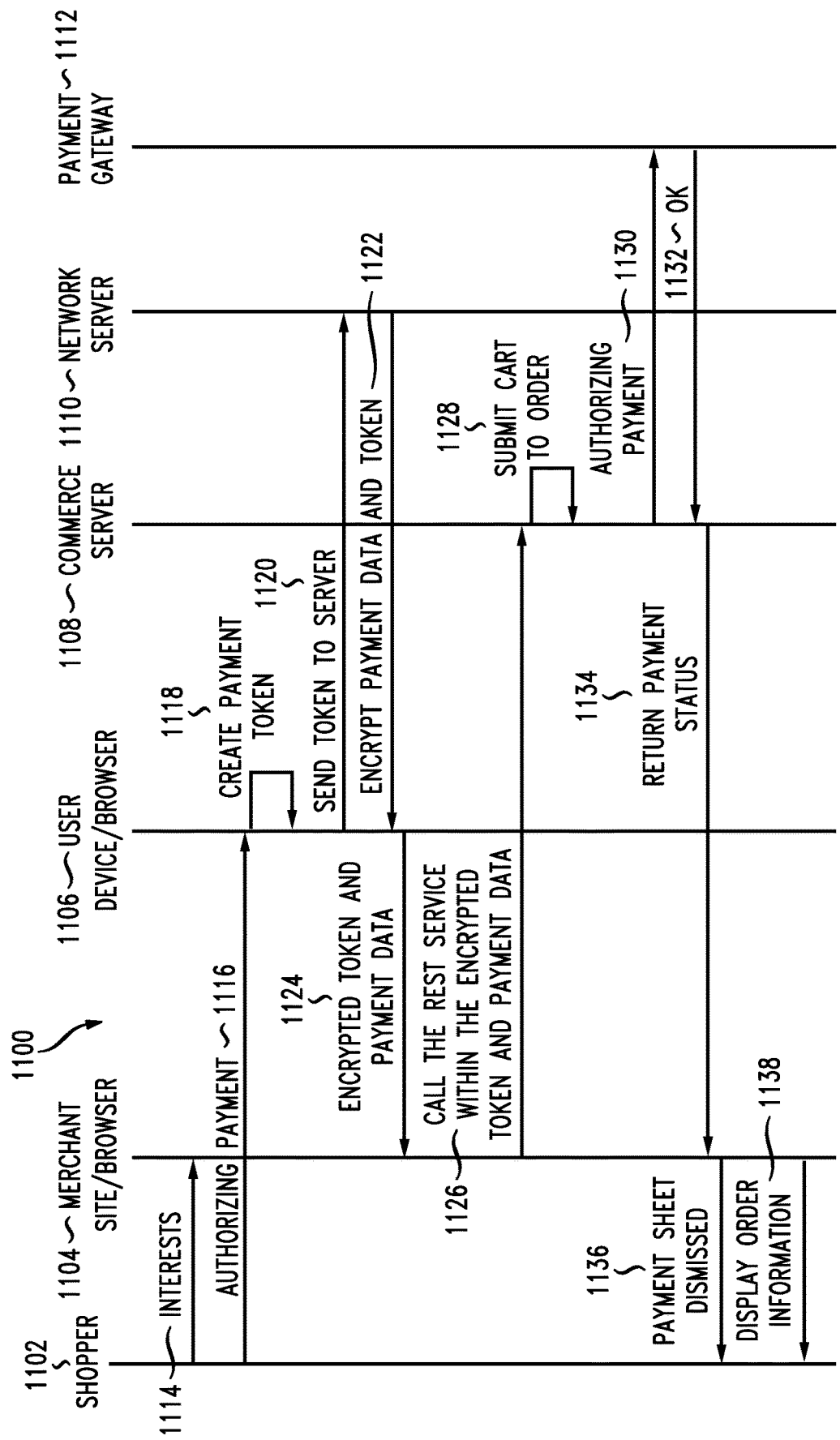
FIG. 11 illustrates signal processing with the payment request API.

Processes using the API shall be discussed in the next three figures with traditional processing of tokens or standard payments followed by a cryptocurrency example. FIG. 11 illustrates a tokenization process 1100 for use with the payment request API. When using a tokenized process, a merchant 1104 may need several pieces of information to be able to process the received token from the API. A merchant may need a unique identifier that represents a merchant associated with the payment process. The merchant may need a payment processing certificate that is used to securely transfer payment data. Network servers 1110 can use the payment processing certificates public key to encrypt the payment data. The merchant may use a private key to decrypt the data when processing the payments or the token information. A merchant identity certificate or a transport layer security certificate can be used to authenticate a merchant session with network servers. This process will be illustrated in more detail next. A merchant can also be a person receiving a payment in a social media application or entity.

As is shown in FIG. 11, merchants or applications 1104 will interact 1114 with a user or a shopper 1102 as the user navigates through the site. Once the user decides to make a purchase, they may click on a buy button and authorize a payment process to initiate. This can also include a touch ID such as a fingerprint to authorize payment 1116. Such capabilities can be enabled in Xcode. As noted above, the merchant 1104 has, in one aspect, registered a merchant ID and created a payment processing certificate, which is a cryptographic key that is used to securely send payment data to the merchant server. The clicking of a buy button and providing fingerprint authorization to process a payment can involve a single step or can involve multiple steps. These processes can also be applicable to users of a social media entity who can give and receive payments.

To initiate a payment, the merchant application creates a payment request to submit according to the payment request API protocol between the merchant 1104 and the browser 1106. This request can include the subtotal for the services and goods purchased, as well as any additional charges for tax, shipping, or discounts. The merchant can pass this request to a payment authorization view controller, which displays the request to the user and prompts for any needed information, such as a shipping or billing address. A delegate can be called to update the request as the user interacts with the view controller 1114. This can also include requests for size information, color preferences, social media data like birthday information, or any other information that can relate to the purchase.

As soon as the user authorizes the payment 1116, payment information can be encrypted to prevent an unauthorized third party from accessing it. In one aspect, the payment request can be sent to a secure element (such as the secure element used on iPhones to enable Apple Pay with near field communication at a merchant site), which is a dedicated chip on the user's device 1106. The secure element adds the payment data for the specified card and merchant or recipient, creating an encrypted payment token 1118. It then passes 1120 this token to network servers 1110, where the servers reencrypt the token using the merchant payment processing certificate 1122. The servers 1110 transmit 1122 the reencrypted token back to the user device 1106. The reencrypted token represents a second token that is prepared to be transmitted to the merchant site 1104. Through use of the API, the user device 1106 sends the encrypted token and/or payment data back to the merchant site 1124 for processing. Other data requested can also be transmitted via use of the API back to the site, such as shoe size, shirt size, pant size, color preferences, style preferences, etc. Multiple different calls to the API can be made in the process at different stages. For example, several steps prior to a payment request being made, the merchant site might want the size information so that the user does not have to click "X" or "XL" or "M" for a shirt size. Furthermore, body models are being generated for the human body. Data for the user can be stored in a body shape model at the browser or accessible by the browser. If the user is looking for clothes online, data about their body model could be retrieved via a API and transmitted to the site which can adjust the presentation of clothing for that individual. They could also include data for other individuals such that as the user interact with the site, the site could say is this for you or your sister, or your wife and their body model data could be transmitted such that the clothing could be tailor to the right person. Views of clothing items could then be modified for that body model.

Similar processes will occur when a cryptocurrency wallet is integrated into a social media application or website to enable purchases of products or transfers of value between users.

In another aspect, a body model, clothing data, for a user and/or other individuals associated with the user, or other individuals in general, could be passed to a social networking site. For example, a user searching Pinterest for an address might be able to view dresses as they would be presented for the user, or somebody that the user is shopping for. Buttons could be presented to the user also, which could enable them to toggle between the dress as it was originally posted by a posting entity and how the dress would look according to the body model that is chosen. An algorithm could be applied such that posting entities could simply post clothing, or any item that has a sizing component. The algorithm could analyze the item and make appropriate adjustments according to an individualized body model such that the user could then get a sense of how that dress or other item would look according to the chosen body model. If the user is shopping for their sister or wife or husband or any other individual, the user could access that person's body model and shop on a social media site, such as Pinterest. For example, find an appropriate item, and then click on the interactive button or interact in any other mechanism such as speech, and see how that item would be worn by the recipient. Then the buy action could be completed to purchase that item. Such an approach could be used on Facebook, Instagram, Twitter, any social networking site, or any other site, such as a merchant site as well. It could also be applied to any object that has a sizing or color component. Thus, toys, cars, camping gear, recreational vehicles, and so forth could all be processed in a similar manner to get a sense of a more tailored view of the product as it would be worn or used by recipient. If a mother was shopping for three of her children, multiple body models could be uploaded such that items could be viewed, such as jeans, and each individual person could have an individual button, presented such that the user could easily view how that object would be worn by the multiple individuals in the group. The user could even then make a group purchase of one pair of jeans for each of individual in the group. For example, a customized button could be presented which is either a one click purchasing button for three pairs of jeans for each individual in the group or to add one pair of jeans for each individual into a shopping cart.

Integrating a cryptocurrency wallet into a social media site or application enables the simplified presentation of such buttons to request or make payments between users in a way that previously was not possible.

The merchant site 1104 then, as part of the payment process, can call a REST service (which is known by those of skill in the art for processing payments) or other similar service with the encrypted token and payment data 1126 which communicates the data to a commerce server 1108. The server 1108 submits the data 1128 and authorizes the payment 1130 to a payment gateway 1112. An "ok" signal 1132 is transmitted back to the commerce server 1108 which communicates 1134 a return payment status to the merchant site 1104. The payment, having been processed and confirmed, causes the merchant site 1104 to dismiss the payment sheet 1136 and display an order confirmation to the user 1138. These processes can also apply to a social media-based transfer of value.

In one aspect, the payment token is never accessed or stored on the network servers 1110 which are used to encrypt the payment data and token. The servers simply reencrypt the token using the merchant certificate. This process lets merchants securely encrypt the payment information without it having to distribute the payment processing certificate as part of the merchant application.

In many cases, the merchant site passes the encrypted payment token to a third-party payment solution provider 1108 to decrypt and process the payment. However, where merchants have an existing payment infrastructure, the merchant can decrypt and process the payment on their own server. Reading, verifying, and processing payment information can involve one or more cryptographic steps such as calculating an SHA-1 hash, reading and validating a PKCS #7 signature, and performing elliptic curve Diffie-Hellman key exchange. It is noted that the above approach represents an example tokenization process for use with the payment request API. A payment token object can include such data as a transaction ID, an amount of money, data about the product, information about payment network, payment token data such as a signature and a header which can include encrypted payment data, and an amount, a cardholder name, a CVV code, an expiration date, a payment account number, payment processing data, and address, other user preferences, cryptographic currency data, and so forth. Of course, other processes are contemplated as well for tokenization, which can add a layer of security to the process.

In another aspect, the browser may be operational on a first user device, such as a laptop computer, and the payment data may be stored on a second user device, such as a mobile device or mobile phone. The first user device and the second user device can communicate wirelessly through a protocol, such as the Bluetooth protocol. In some scenarios, the first device may not have a fingerprint identification option, while the second device does. In this scenario, while the user interacts via the first device with a browser which is configured to utilize the payment request application programming interface, the first device, as part of the payment process, will establish a communication with the second device such that the user can authorize the payment via a touch identification, and wherein the second device can be utilized for generating a payment token and communicating with a network server to receive a second payment token which is passed from the second device to the first device and through the payment request application programming interface to the merchant site for payment processing. In other scenarios, the first device includes a fingerprint recognition mechanism, and thus only a single device is needed for confirming authorization of the purchase. The browser can be any user interface used to view and navigate sites or applications. The browser API may also receive one or more of data about the product, the merchant, keys for encrypted communication, or any other information such that a payment process could occur separate from passing payment data through the API back to the merchant. For example, for security purposes, payment information may be communicated to a separate payment processor which can handle the payment so that payment data for the user is not provided to the site. However, the merchant still must deliver a product, so the browser API could have a separate payment processor process the payment but pass a user name and address delivery information to the site for delivering the product.

In yet another aspect which relates to processing from a browser or application standpoint, an example method includes presenting, on a graphical user interface, a presentation, the presentation being received from a site over a network, receiving, via the user interface and from a user, an interaction with the presentation, receiving, via an application programming interface between a browser and a merchant site, a request from the site for payment account data for the user and transmitting, to the site and via the application programming interface, the payment account data, or other data, wherein the payment account data can be used to populate payment fields for payment processing on the site. The data can be a token which can be used once for a payment and that maintains privacy of the account information. The payment account data may just be used by the merchant site for processing the payment and may not literally populate fields that otherwise would be manually populated by user input. For example, if payment data is received in a tokenized secure manner, the data may just be used to process a payment and not literally used to fill in pre-set graphical form fields. The presentation can include one of a product for purchase and a service. The method can include the site processing a payment for an item or a service using the payment account data for the user. The graphical user interface can be associated with a browser or an application. In one aspect the API that communicates data between the site (merchant site) and a browser that can store the payment account data for the user. This aspect covers the process from the standpoint of the browser that stores the payment/deliver data of the user and communicates that data via the API with the merchant site for populating the necessary fields (or an equivalent type of process) to create a one-click purchasing experience for the user who is on the merchant site.

The API can also be used to request body type, sizes, or a body model for the user for use in presenting clothing for purchase. In another aspect, the merchant site may determine whether the browser API is available through the browser being used to navigate the site. If so, then a browser API request can continue, and if not, the site proceeds with a standard input field approach for payment and address information. The approach also can be used for handling a transfer of value within a social media application or context and between accounts or cryptocurrency wallets of registered users of the social media application.

The method can further include updating the presentation to include a buy option which is configured, based on a confirmation from the user, to enable the site or application to utilize the payment account data received through the API to process a purchase of an item or service or receive a payment without a need of the user to fill in the payment fields on the site or for the transaction. The browser or other agent communicating via the API or other protocol can also provide the graphic for a "pay now" type of button to integrate with site graphics. The payment account data can further include one or more of address data for the user, a payment account number, an expiration date, a security code, a cardholder name and shipping instructions for the user.

The request through the API can further include one or more of a supported payment method for the site or application, a total amount value for a purchase, items that may be displayed for purchase, shipping options, payment modifiers, a request for a user email address, a request for a user's phone number, and a request to update information. A user agent similar to or separate from the browser can communicate the payment account data between the application programming interface and the site or application.

In another aspect, the method includes the concept from the standpoint of the site or application. The method in this context includes transmitting, for viewing on a graphical user interface, a presentation, the presentation being transmitted from a site over a network to a device having the graphical user interface or as part of an application, receiving, via the network and/or from a user, an interaction with the presentation, and transmitting, according to an application programming interface or other protocol when a wallet is integrated into an application, a request for payment account data of the user. The application may be making a request to a built-in or integrated wallet of a giving user. The method can include receiving, at the site and via the application programming interface, the payment account data and populating payment data fields associated with a payment process with the payment account data for the user to yield populated payment data fields. The data fields may be associated with cryptocurrency data or fiat data of the recipient of the payment in a social media environment. The payment data may also be in a tokenized format for processing a payment in a secure way that does not reveal the user's account information. Partial account information (i.e., the last 4 digits of the account number) could be transmitted for presentation on a user interface to confirm which account to use. The site can process a payment for an item or a service using the payment account data for the user. The API can be used to coordinate data between the browser and the site wherein the browser stores the payment account data for the user. Upon receiving a confirmation from the user to make a purchase of an item or service associated with the presentation, the method can include processing a payment for the product using the populated payment data fields. In a cryptocurrency context, the recipient would be notified of a receipt of the cryptocurrency payment from the giver.

The method can further include, upon receiving the payment account data, updating the presentation to include a buy option or payment option which is configured, based on a confirmation from the user, to enable the site or application to utilize the payment account data to process a purchase of a product or service or make a payment without a need of the user to manually fill in the payment data fields on the site or for the recipient of the value. The payment account data can further include one or more of address data for the user, a payment account number, an expiration date, a security code, a cardholder name and shipping instructions for the user. The request can further include one or more of a supported payment method for the site, a total amount value for a purchase, items that may be displayed for purchase, shipping options, payment modifiers, a request for a user email address, a request for a user's phone number, and a request to update information. A user agent can also communicate the payment account data between the application programming interface and the site. In another aspect, a method includes presenting, on a graphical user interface, a presentation, the presentation being received from a site over a network, receiving, via the user interface and from a user, an interaction with the presentation, receiving, via an application programming interface, a request from the site for payment account data for the user, autopopulating a payment field associated with the presentation with the payment account data (or just using the data as necessary for payment processing) and transmitting, to the site and via the application programming interface, the payment account data, wherein the site can process a payment based on the payment account data for the user. The method can also include receiving a confirmation from the user of a purchase after the payment field is autopopulated.

The system can process the new registration pages silently, such as in a background tab or new window in the browser or can negotiate the new registration process with the merchant website without presenting the registration page to the user at all. The system can present a progress bar on the same page containing the unified input field after the user requests a purchase, such as by pressing enter after providing input via the unified input field. The progress bar can indicate to the user the progress of creating a new account, entering shipping data, adding the item to the cart of the merchant website, and placing the order.

The user can establish default preferences for which personal information to use for new registrations. The user can establish these default preferences in advance of encountering the merchant website, or even in advance of encountering the unified input field. Alternatively, at the first instance where a registration is required, the system can prompt the user to establish such settings and/or provide additional information.

The system can prefer merchant websites with which the user already has an account or with which the user is already registered. For example, if Merchant X and Merchant Y both offer the same item for sale, the system can choose to use the one of these two merchants where the user already has an account. The system can determine this by examining a browser history, profile data available to the browser, or cookies stored by the browser or by other browsers associated with the user. The system can intelligently determine when to use a merchant with which the user is not registered, such as based on a difference in shipping time, or a difference in price. For example, if the merchant with whom the user is not registered offers the desired item at a price that is at least 25% lower than the merchant with whom the user is registered, then the system can create a new account. If the user does not desire to have the system create user accounts on his or her behalf, the user can instruct the system to make purchases where he or she already has accounts, or at merchant websites which allow guest accounts.

However, the system can identify, using the classifier and user profile data, the merchants the user is most likely to select, and present them to the user for disambiguation. The system can present to the user a table, such as by a JavaScript popup, showing merchants, shipping times, and total price including shipping and tax. The user can simply click on a desired merchant from the table, and the system can automatically register the user with that merchant if necessary and process the order with that merchant. The user only has to make one click to identify the merchant, and the system handles the rest of the steps, thereby providing a one-click interface into a non-one-click website via the unified input field. The one-click type of experience can also be applied in the context of a social media entity in which parties are already corresponding or in a context of communicating (such as messaging) and a transaction can thus easily be performed.

Figure 12:
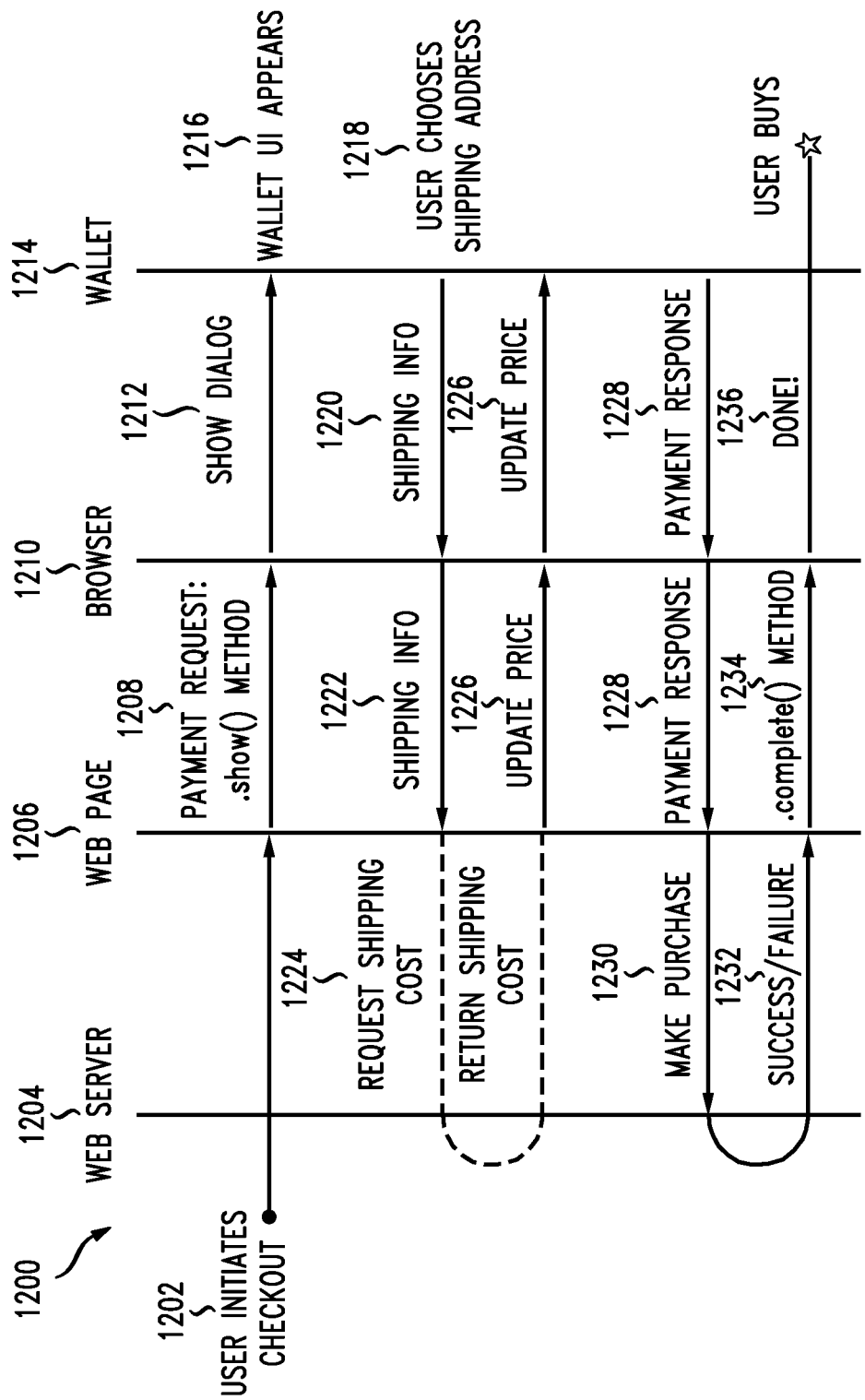
FIG. 12 illustrates further signal processing with the payment request API.

FIG. 12 illustrates another aspect 1200 of using the API for communicating payment data. After the user has navigated through a website and initiates a checkout process 1202, the webpage should create a payment request which is typically initiated when the user clicks the "buy" button. The payment request can include method data, details, merchant cryptocurrency wallet data, and options. The method data can include required payment method data that includes payment method identifiers, required transaction information, and optional information such as shipping or contact information that should be returned. In one aspect, the payment amount could be negative and the API could be used to process returns or discounts. Of course in this aspect, money would flow from the merchant site through use of the API to the user's digital wallet or payment account. In this aspect as well, the process could essentially be reversed where the user would initiate a payment request from the browser, an application or from a site and any aspect of this process could essentially be reversed where shipping information, discounts, any other data necessary, can be utilized to enable a refund to be processed. Tokens could be used and generated either on the browser/application side or the merchant/recipient side with account information and data for processing a return or a peer to peer payment. Return shipping information, extra charges, or any other data necessary to enable a user to return an item and receive a refund can be exchanged through the API in a similar manner as occurs when the user makes a purchase at a merchant site.

Continuing with FIG. 12, the payment request 1208, can initiate a "show" function 1208, which shows a dialogue 1212 for use as an interface for processing the payment. A user's wallet 1214, such as the Microsoft wallet, a cryptocurrency wallet 1214, payment information stored at a browser or other location, and so forth can be branded, integrated or utilized as part of user interface 1216. The interface could include part of the basic sale data and can in part include cryptocurrency data such as a recipient public key or bitcoin amount. In this example, the user chooses a shipping address 1218 through the interface.

The shipping information 1220 can be returned from the wallet to the browser or software module 1210 which is then passed to the webpage or application 1204 such that the webpage or application can request a shipping cost from a Web server which returns the shipping cost 1224 to the merchant who can then update the price 1226 which is passed to the browser 1210 and the wallet 1214. The user can choose a shipping address 1218 from the UI interface. A payment response 1228 is generated for the wallet to the browser 1210 which passes the payment response through use of the browser API to the merchant 1206 and wherein the user can make the purchase 1230. A success or failure signal 1232 is provided to the merchant who can then complete the process 1234 by informing the browser 1210, at which point the purchase or payment is complete 1236. While FIG. 12 does not specifically mention a tokenization process, various encryption technologies could also be used to encrypt data or tokenize the data such that the payment request or the payment response passed through the browser API could be a one-time use token which encrypts the various information needed to process one or more of a payment, a delivery of payment, and update of user information, and so forth. The process can also be applied to cryptocurrency transactions, although FIG. 13 provides cryptocurrency wallet transactions in more detail.

Figure 13:
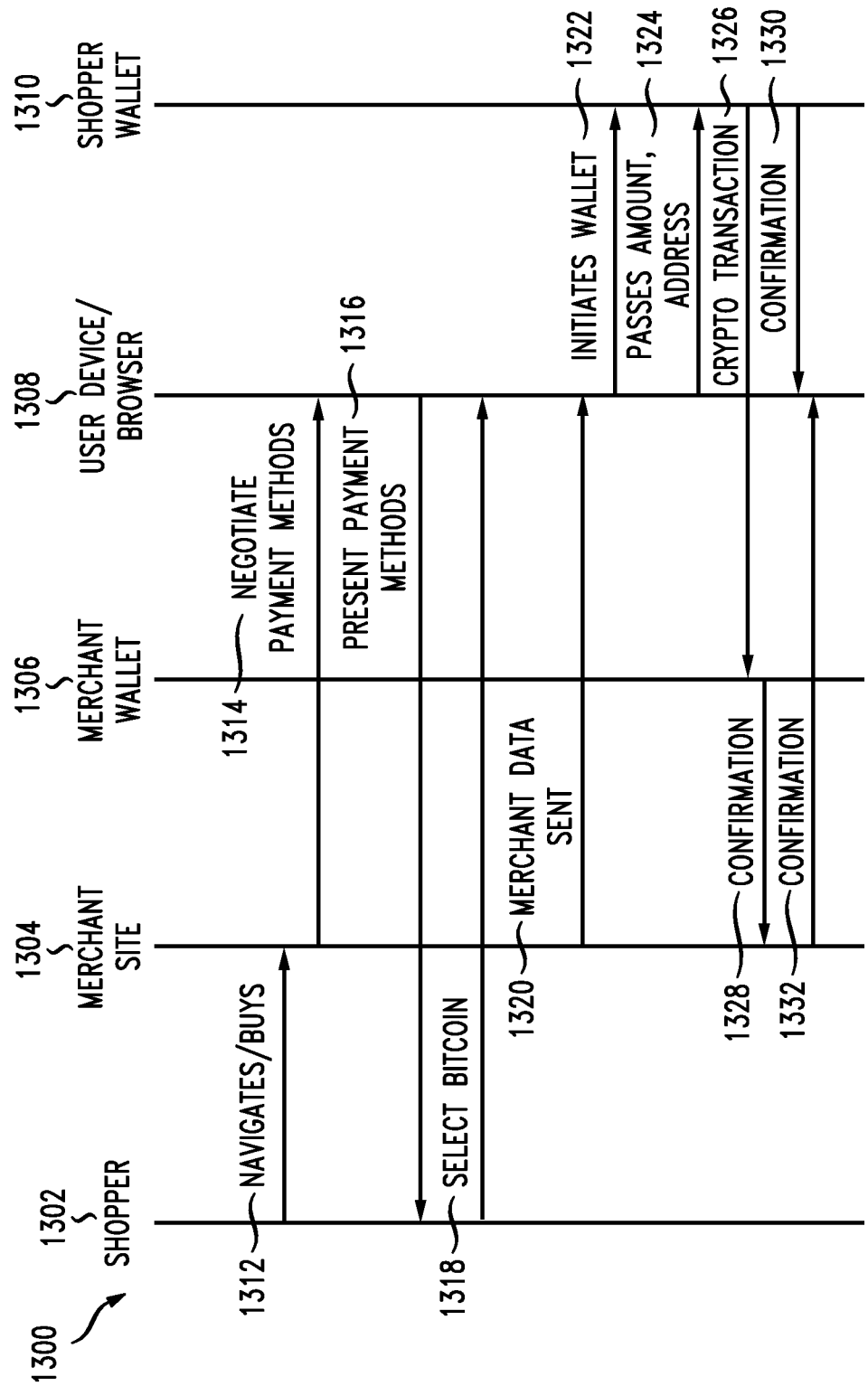
FIG. 13 illustrates signal processing for a cryptocurrency payment.

FIG. 13 provides some example processing for a cryptocurrency transaction, sale or payment via use of the API 1300. First, a shopper 1302 navigates through a merchant site 1304 and initiates a buying process 1312. The merchant site 1304 can negotiate payment methods, 1314 with the browser 1308 via the payment request API. In one example, the merchant site could indicate that it takes bitcoin, Paypal and visa. The browser 1308 can determine that the buyer can pay with visa or bitcoin. An interface can be presented 1316 to the shopper with the overlapping payment methods available at the merchant site 1304 and available to the user 1302. Assume that the user selects bitcoin 1318. Inasmuch as a cryptocurrency has been selected, the API can be used to initiate the necessary processes to enable the shopper wallet 1310 to be able to send the appropriate amount of bitcoin to the merchant wallet 1306. As part of the API, the merchant can send data 1320 identifying the recipient public key, email address, or other identifying data for the merchant wallet 1306. The browser 1308 can receive this data. The browser can initiate the shopper wallet 1310 in step 1322. The browser 1308 can transmit the amount associated with the purchase in dollars or cryptocurrency, the merchant wallet 1306 address, or any other necessary data to the shopper wallet 1310 in step 1324. The browser API can initiate the transaction from the shopper wallet 1310 such that the cryptocurrency transaction 1326 occurs and gets initiated on the Blockchain such that the crypto currencies transferred to the merchant wallet 1306. In an application context, the above processes apply to a wallet integrated into an application such as a social media messaging application, or a software module on a device that receives the requests for payment and provides a response.

Various confirmations can be communicated in order to finalize the transaction. For example, the merchant wallet 1306 can provide a confirmation 1328 to the merchant site 1304 that the cryptocurrency has been received. The merchant site 1304 can transmit a confirmation 1332 through the API to the browser 1308 which can present a confirmation to the user via a user interface. The shopper wallet 1310 can provide a confirmation to the browser 1330 as well. Other communication such as texts, emails, social media, notifications, and so forth could be also initiated based on the confirmation that the cryptocurrency transaction has been implemented. Other communications could also be initiated when the peer-to-peer mining process is complete and the cryptocurrency transaction is added to a blockchain. Depending on the type of cryptocurrency transaction, the timing necessary to carry out the transaction, and so forth, the present disclosure embodies all the variations on cryptocurrency processing and communications to and from respective wallets and to and from the merchant site or recipient, and to and from the user device or the browser visit, via the API or secondary API. The shopper wallet 1310 can be considered to be a local app on the user device 1308 which can be initiated as instructed by the API, can be integrated into an application, or can be a network-based wallet which receives a communication from the API 1308 or secondary API, which navigates to the online wallet, logs into the online wallet, transmits the necessary merchant data and transaction data to the online wallet, and virtually clicks "confirm" to initiate the transaction, all based on a "pay" confirmation via the payment request interface, such as is shown in FIG. 3. Any manual interaction that is traditionally needed to send or receive cryptocurrency can be managed via the payment request API and triggered from a simplified one-click type of interface or fingerprint, or voice authorization via a payment transaction process.

The entire goal of the payment request API is to eliminate the need for checkout forms, to reduce clicks, and to streamline the payment transaction process. With respect to cryptocurrencies, the same streamlining and form filling can occur through the payment request API modified for a cryptocurrency transaction between cryptocurrency wallets. The basic process can also apply to wallets integrated into applications such as social media applications. Accordingly, any such action that needs to be taken manually in order for a user to transfer a cryptocurrency from their cryptocurrency wallet can be handled via an instruction from the payment request API with the browser, software module, or application acting as the agent with the necessary stored information, or received information via the API for populating necessary data fields. In one scenario, a token or transaction identification needs to be communicated to a cryptocurrency wallet which identifies the sender and any other data associated with the transaction such that the cryptocurrency wallet can recognize or expect the cryptocurrency payment. As can be appreciated, this process will simplify and enable a much easier cryptocurrency payment process.

Figure 14:
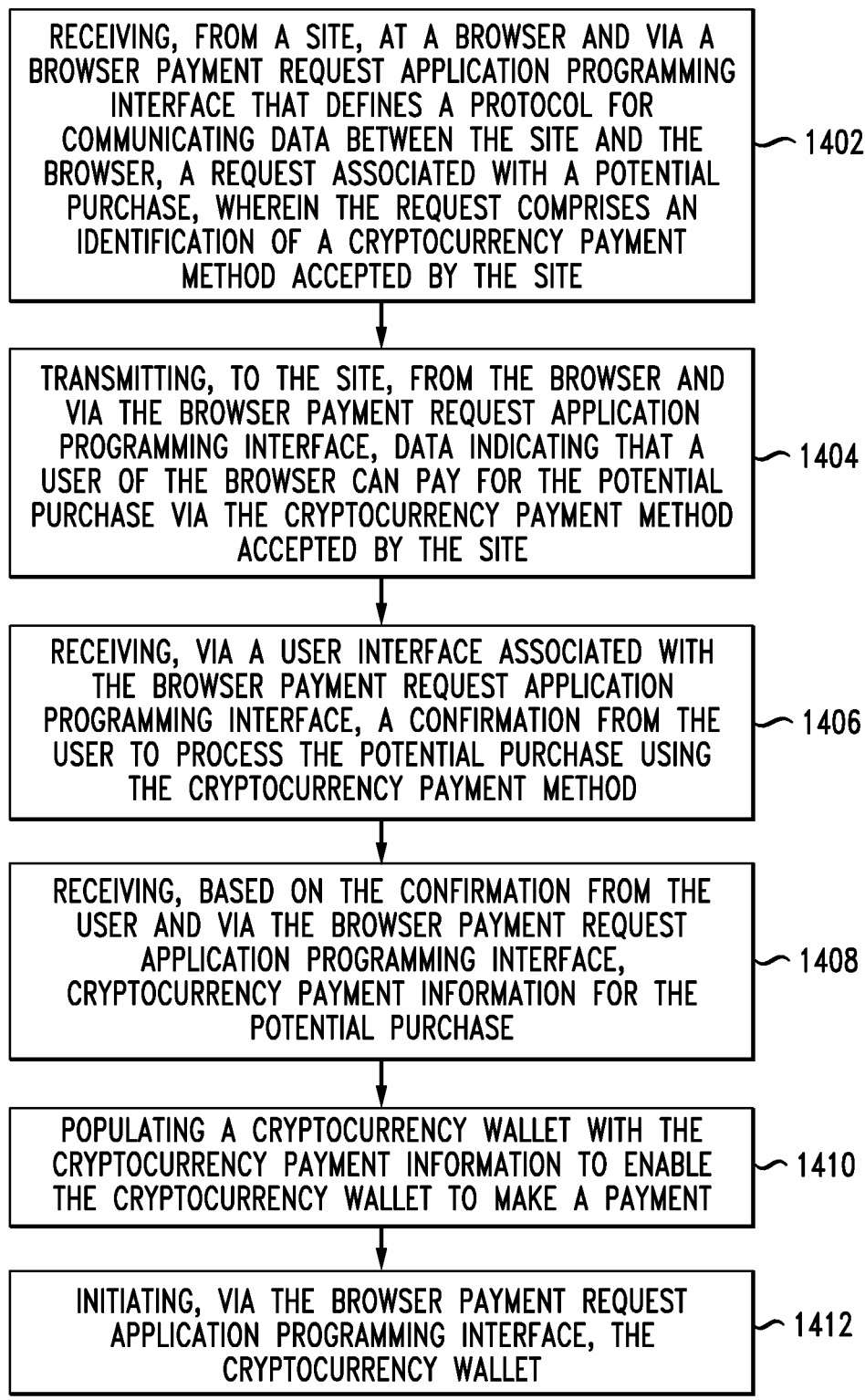
FIG. 14 illustrates another method example.

FIG. 14 illustrates a method example. The example method is typically practiced by the browser or device that operates the browser. The method can also be performed within an application that has an integrated cryptocurrency wallet. This method is discussed from the standpoint of that device, an application or that browser that's been programmed with an application programming interface to be able to present the payment experience for the user that is similar to an Amazon one click purchasing experience without the need of manually entering in payment information including cryptocurrency data into a cryptocurrency wallet. A method includes receiving, from a site or an application, at a browser and via a payment request application programming interface that defines a protocol for communicating data between the site and the browser or from within the application, a request associated with a potential purchase or payment, wherein the request includes an identification of a cryptocurrency payment method accepted by the site or application (1402), transmitting, to the site, from the browser and via the payment request application programming interface, data indicating that a user of the browser or application can pay for the potential purchase via the cryptocurrency payment method accepted by the site (1404) and receiving, via a user interface associated with the payment request application programming interface, a confirmation from the user to process the potential purchase using the cryptocurrency payment method (1406). The processes can occur within a social media entity which can receive the confirmation from one user that desires to pay another user an amount of money or a value associated with something like a cryptocurrency. The cryptocurrency could also be a bridge currency between fiat currencies that are paid by the payer and received by the recipient and wherein the social media entity manages the exchanges between currency types.

The method further includes receiving, based on the confirmation from the user and via the payment request application programming interface, cryptocurrency payment information for the potential purchase (1408) and populating a cryptocurrency wallet with the cryptocurrency payment information to enable the cryptocurrency wallet to make a payment (1410). Other steps can include initiating, via the payment request application programming interface, the cryptocurrency wallet (1412).

The browser, acting as an agent between the cryptocurrency or wallet, the user, and the merchant site such that it's programming as well as the programming of the site and the programming of the cryptocurrency wallet are modified so as to enable automatic or automated initiation and population of data fields and initiation of a cryptocurrency transaction. The cryptocurrency payment information can include at least one of a site address for receiving the payment, a private key of a buyer, a public key of a recipient, an email address, recipient identification information, a payment amount, and a user comment. Any other data necessary to populate a cryptocurrency wallet for initiating the payment or the recipient cryptocurrency or wallet for receiving the payment. The browser can act as the agent between any entity or wallet necessary to achieve a cryptocurrency payment. For example, having received the confirmation from the user via a payment request application programming interface, the browser can receive, via the API the recipient wallet identification data, the cryptocurrency amount, and can initiate a buyer cryptocurrency wallet and utilize that data to populate the necessary fields of the buyer cryptocurrency or wallet and initiate the transaction on the blockchain. Depending on the type of wallets used in the transaction, the application programming interface can also communicate with the site or application which can initiate the recipient cryptocurrency wallet and, if necessary, interact with the recipient cryptocurrency wallet to receive the payment. If necessary, a transaction identification can be utilized to coordinate the transfer of cryptocurrency.

The cryptocurrency wallet can be stored locally on a device that is running the browser or can be web-based. The wallet can be stored in a secure element or secure memory component separate from other memory and thus more secure. The data can be tokenized or encrypted as well. The wallet can be integrated into an application like a social media application. The basic interactions disclosed herein will essentially be the same whether the wallet is stored locally or is web-based. When the cryptocurrency wallet is web-based, the method can further include transmitting the cryptocurrency payment information to the cryptocurrency wallet via an application programming interface for processing the payment. This can be the payment handler API, or any other API. The request can identify a supported payment method used by the site in addition to the cryptocurrency payment method. For example, the request may indicate that the site accepts bitcoin, Visa and Apple Pay.

The cryptocurrency payment information can include a private key that is used to sign a transaction with the cryptocurrency wallet. The method can further include transmitting, via the payment request application programming interface, data to the site for use by a site cryptocurrency wallet to receive the payment.

The cryptocurrency payment information can be stored at the browser, accessed by the browser from a separate entity, received from the site via the payment request application programming interface, received from a third party, or delivered to the site from the third party as instructed by the browser. In another aspect, when the cryptocurrency payment method is selected by a user for a purchase, the method can further include generating a blended user interface via the payment request application programming interface or other protocol which blends a payment interaction interface and a cryptocurrency wallet interface for use by the user to confirm the payment. In this aspect, the blending of the wallet with the user interface is helpful because of the functionality which is implemented for cryptocurrency payments. One blended example is a social media application with an integrated wallet. Inasmuch as users have their own cryptocurrency or wallets with respective user interfaces for making payments, providing a blended interface which utilizes some aspect of a cryptocurrency wallet with the standard payment request API interface reduces or simplifies the payment process for cryptocurrency payments. In another aspect, the payment request API (of software module/browser participating in the payment process) could slide up or present a cryptocurrency wallet payment interface which is pre-populated with the site or app identification information, the cryptocurrency amount, and positioned in a state in which the user can simply click or state that they confirm the cryptocurrency payment. The graphical information associated with the look and feel of the cryptocurrency wallet interface can be stored in the browser and presented as part of the payment request API such that it looks the same as the user's cryptocurrency wallet interface. The browser, acting as the agent, could then communicate the confirmation, and the cryptocurrency payment data to the wallet, stored locally or web-based, and initiate the actual transaction on the actual wallet.

Figure 15:
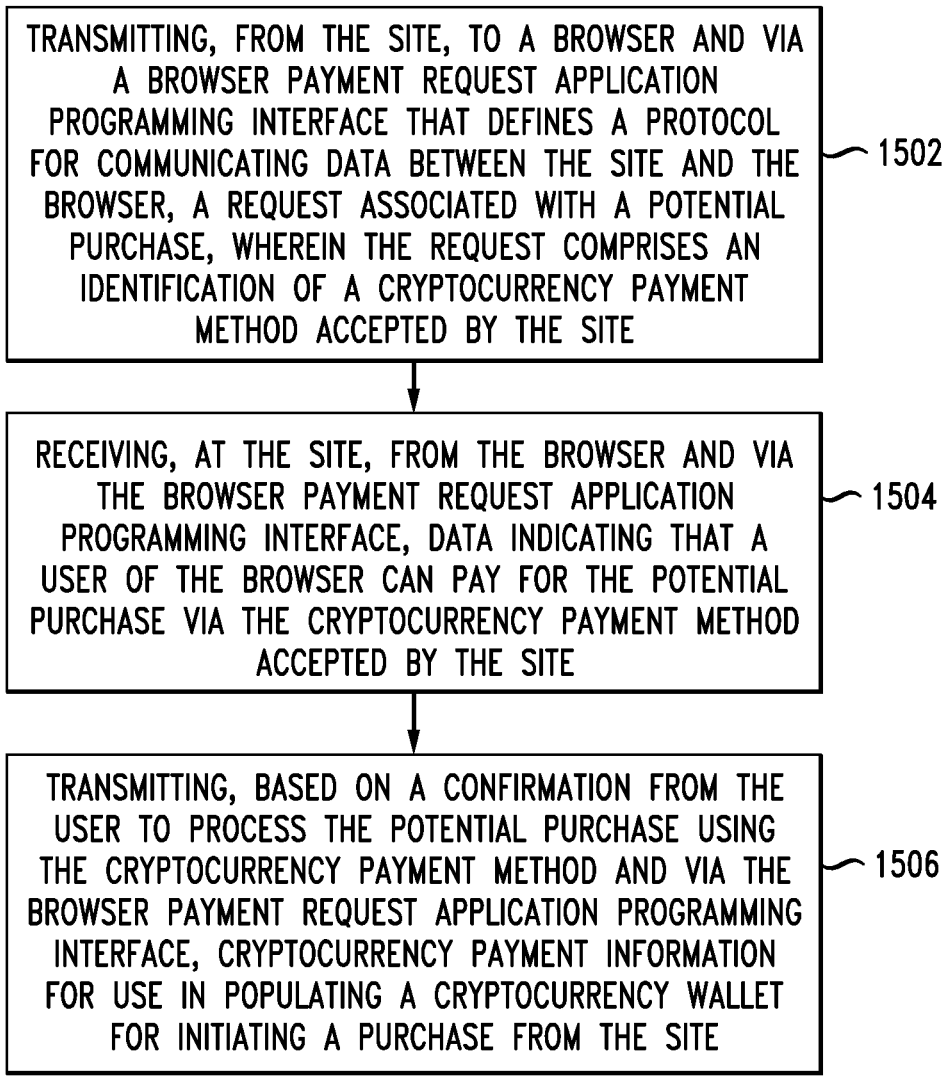
FIG. 15 illustrates another method example.

FIG. 15 illustrates the method from the standpoint of the site. A method can include transmitting, from the site, to a browser and via a payment request application programming interface that defines a protocol for communicating data between the site and the browser, a request associated with a potential purchase, wherein the request includes an identification of a cryptocurrency payment method accepted by the site (1502), receiving, at the site, from the browser and via the payment request application programming interface, data indicating that a user of the browser can pay for the potential purchase via the cryptocurrency payment method accepted by the site (1504) and transmitting, based on a confirmation from the user to process the potential purchase using the cryptocurrency payment method and via the payment request application programming interface, cryptocurrency payment information for use in populating a cryptocurrency wallet for initiating a purchase from the site (1506). The site can be an application and the browser can be an agent or software module operating on a device that communicates via an API with the application. Where the wallet is integrated into the application, similar communications within the application context can occur, whether by an API or other protocol.

Receiving the cryptocurrency payment information further can include receiving a cryptocurrency payment at a site cryptocurrency wallet from the cryptocurrency wallet. The cryptocurrency payment information can include at least one of data that identifies the site cryptocurrency wallet and an amount.

When the cryptocurrency payment method is selected by a user for a purchase, programming of the system or the method can perform an additional step of generating a blended user interface using, in one example, the payment request application programming interface which blends a payment interaction interface and a cryptocurrency wallet interface for use by the user to confirm the payment. Such integration can enable objects associated with transactions that can be made using the cryptocurrency wallet to be presented in an application user interface, and can enable access of data related to givers and receivers of value to be pre-identified, chosen by a giver, or determined based on a communication context like an existing messaging dialog. The application can leverage the existence of a messaging dialog to easily enable one person to pass value to the other, or for one person to request value from one or more other people.

Figure 16:
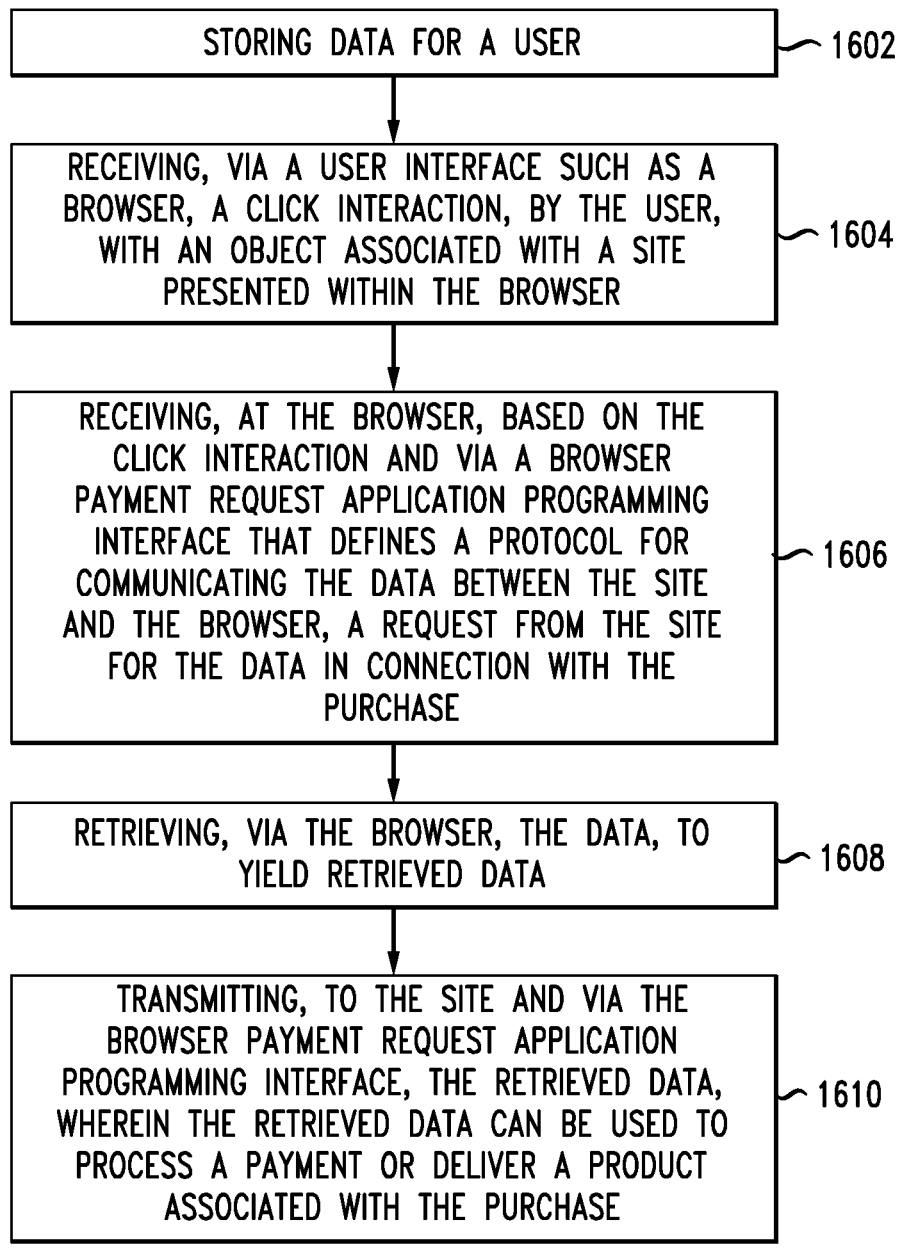
FIG. 16 illustrates another method example.

FIG. 16 illustrates a method example related to the API. The method can be performed by a browser and include steps of storing, in a non-transitory storage medium of a user client device, payment data for a user (1602). In one aspect, the payment data can include any one or more of address information, payment account information, a date of expiration, a CVV code, a token or code which can be used or encrypted for providing a payment token for use by a merchant, user delivery preferences, user size information for clothing, private key information for a cryptocurrency wallet, other cryptocurrency data, passwords and so forth. Any data related to processing a purchase can be included in payment data. The payment data is typically not being associated with any specific site but can be used across multiple sites. Any security mechanism can be implemented to ensure safe communication of payment data or modified payment data to the site for processing a purchase. User size information could also be tokenized when communicated via use of the API. When the purchase occurs via the application programming interface between the social networking site and the merchant site, the social networking site can transmit payment data through the application programming interface such that the merchant site can process the purchase of the product.

The method can include receiving, via a user interface such as a browser or application, a click interaction (or voice, or gesture interaction), by the user, with an object associated with a site presented within the browser or an object presented within the application (1604), the interaction indicating a user intent to make a purchase or perform any transaction and receiving, at the browser or application, based on the click interaction and via a payment request application programming interface (when this applies) that defines a protocol for communicating the payment data between the site and the browser, a request from the site for the payment data in connection with the purchase (1606), retrieving, via the browser or application, the payment data (or a version of the payment data that is tokenized or encrypted for security), to yield retrieved payment data (1608) and transmitting, to the site and via the payment request application programming interface, the retrieved payment data, wherein the retrieved payment data can be used to process a payment or deliver a product associated with the purchase (1610). In one aspect, the browser can also interact with another server which can also process payment data such as generating a token that is passed back to the browser for communication to the merchant site. FIG. 16 represents a more traditional payment request application programming interface approach, but can also apply to cryptocurrency payments as well. For example, where a wallet is integrated into a social media application, the social media application can manage the presentation of objects associated with the cryptocurrency wallet, receive interactions from a user, identify givers and recipients based on registered users with the application and communication contexts, and manage simple transfers of value between users all within the social media application.

Figure 17:
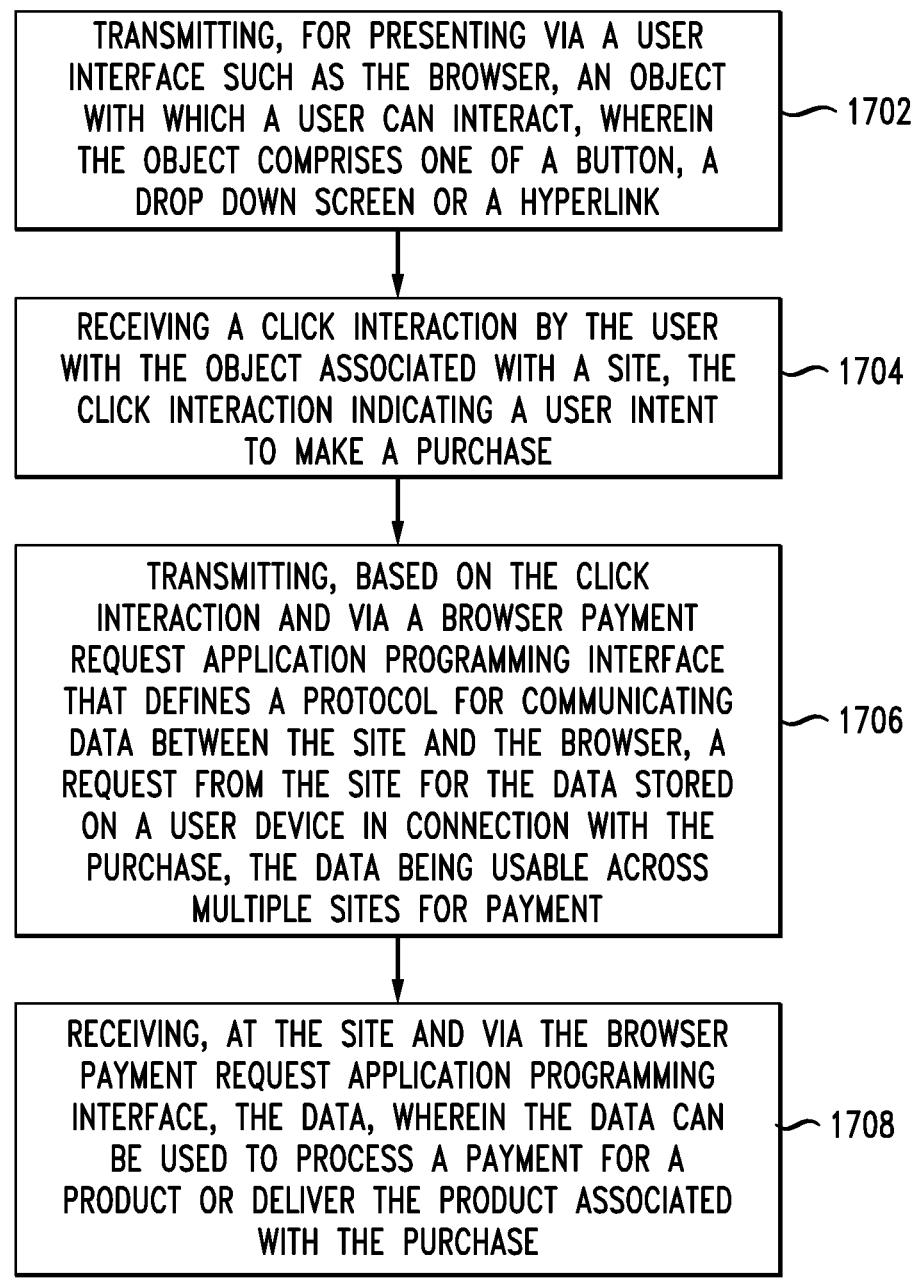
FIG. 17 illustrates another method example.

FIG. 17 illustrates a process from the standpoint of the merchant site or application. In this case, the method can include transmitting, for presenting via a user interface such as the browser, an object with which a user can interact, wherein the object includes one of a button, a drop down screen or a hyperlink (1702). In one scenario, the user can interact with the system via voice, gesture or other multi-modal interaction. The method can include receiving an interaction by the user with the object associated with a site, the interaction indicating a user intent to make a purchase (1704), transmitting, based on the interaction and via a payment request application programming interface that defines a protocol for communicating payment data between the site and the browser, a request from the site for the payment data stored on a user device in connection with the purchase, the payment data being usable across multiple sites for payment (1706) and receiving, at the site and via the payment request application programming interface, the payment data (or secure data such as a token based on the payment data), wherein the payment data can be used to process a payment for a product or deliver the product associated with the purchase (1708). The merchant can submit the payment data or information received to a payment processor for processing the purchase.

As is noted above, in a cryptocurrency aspect of the process, the merchant sites must provide identification information for its cryptocurrency wallet. Thus, through the payment request application programming interface, the user can select a cryptocurrency for use in making the payment and be presented with a cryptocurrency amount for confirmation. Either before or after confirmation of the purchase, the sites will communicate via the application programming interface, its wallet identification data such as a public key or an email address, or other identifying data. The application programming interface can enable the browser to act as an agent between the site, the user, and one or more of the cryptocurrency wallet that needs to take actions in order to accomplish the cryptocurrency transfer. In one aspect, the application programming interface utilizes the data obtained from the user interaction and receives, from the site, data to initiate a buyer cryptocurrency wallet, populate automatically the identification information for the recipient wallet, the cryptocurrency amount, and initiate the transaction on the blockchain. If the transaction amount is identified in dollars, then, a dollar amount can be used to populate the buyer cryptocurrency wallet which can then confirm the corresponding cryptocurrency amount for use in the transaction. In a social media context, the recipient can be similar to the merchant site and a giver can be the buyer or person purchasing a product. The application can integrate transactional objects associated with cryptocurrency wallet functionality into the application such that a blended interface can easily enable transactions all within the context of the application and without needing to transition to a separate wallet or site for making a cryptocurrency event.

Figure 18:
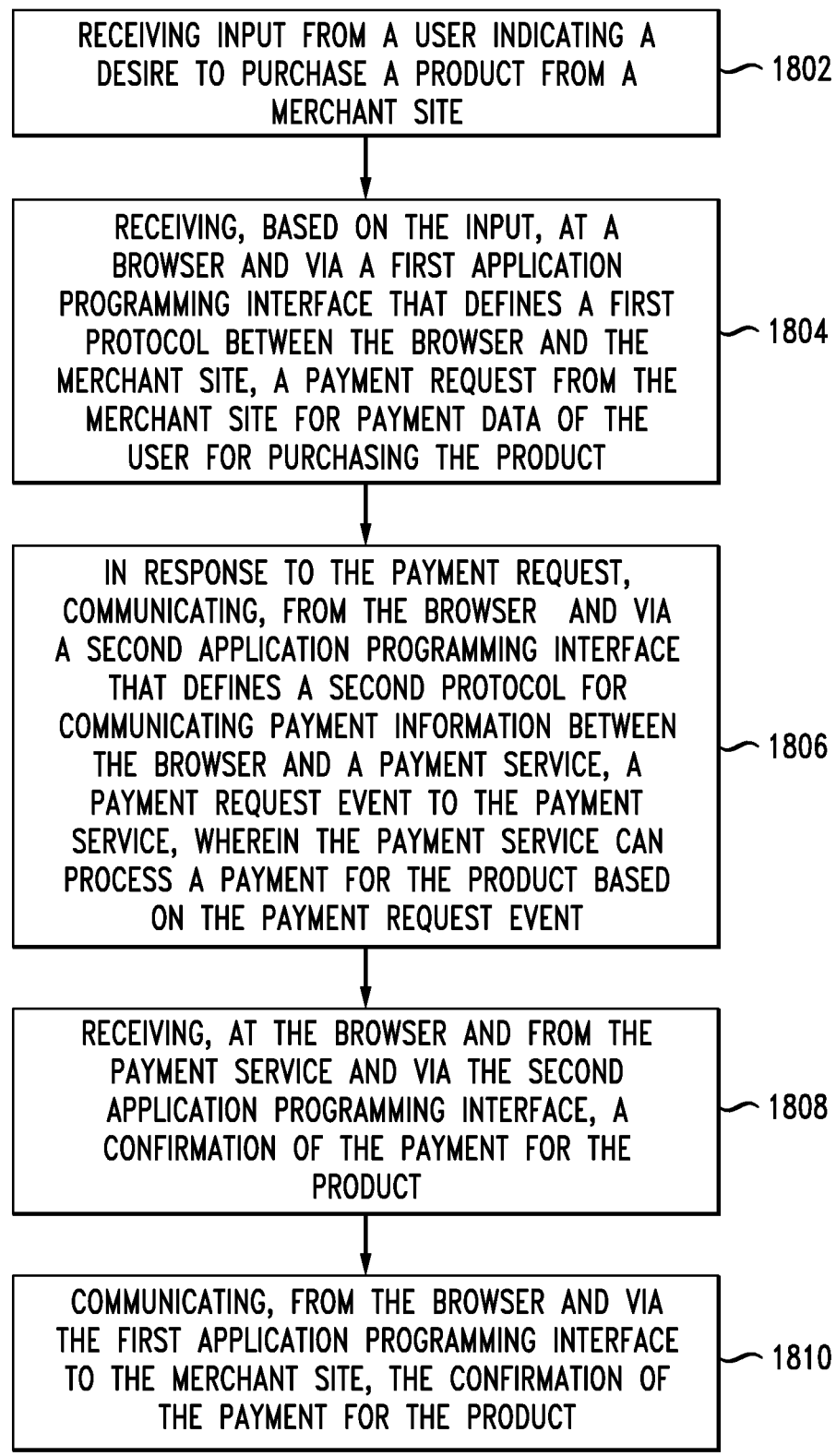
FIG. 18 illustrates another method example.

Another aspect disclosed herein relates to the coordination between a first API and a second API, both of which interface with a browser, software module or application in a correlated way to manage a payment process. The approach enables purchasing on a site or application to be more like an Amazon.com "one-click" purchasing experience when the user is not registered and does not have an account at the site. In some cases, a user can have a Paypal account or a cryptocurrency wallet that is local or web-based but they still must login to that account to make a payment. The coordination of the APIs, and the browser or software module, or application, acting as an agent between the site and the payment provider can simplify the purchasing process. A method in this regard is shown in FIG. 18 and includes receiving input from a user indicating a desire to purchase a product from a merchant site (1802). The input can be a click, voice input as part of a dialog, virtual reality input, or any kind of input. The method includes receiving, based on the input, at a browser and via a first application programming interface that defines a first protocol between the browser and the merchant site, a payment request from the merchant site for payment data of the user for purchasing the product (1804).

In response to the payment request, the method includes communicating, from the browser and via a second application programming interface that defines a second protocol for communicating payment information between the browser, agent or application and a payment service (such as Paypal, Amazon Pay, Bitcoin, Ethereum, or any other payment method), a payment request event to the payment service, wherein the payment service can process a payment for the product based on the payment request event (1806). The method includes receiving, at the browser, agent or application and from the payment service and via the second application programming interface, a confirmation of the payment for the product (1808) and communicating, from the browser, agent or application and via the first application programming interface to the merchant site or application, the confirmation of the payment for the product (1810). The payment can be simply from one person to another as well. The payment service can be a service like Paypal, a Google payment service, a cryptocurrency wallet or any other payment service or payment processor. The approach enables a common interface between the merchant and a payment service utilizing the browser, agent or application and several APIs in a new manner to simplify the purchasing process for users that are signed up for such a service or utilize such a service. When a cryptocurrency wallet is integrated directly into a social media application, similar steps can occur within the social media environment and to the wallet integrated therein.

In one example, the cryptocurrency wallet is built in or integrated into an application. In such a case, the first API might be an internal communication from a messaging dialog between two users of the application and a cryptocurrency wallet. The application might handle the basic processes identified above where a communication is made regarding a confirmed transaction within the application, such as a user interacting with an object to confirm a transfer of value to another user of the application. An API could be developed between the application and a cryptocurrency wallet or separately to a blockchain network to enable the recordation on the blockchain of a transaction or transfer of value from one user to another user. Thus, the discussion herein related to the use of a browser and the various APIs can also apply for functions occurring within an application that has integrated a cryptocurrency wallet.

The first application programming interface can define the first protocol for communicating at least one of payment data and address data between the browser and the merchant site. The second application programming interface can include the second protocol for communicating data associated with payment of the product between the browser and the payment service. The payment request further can include a request for an address of the user and/or for other data associated with the user or associated with the purchase. Thus, the payment could be performed by the payment service provider and the address could be provided by the browser through use of the first API.

The method can further include, based on the payment request, transmitting from the browser and through the first application programming interface, the address of the user to the merchant site for use in delivering the product to the user. The first application programming interface can include a payment request application programming interface in that it involves a request from the merchant site for payment data and/or other data associated with the user. The second application programming interface can be called a payment handler application programming interface in that it more specifically involves payment handling by the payment processor. This aspect of the disclosure can also have examples from the standpoint of the merchant as well as from the standpoint of the payment processor. In a social media context, where different users are registered with the social media entity, similar processes can occur in order to enable an easy payment from one user to another, all while remaining within the social media environment.

In one scenario, where the payment services a cryptocurrency wallet, the necessary information from the browser, agent or application via the second API can be communicated to the cryptocurrency wallet. For example, typically the cryptocurrency wallet, in order to initiate a transaction, needs the recipient wallet identification data such as a public key or an email address, or other identifying data. The cryptocurrency amount needs to be provided. Other functional interactions can also occur such as logging into a web-based cryptocurrency wallet such as Coinbase.com, causing buttons to be clicked and functionality to be implemented via instructions from the application programming interface rather than the user manually logging in, entering data into the data fields, and interacting with the objects. The web-based services would be upgraded in the programming to be able to receive API calls just as any payment service would need to be upgraded. Thus, the browser can act as the agent between the merchant site, the user, and the locally stored or integrated cryptocurrency wallet or a web-based cryptocurrency wallet such that the user interaction in selecting a cryptocurrency and implementing a cryptocurrency payment via a payment request application programming interface, is as simple as possible. All other manual interactions that flow from confirming a bitcoin transaction can be performed automatically by the browser, agent or application via, for example where applicable, the application programming interfaces disclosed herein or other protocols within the application which perform the steps described herein.

Figure 19:
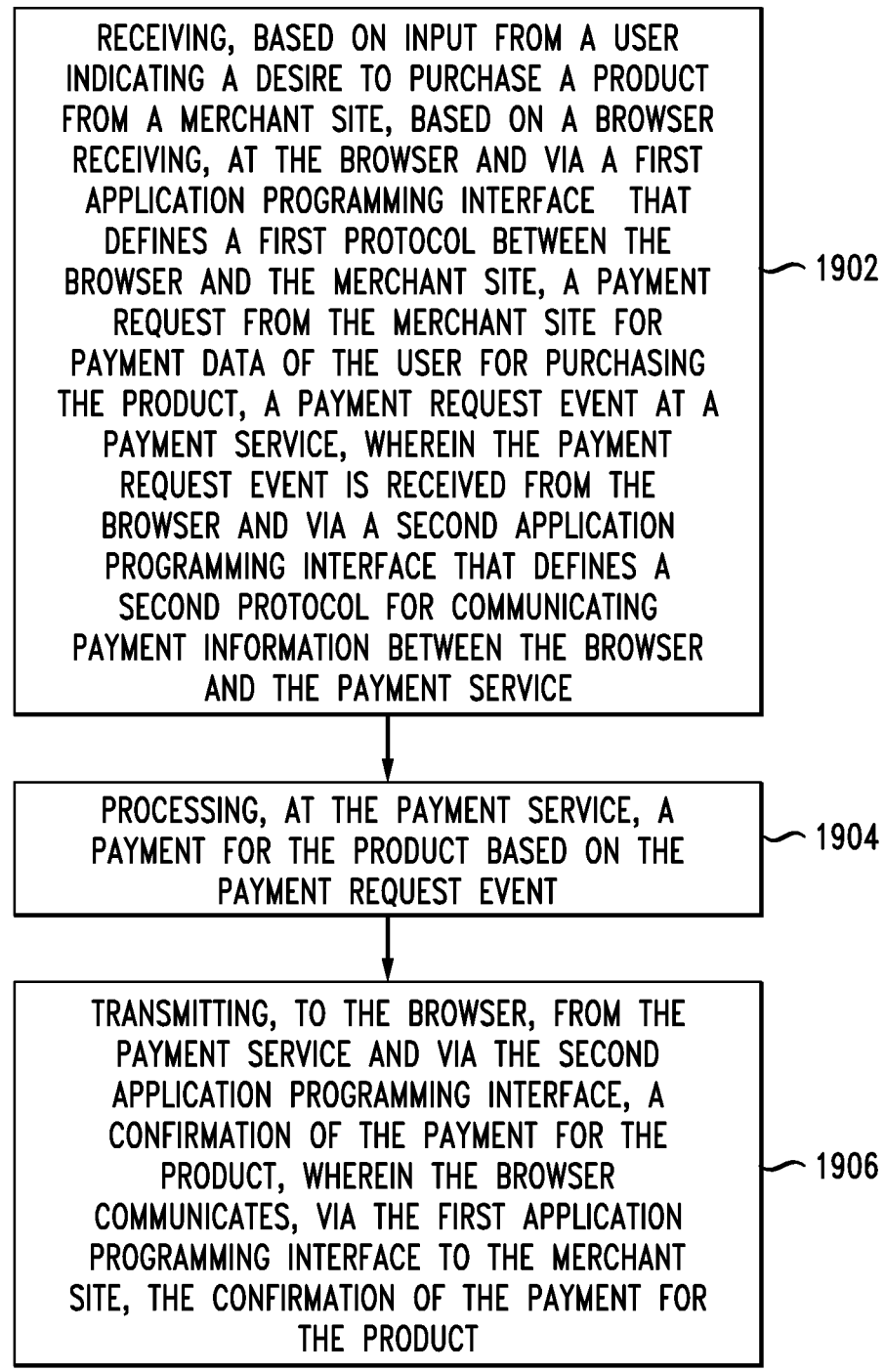
FIG. 19 illustrates another method example.

FIG. 19 illustrates this aspect of the disclosure from the standpoint of the payment processor. In the following example, the browser can be a browser for a website, an application, a social media entity and the merchant site can be any recipient of a payment, including a member of a social media entity. A method includes receiving, based on input from a user indicating a desire to purchase a product from a merchant site and based on a browser receiving, at the browser and via a first application programming interface that defines a first protocol between the browser and the merchant site, a payment request from the merchant site for payment data of the user for purchasing the product, a payment request event at a payment service, wherein the payment request event is received from the browser and via a second application programming interface that defines a second protocol for communicating payment information between the browser and the payment service (1902), processing, at the payment service, a payment for the product based on the payment request event (1904) and transmitting, to the browser, from the payment service and via the second application programming interface, a confirmation of the payment for the product, wherein the browser communicates, via the first application programming interface to the merchant site, the confirmation of the payment for the product (1906). In this approach, the merchant is not using their own payment processor as would occur if the merchant were receiving payment account data or a token for processing the purchase. Since the purchase is being performed by the payment service, the merchant needs that confirmation that the purchase is complete. The payment service can utilize stored payment data and/or an account of the user. Thus, payment services like Stripe, Google.com, BrainTree, Amazon.com, PayPal, Bitcoin, Coinbase.com etc. can be represented by payment services. Because the user can be logged into their browser, or a Google account (email, Youtube, etc.), the user's credentials can be utilized to login to any specific account that is used for payment without the user manually entering in their account data.

In the cryptocurrency scenario, the confirmation can indicate that the transaction has been initiated onto the blockchain. A later confirmation can be provided as well when the blockchain adds a new block after the mining process is complete. As this can take a number of minutes, such as ten minutes, alternate communication channels can also be implemented such that the user may receive a separate text or email confirming the completion of the cryptocurrency transaction. The payment request application programming interface may linger or be reinitiated with the final confirming information as well.

Figure 20:
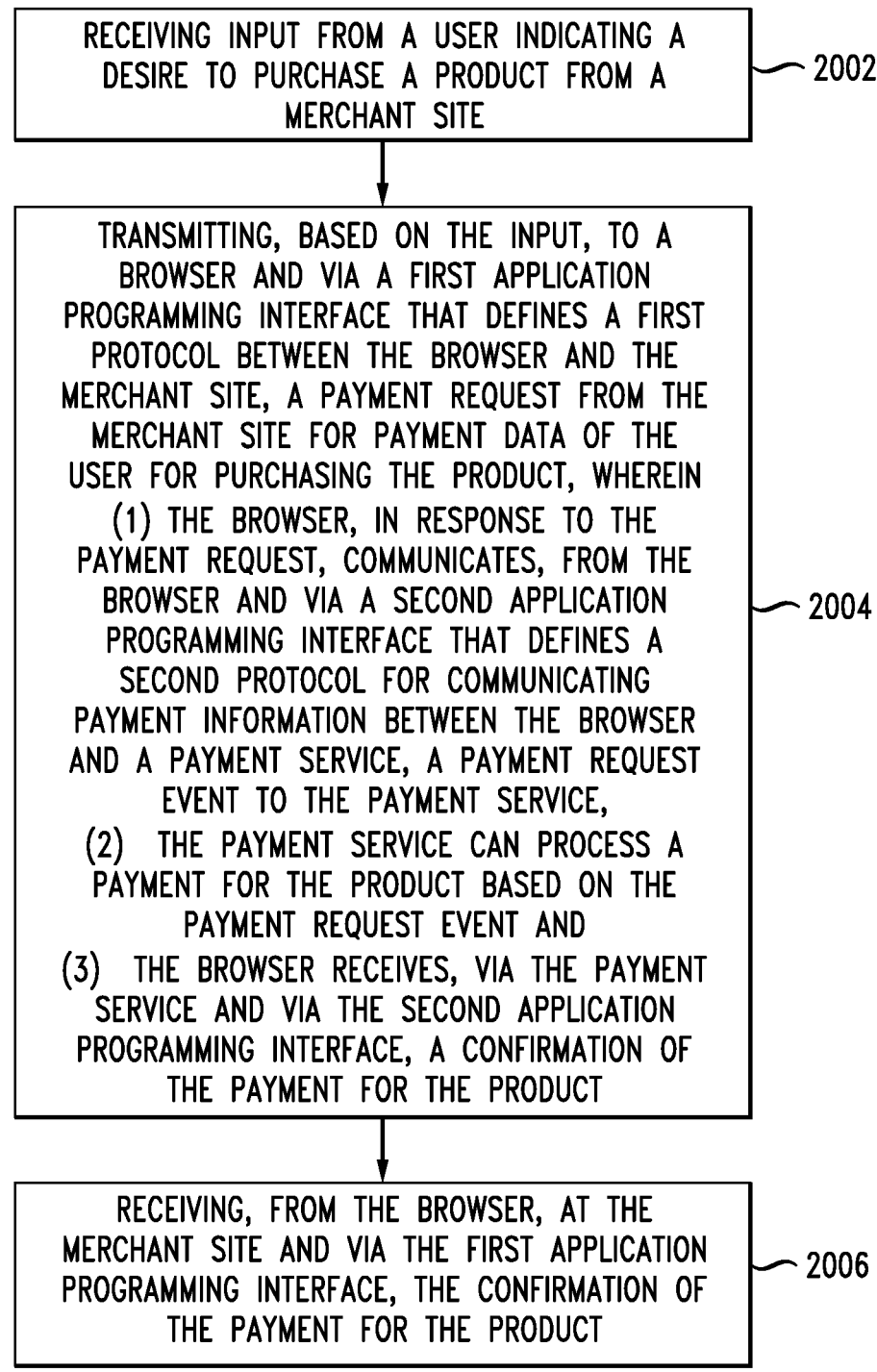
FIG. 20 illustrates another method example.

A method performed from the standpoint of the merchant site, recipient of a payment or application is shown in FIG. 20. The method includes receiving input from a user indicating a desire to purchase a product from a merchant site (2002) and transmitting, based on the input, to a browser and via a first application programming interface that defines a first protocol between the browser and the merchant site, a payment request from the merchant site for payment data of the user for purchasing the product (2004), wherein (1) the browser, in response to the payment request, communicates, from the browser and via a second application programming interface that defines a second protocol for communicating payment information between the browser and a payment service, a payment request event to the payment service, (2) the payment service can process a payment for the product based on the payment request event and (3) the browser receives, via the payment service and via the second application programming interface, a confirmation of the payment for the product. The method includes receiving, from the browser, at the merchant site and via the first application programming interface, the confirmation of the payment for the product (2006). The merchant in the above example can also be a user of a social media entity that receives a payment from another user who makes the payment or performs some other transaction.

Any communication amongst the browser, a payment service, and the merchant site using the various APIs disclosed can be part of this disclosure to achieve a one-click type purchasing experience by the user at the merchant site or a user of a social media application. As noted above, the method in FIG. 20 can also apply to the payment service being a cryptocurrency wallet which will, as instructed by the browser and based on cryptocurrency payment information (such as a cryptocurrency amount, and a recipient wallet identification), initiate the cryptocurrency transaction. The merchant site or application can receive the confirmation of the payment for the product as well as receive automatic instructions or other cryptocurrency data to enable the merchant cryptocurrency wallet to be able to receive the payment from the payment service.

Additional concepts regarding a payment processor processing a payment to a site are discussed next. In one aspect, a method includes receiving, at a browser and via a payment request application programming interface that defines a first protocol for communicating information about purchases between a site and the browser, a payment request having data associated with a purchase of a product from the site for a user and, based on the payment request, transmitting, from the browser and via a payment handler application programming interface that defines a second protocol for communicating data between the browser and a payment service, a request to process a payment for the product to the payment service. The method according to this aspect can include receiving, at the browser and via the payment handler application programming interface, a confirmation, from the payment service, that the payment service has processed the payment for the product to the site.

The method can further include transmitting the confirmation received from the payment service from the browser and via the payment request application programming interface to the site. The method can further include transmitting, from the browser and via the payment request application programming interface, address information for the user to the site for delivering the product to the user. The browser of course can be any agent, software module, application and so forth.

A method from a viewpoint of a payment processor or cryptocurrency wallet perspective can include, based on a payment request received at a browser and via a payment request application programming interface that defines a first protocol for communicating information about purchases between a site and the browser, the payment request having data associated with a purchase of a product from the site for a user, receiving, from the browser, at a payment service and via a payment handler application programming interface that defines a second protocol for communicating data between the browser and the payment service, a request to process a payment for the product and transmitting, to the browser and via the payment handler application programming interface, a confirmation, from the payment service, that the payment service has processed the payment for the product to the site. In this scenario, the payment service having processed the payment means that the payment service or cryptocurrency wallet receives the proper recipient wallet identification information, receives the cryptocurrency amount, and was properly able to initiate the transaction on the blockchain and also includes a reporting element back through the API to the browser that the transaction was initiated. The transaction will complete, which can take ten minutes. In some scenarios, the cryptocurrency wallet can send another final confirmation that the blockchain process was successful. Given the difference in non-real time processing for cryptocurrency transactions, built into the process are additional confirmations as might be necessary depending on which cryptocurrency wallet, which cryptocurrency is chosen, the timing required to finalize the transaction, and so forth. The wallet can also be integrated into an application such that the coordination between the user (giver) and the recipient can be performed easily in the context of the social media application and the communication to wallets and initiation of blockchain-based and recorded transactions is handled by the application.

From the site context, an example method can include transmitting, from a site, to a browser and via a payment request application programming interface that defines a first protocol for communicating information about purchases between the site and the browser, a payment request having data associated with a purchase of a product from the site for a user and receiving a payment for the product from a payment service, wherein the payment is received based on the browser transmitting, based on the payment request, from the browser and via a payment handler application programming interface that defines a second protocol for communicating data between the browser and the payment service, a request to process the payment for the product to the payment service. The method can also include receiving, from the browser and via the payment request application programming interface, a confirmation, initiated from the payment service, that the payment service has processed the payment for the product to the site. The method can also include receiving, from the browser and via the payment request application programming interface, address information for the user at the site for delivering the product to the user. The browser of course can be an agent, application or software module that communicates with applications on a device. The site can be an application operating or downloaded on a device. In all the above examples, the merchant site can represent a user of a social media network that is communicating with another user and that will receive value from the other user within the social media entity environment. The social media application has integrated therein a cryptocurrency wallet technology which can be accessed for all or part of the transaction. For example, a first user might pay in dollars within the application, the application might use an exchange to convert the dollar amount to a cryptocurrency and the use another exchange to a second fiat currency which is received by the recipient.

Figure 21:
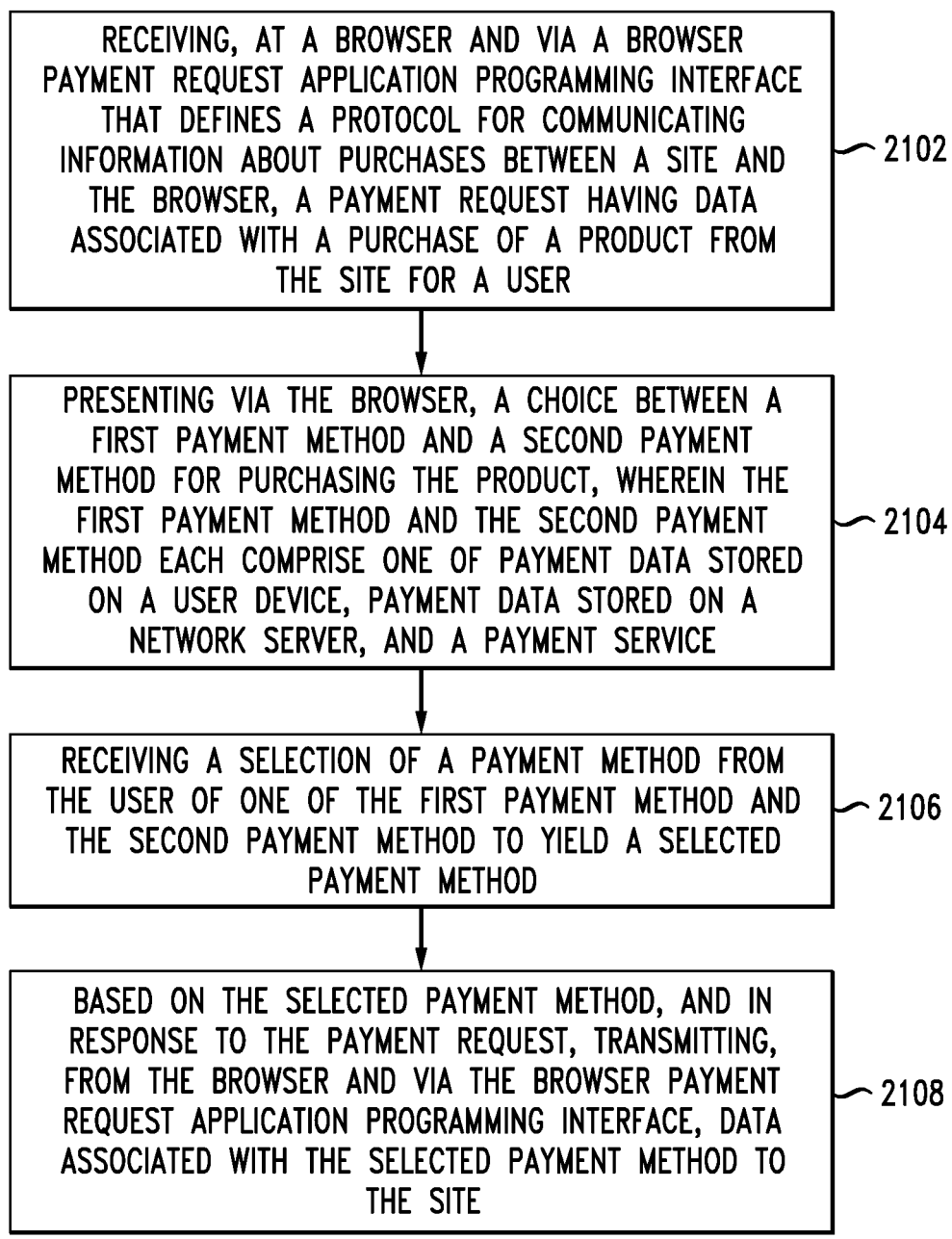
FIG. 21 illustrates another method example.

FIG. 21 discloses another aspect of this disclosure related to providing a choice of payment methods. The method includes, in this aspect, receiving, at a browser and via a payment request application programming interface that defines a protocol for communicating information about purchases between a site and the browser, a payment request having data associated with a purchase of a product from the site for a user (2102), presenting via the browser or a browser interface, a choice between a first payment method and a second payment method for purchasing the product, wherein the first payment method and the second payment method each include or require one of payment data stored on a user device, payment data stored on a network server, and a payment service (2104), receiving a selection of a payment method from the user of one of the first payment method and the second payment method to yield a selected payment method (2106) and, based on the selected payment method, and in response to the payment request, transmitting, from the browser and via the payment request application programming interface, data associated with the selected payment method to the site (2108). Where the selected payment method is a cryptocurrency method, transmitting the data associated with the selected payment method to the site can be replaced with transmitting data from the sites to the browser. Such information is needed in that the transaction for cryptocurrency differs in that the site must provide its recipient cryptocurrency wallet identification information such as the public key, email address, or other identifying information. This information is then used by the buyer cryptocurrency wallet as well as the cryptocurrency amount in order to initiate a cryptocurrency transaction from the buyer to the seller of the product. The browser acts as the agent between the parties, initiates cryptocurrency or wallets, logs into online cryptocurrency wallets, populates data fields, causes objects to be clicked upon, communicates comments, selects from a plurality of cryptocurrency wallets where necessary, and can coordinate between different cryptocurrency wallets where necessary in order to achieve the basic transfer of a cryptocurrency from the buyer to the seller. Most if not all of this process occurs behind the scenes such that the user is freed up from manually interacting with wallets in the normal process. In this regard, the present disclosure can utilize the programmed wallets, updated browsers with API functionality, updated merchant sites, updated online cryptocurrency payment services, such that data can be communicated, functionality can be implemented and the purchases can be achieved through the payment request application programming interface.

When the cryptocurrency wallet is integrated into an application, the communication is generally similar as set forth above but handled all within the application itself such that the giving user's cryptocurrency wallet and the recipient user's cryptocurrency wallet can be accessed appropriately to handle the transaction on the blockchain. The cryptocurrency might also be used as a bridge currency between fiat currencies or the blockchain can be used to record some other type of transaction unrelated to a monetary payment.

When the selected payment method includes the payment service, and based on the payment request and the selected payment method, the method can include transmitting, from the browser and via a payment handler application programming interface that defines a second protocol for communicating data between the browser and a payment service, a request to process a payment for the product to the payment service. The method can include receiving, at the browser and via the payment handler application programming interface, a confirmation, from the payment service, that the payment service has processed the payment for the product such that the site gets paid. The payment handler can also be between the application and a network-based payment server or a blockchain network as well.

The method can also include transmitting the confirmation (or other data) received from the payment service from the browser and via the payment request application programming interface to the site. The method can also include, when the selected payment method includes the payment data stored on the user device, performing the step, based on the payment request and the selected payment method, transmitting, from the browser and via the payment request application programming interface, responsive data to the site, the responsive data being based on the payment data stored on the user device.

The responsive data can include a token generated based on the payment data stored on the user device, the token being usable to process a purchase of the product by the site. The site can process the payment for the product using the payment data. When the selected payment method includes the payment data stored on the network server, the method can further include, based on the payment request and the selected payment method, transmitting, from the browser and via the payment request application programming interface, the payment data stored on the network server to the site. The payment data can be communicated through one or more APIs associated with the browser to the site for processing.

The method can also include transmitting, from the browser and via the payment request application programming interface, address information (or any other information) for the user to the site for delivering the product to the user. In one aspect, the other information could include a clothing size, show size, shirt size, pant size, etc. such that user could simply shop for the shoes they want and buy them. There would be no need to even choose the size. The shoes would come in the user's size passed through the API.

This concept of multiple payment options from the standpoint of the site can include transmitting, to a browser and via a payment request application programming interface that defines a protocol for communicating information about purchases between a site and the browser, a payment request having data associated with a purchase of a product from the site for a user, presenting via a browser interface, a choice between a first payment method and a second payment method for purchasing the product, wherein the first payment method and the second payment method each include or require one (or more) of payment data stored on a user device, payment data stored on a network server, and a payment service, receiving a selection of a payment method from the user of one of the first payment method and the second payment method to yield a selected payment method and, based on the selected payment method, and in response to the payment request, receiving, from the browser and via the payment request application programming interface, data associated with the selected payment method to the site. The data can be authenticated data or authorized data in that the authorization and/or authentication of the data (payment data, user data, billing information, token, etc.) is achieved through use of the payment request API and/or and not through an API directed to a payment service or separate network server, except in the case of the payment handler API discussed herein. When using the payment request API, the authorization and/or authentication of the payment data, or other data used, is independent of a separate network payment server or service. An exception, however, applies when the second payment handler API is used between the browser and a payment service which utilizes information from the payment request API to process a purchase, or authenticate a user, or perform other actions, and sends data through the payment handler API to the browser, which data can be sent or data based on the received data, can be transmitted from the browser through the payment request API to the site. Another exception can apply when a separate service is used to authorize the payment data, credential data, or any other data but the communication of requests for such data and transmission of such authorized/authenticated data still occurs through the browser API which is established as a protocol between a site and the browser, and not between the site and a payment service or authentication service.

The data associated with the selected payment method can include one of payment data for the site to process a payment to purchase the product or a confirmation that the payment to purchase the product was performed by a payment service.

For wallets built in or integrated into applications such as social media applications, the APIs may operate in a similar manner to coordinate data and payment transactions from messaging interactions between two people, for example.

From the standpoint of the payment processor, the method can include the following concepts. Based on (1) a payment request received at a browser and via a payment request application programming interface that defines a first protocol for communicating information about purchases between a site and the browser, the payment request having data associated with a purchase of a product from the site for a user, and based on (2) a user selection of a payment method from a plurality of payment methods presented via a user device, the payment method requiring a payment processor to process the purchase of the product, the method can include receiving, from the browser, at the payment service and via a payment handler application programming interface that defines a second protocol for communicating data between the browser and the payment service, a request to process the payment for the product, processing the payment for the product by the payment service to yield a payment confirmation and transmitting, from the payment service to the browser and via the payment handler application programming interface, the payment confirmation.

The browser can transmit the payment confirmation (or related data) to the site via the payment request application programming interface. In another variation of this concept from the view of the browser, the method can include receiving, in connection with a purchase of a product, a payment request at a browser and via a payment request application programming interface which defines a protocol for communicating data between a merchant site and the browser for managing payments, presenting, via a user interface, a first payment method and a second payment method, receiving a selection via the user interface of the first payment method or the second payment method to yield a chosen payment method and transmitting payment information, in response to the payment request, from the browser and via the payment request application programming interface, the payment information being associated with the chosen payment method.

The payment information can include payment data for use by the merchant site for processing a purchase. The payment information can include a confirmation that the payment has been processed by a payment processor.

The method can further include communicating, from the browser and via a payment handler application programming interface which defines a protocol for communicating data between the browser and the payment processor, information to the payment processor for processing the payment. The method can also include receiving confirmation information at the browser and via the payment handler application programming interface, the confirmation information confirming that the payment processor has successfully made a payment for the product to the merchant site. Where a wallet is integrated into a social media application, only the payment handler API might be deployed to enable communication from the application to the blockchain network to achieve the recordation of a transaction.

These processes also apply to applications that have incorporated cryptocurrency wallets as described herein.

In another aspect, the merchant may generate a unique key for receiving a cryptocurrency payment. Thus, the data that is communicated via the API could be a unique public-key for that specific transaction. In another aspect, the merchant may have a number of different cryptocurrency wallets based on the type of transaction, the type of product, the cost of the product, the type of cryptocurrency, and so forth. The browser or some other entity could generate a transaction ID, which can identify the necessary data in which can be utilized to select a merchant wallet from a plurality of merchant wallets to use for that particular transaction. Static or dynamic identification data could be utilized and communicated via the payment request API for use by the buyer wallet to carry out the cryptocurrency transaction.

Alternately, data regarding multiple payment options for a single purchase transaction can be communicated via the payment request API. Rather than selecting a single method of payment, a user may indicate his desire to pay with multiple payment methods such as cryptocurrency and PayPal. In this regard, the payment processor can complete two or more payment processes for the purchase transaction. When the payment processor has successfully made a payment to the merchant site, it can send a confirmation to the payment handler application programming interface. The payment handler application programming interface does not send a confirmation of payment to the browser until the payment processor has successfully completed all payment processes for the purchase transaction. In this way, a user can spend his desired amount of cryptocurrency and pay the remaining balance with another payment method such as a credit card. The browser can be a software module communicating with an application or where a cryptocurrency wallet is integrated into an application, the application can handle the communications.

Figure 22:
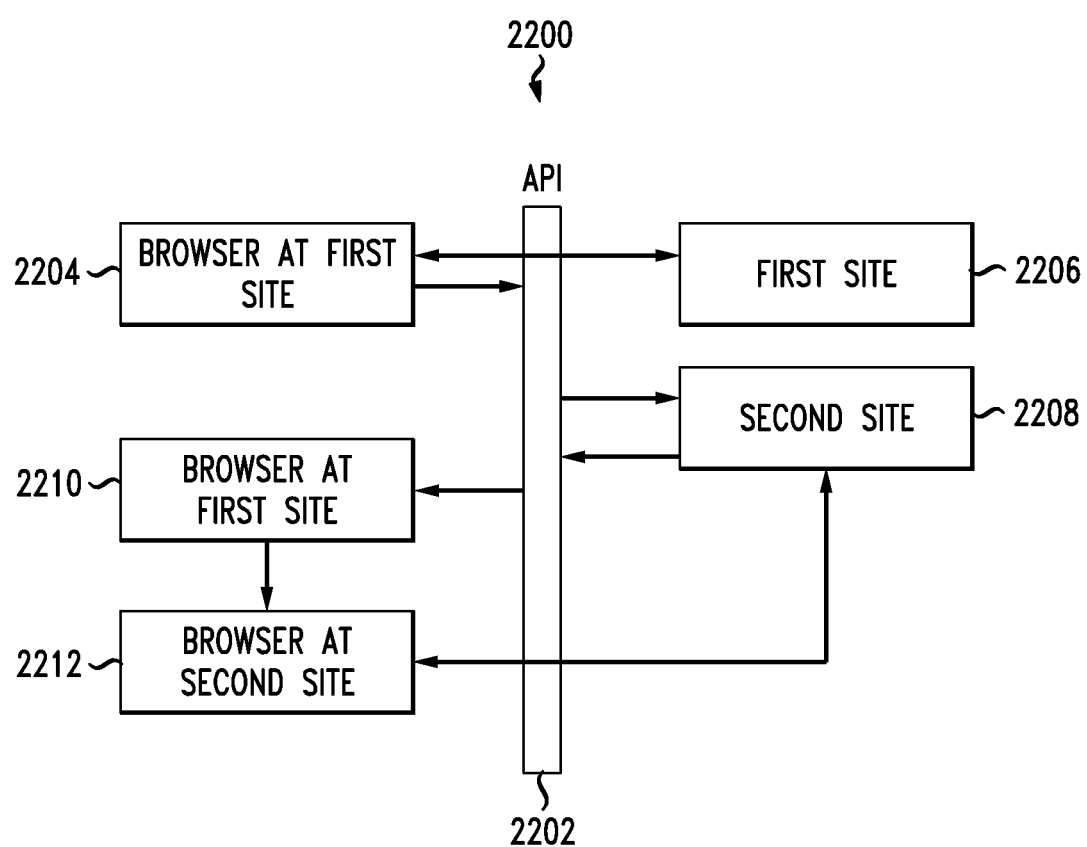
FIG. 22 illustrates the interaction amongst sites and the API.

FIG. 22 illustrates an example scenario 2200 showing communications via an application programming interface (API) 2202. A one-search server, a web server, social media site, payment service, or some other computing device can provide services accessible via the API 2202. The services provided by the API 2202 can be accessible from a web server serving pages to web browsers or other web clients, an application for mobile devices, or from a web browser, such as through a JavaScript call to the API 2202. In this example, a browser navigates to a first website 2204, and retrieves the data for the first website, such as HTML, CSS, JavaScript, images, metadata, or other data, from a first website server 2206 without relying on the API 2202. Then, when the browser parses the data for the first website 2204, renders the page, and loads scripts or other executable instructions for the website, one or more portions of the data are linked to or reference the API 2202. For example, the attributes or instructions associated with a text field can instruct the browser to request search data via the API 2202. The API 2202 handles the complexity of how to manage the request so that the browser 2204 does not necessarily know or care which server is handling the request, how the data is processed to achieve a result, and so forth. From the perspective of the web browser 2204, data is submitted to the API 2202, and the API provides resulting data or performs a resulting action. Example actions can include providing payment data for processing a payment at the site 2204 or communicating with a payment service at a second site 2208. Further actions can include communicating with a cryptocurrency wallet data and/or instructions to initiate a cryptocurrency payment from a buyer to a seller of an item or to transfer value from one person to another. The text field can instruct the browser to submit a request to the API 2202 based on text entered in the text field. Thus, as the user enters the text "buy iPhone 5S 64 gb," the browser 2204 that has loaded the first website can submit the text string to the API 2202 character by character, word by word, or at some time interval (such as 250 milliseconds). Further, as part of the page loading and rendering process, the browser 2204 can submit user data for the user or can establish, re-establish, or link to an existing session with the API 2202, so the API 2202 has sufficient context data about the user to make appropriate decisions. In response to receiving text from the web browser 2204, the API 2202 can analyze the data, determine a response of one or more actions, web browsing destination, desired item to purchase, and so forth. Then the API 2202 can cull the list of one or more actions to an N best list, which can be based on the type of device or browser the user is using. For example, on a mobile device with limited screen space the N best list can be limited to 3 actions or destinations, while on a desktop or laptop computer with more ample screen space the N best list can be limited to 10 actions or destinations. As part of determining the best actions or destinations, the API 2202 can communicate with a second website 2208, which can provide payment services, cryptocurrency payment services, or any other service or data. If the action is a one-click purchase action with the second website 2208, the API 2202 can, on behalf of the user or the browser 2204, negotiate with the second website 2208 to navigate to the appropriate location at the second website 2208, populate the appropriate data fields automatically, create an account (if necessary) or log in to an account for the user, receive a payment request through the API from the second website when a user clicks on a buy button, respond with payment data, make and so forth. The API 2202 can handle all of these tasks automatically in response to an API request and pass that information back to the browser at the first website 2210, which presents these possible destinations or actions to the user. If the user selects the destination or action associated with the second website, the browser can then directly continue the session with the second website 2208 that the API 2202 created or modified. In this way, the API 2202 can coordinate between websites and automatically enter user data in response to API calls and pre-navigate to various actions or destinations on behalf of the user so they are ready for the user to select and open. Upon landing on the second website, if a buy button is presented and the user clicks on a buy button, the second site can request payment information through the browser API and receive payment data via the API such as an account and address or a token for processing a payment. Note that FIG. 22 can also be viewed in coordination with FIG. 2 and the use of two APIs 218, 212 for managing coordination by a browser 206 between a merchant site 216 and a payment service 210. In other words, FIG. 22 and FIG. 2 illustrate, in one aspect, how APIs are used to manage payment data and payment processing between a first site and a second site or payment processor.

An example method of applying the use of the API is as follows. This example relates to the unified search input field aspect of this disclosure. A method includes presenting an input field on a user interface, wherein the input field is associated with processing data using a generalized search engine that indexes and searches both merchant websites and non-merchant websites (or any other site such as a social media site or messenger application), receiving input from a user in the input field to yield user input (which can be other types of input, besides input field input, based on the functioning of the respective site), and receiving an interaction associated with the user input indicating that the generalized search engine should process the user input. When the user input is determined to indicate a search intent, the method includes presenting a search result that can include a non-merchant website and receiving a search interaction associated with the non-merchant website and transitioning the user to the non-merchant website. When the user input is determined to indicate a purchase intent, the method includes receiving, via an application programing interface, data associated with an item from a merchant site, the item being selected based on the user input, presenting a purchase-related search result that can include a buy now option associated with the item, receiving a user interaction associated with the buy now option and, based on the user interaction, processing a payment for the item via stored payment information for the user at the generalized search engine or browser to yield purchasing data. The method can then include communicating the purchasing data via the application programming interface to the merchant site, whereby the merchant site can manage delivery of the item to the user.

From the merchant side, the process is as follows: A method includes establishing, from a merchant site, communication between the merchant site and a generalized search entity (or any site such as a social media site or any other application) via a communication interface or an application programming interface. The generalized search entity operates to present an input field on a user interface (or other functionality based on the respective site), wherein the input field is associated with processing data using a generalized search engine that indexes and searches both merchant sites and non-merchant sites. The generalized search entity receives user input in the input field. When the user input indicates a search intent, the generalized search entity presents a search result can include a non-merchant site, receives a search interaction associated with the non-merchant site and transitions the user to the non-merchant site. When the user input indicates a purchase intent, the generalized search entity presents a purchase-related search result including a buy option associated with the user input, the search result including an item offered from the merchant site. The generalized search entity receives a purchase interaction associated with the buy option. The merchant side of the process is as follows. When the user input indicates the purchase intent, the method includes, receiving, via the communication interface and at the merchant site, payment information from the generalized search entity or from a browser, the payment information associated with the purchase interaction for the item and processing delivery of the item via the merchant site. In this manner, the merchant site or application can communicate and receive communications via the application programming interface or communication interface to achieve the presentation and a sale of one of its items.

It is also noted that while FIG. 22 illustrates websites communicating via an API, that the API could also enable communication between two applications on a device or could cause communication between a website and an application on a device. The API can also be between a browser and a site. The API could function between a browser and a peer-to-peer blockchain based distributed ledger that receives data for confirming payment transactions of cryptocurrencies. The API is meant to be the means of two different entities, each of which have different purposes or means of interfacing with users, such that coordination between the two entities can be facilitated.

As discussed above, any of the APIs or financial transactions disclosed herein could be implemented through blockchain technology. Thus, any communication between a buyer and a seller of products, or between users of a social media entity, could be implemented through a contract on a blockchain and payment could be submitted through user addresses according to blockchain technology. For example, a smart contract programmed and implemented on a blockchain could receive and implement items in the transactions.

Another aspect of this disclosure is how to implement a "one-click" or buy button purchasing opportunity on a search engine result, an interface to a merchant site where a purchase can be made, or a buy button posting on a social network. The concept could also work simply from any application or website where a purchase of an item or service is possible. In these contexts, to make the purchasing process more efficient, the payment/delivery information is stored at the search entity, social networking entity, a separate agent, a browser, or in any other location so that the data can be applied to a purchasing transaction in such a way that the user does not need to manually fill out fields (such as address, credit card number, etc.) to complete a purchase or to make a transfer of value between different users. Filling out these fields prevent more purchasing conversions. The approach disclosed herein can be done through APIs or other protocols to request data, retrieve the data, and fill in the payment forms and give the user a more "one-click" type of experience. This is implemented for example through the W3C Payment Request API or Android Pay API, the details of which are described in the priority applications to the present application.

However, with a blockchain approach used for altcoin payments, there is no entity that "holds" the payment account like a credit card. There are three elements to the blockchain and using cryptocurrency to make purchases. There is an address, a private key and wallet software. The address is where others can send bit coin to the person or entity. The private key is the cryptographic secret by which a person can send Bitcoin (or any altcoin) to others. Whenever a particular altcoin like "Bitcoin" is referenced, it could apply to any type of cryptocurrency. The wallet can also store a record of the amount of altcoin you control on the blockchain ledger. The wallet can be built into any application such as a messaging or social media application downloaded on a user device.

Wallet software is the software that a person runs on their own computer to manage their bitcoin. Wallet projects are provided by companies such as ChromaWallet, CoinSpark and CounterWallet. Other companies include Coinprism, Melotic and OneWallet. Typically, to send someone or an entity an altcoin, the sender scans the wallet address QR code or otherwise obtains the address characters for the recipient via email or other means. The sender uses the wallet application to enter additional information about the transaction such as the amount, fee, delivery costs, etc. When the sender confirms the transaction using their private key, a message is broadcast from the owner of the sending address to the network that x number of coins from that address now belong to the new address. It is authorized by the sender's private key. After a few minutes, the transaction will be inscribed in the blockchain per blockchain miners and a confirmation notice can be sent. An altcoin address as well as a public and private key is generated automatically when a user sets up their wallet. The altcoin address is typically an identifier of 26-34 alphanumeric characters, beginning with 1 or 3, the represents a possible destination for an altcoin payment. Sometimes the address is represented as a QR code. It can operate like an email address. People with a user's public-key wallet address can send the person altcoins.

The present disclosure incorporates this functionality and simplifies it in the context of making purchases on the web or a mobile application that integrates with a cryptocurrency wallet. What will occur when using bitcoin, litecoin (or any cryptocurrency) is, in one example, a new API that coordinates the altcoin payment through an individual's wallet stored on their device and the purchasing interface (i.e., a buy button search result, a purchase option on a merchant site or a buy now item posted on a social media site). Components such as storage, messaging, wallet interactions, mobile payments, identity confirmation, security, and reputation can be managed using tokens and proper communication protocols of the necessary information to integrate altcoin payments into the payment request API widely adopted and can also be incorporated into an application such as a social media application in which a wallet is integrated within the application or site to provide objects for performing value transfer actions in which transactions are confirmed or recorded on a blockchain-based system.

It is assumed that a merchant will accept cryptocurrency in this scenario. Thus, when the circumstances disclosed herein are applicable, and a buy button is presented to a user, the user will be enabled to make the purchase using their private key to access their altcoin, and the address of the merchant to be able to receive the payment of the altcoin. The wallet software can keep a copy of the blockchain—the record of all the transactions that have occurred in the particular currency—as part of the decentralized scheme by which coin transactions are verified. The wallet can be browser-based, application based such as being integrated into an application, or can be a separate application or smartphone wallet from Blockchain.info, Mycelium, Coinbased, Electrum or other provider. In other words, one aspect of this disclosure is to incorporate the wallet into a browser or application such that the user's credit/debit/other payment account is stored, their address, as well as their altcoin wallet. Alternately, a protocol can communicate data between a browser (which uses the API between the browser and the merchant) and the altcoin wallet or wallet that is integrated within the application. For example, the wallet may share the address and the private key to perform a payment but then receive the details to add the payment to the blockchain.

As noted above, for a user to send altcoins to a merchant to make a purchase of an item, the user needs the address of the merchant and the private-key part of the buyer's wallet where the software will check that they have control over the altcoins to be paid to the merchant. In some cases, people scan a QR code for the wallet address. Usually, the sender (buyer) scans the QR code of the recipient's address and uses the wallet application to enter additional information about the transaction, such as amount, transaction fee (affirming an amount prespecified by the wallet software), or any other parameters. When the sender submits the transaction, a message is broadcast from the owner of the sending address to the network that x number of coins from that address now belong to the new address. The operation is authorized by the sender's private key. The sender may enter in their private key, password, fingerprint, voiceprint, or other authorization may be used to retrieve the sender's private key. The transaction is received almost immediately at the receiver's wallet application, with an "unconfirmed" status and after about 10 minutes, the transaction is confirmed and can be inscribed in the blockchain per blockchain miners.

Applying the basic altcoin operation to the current scenario, several modifications and novel features must be implemented. The goal is to enable in a simple and easy fashion the ability of a user to choose an altcoin payment as though it was a Visa payment or a Mastercard payment managed through the payment request API or within an application that previously did not offer cryptocurrency payments, although the altcoin is processed in a completely separate way. Currently, for example, in a user's Amazon-.com account, several credit cards can be listed and one can be chosen for a payment. This approach will enable an altcoin payment for a purchase as well wherein a cryptocurrency is integrated into the website. Similarly, cryptocurrency payments can be offered through integrating with an application such as a social media application.

Enabling a simple "one-click" ability to choose an altcoin payment process and then handle the payment has some issues. If a user is on a mobile device and wants to make a purchase, they will not be able to scan a QR code of the merchant address. Plus, not all buyers will have bitcoin type wallets. Thus, through an API a merchant advertising or posting an interface that a user can ultimately interact with to make a purchase can receive data that the person viewing the advertisement or interface has a cybercurrency wallet set up and has a profile that indicates that they might make the purchase through bitcoin or other currency. Such functionality can be built into an application or can be accessible via the API. The API can exchange the necessary requirements and data such that in the context of an advertisement or other interface in which the user is in a state in which a purchase intent is indicated or can take place, the same kind of authentication used by the buyer's altcoin wallet can be integrated into the interface such that the user will just need to perform the same kind of function to access their private key. This might be through biometrics, a password, and so forth. The integration can include retrieving an amount of money, address of delivery, date, merchant, recipient data and all of such data with the application and retrieval or receipt of the buyer's private key and use of their cryptocurrency wallet so that the payment can be made in cryptocurrency but the delivery, management of the life cycle of the product purchase and delivery and potential return, etc. is handled in the normal fashion by the merchant. When the application is a social media application, the giver and recipient are both typically identified through a message exchange or social media context (such as one person viewing the post of another person). Integrating a cryptocurrency payment into the interface and updating the processing of the application can incorporate the necessary functionality into the social media entity.

In one aspect, as noted above, a cryptocurrency wallet can be integrated into a social media application such as a messaging application. As users engage in interactions according to the particular structure of the social media application, the management of a payment from one entity to another can be essentially as easy as sending a text or responding to a posting on a social media site. In one example, the user can be engaged in a dialog via a messaging application and one user could request a payment from another user and indicate an amount of the payment. The second user can then receive as part of the dialog data which presents the requested amount which enables the second user to respond with a confirmation of the payment. The social media application can then manage behind the scenes of payment of value from the second user to the first user. The payment can include at least in part cryptocurrency payments and may involve the use of exchanges to convert between fiat currency and cryptocurrency payments. Cryptocurrencies can also be used to pay in full or in part (such as Ripple as a bridge currency or a currency developed for use in the social media application) through the use of one or more APIs in which the browser acts as an agent to coordinate the payment process. The application can have similar functionality built in to integrate the processes. Some cryptocurrencies might be used as bridge currencies such that the process could involve the user making a purchase in dollars, and the dollars are exchanged via an exchanger for XRP, which is then exchanged for euros. Thus, a portion of the overall payment process could include a cryptocurrency directly or as a bridge currency to convert from one type of currency to another. The social media application or entity can manage use of exchanges for making changes from one currency type to another. Values of different types can also be exchanged, such as cryptocurrencies for airline miles or points in gaming.

Assume in one example that data indicates that a wallet exists for a user browsing a site or that the user has a wallet set up in a social media context, or a user preference notifies a merchant that altcoins will/can be used to buy products. An advertisement or the graphical presentation will include as part of its data the merchant address to which altcoins can be addressed. The indication could be an identification of a recipient in a social media interaction. In one scenario, the "buy button" could include options to use a stored credit/debit card or any other traditional payment account or the user could choose a cryptocurrency account. The button might be a "pay" button or a "request" button for making a payment to another person or requesting a payment from another person If a traditional payment account is chosen, then the processes disclosed herein to utilize the payment account stored at the search entity, social media site, application, browser, other payment agent or other location to either process the purchase or transmit payment data to the merchant site through the API for providing the necessary data for the merchant to process the payment (i.e., so the user does not have to fill in the forms). The various requests and responses exchanged through the API enables the payment information/delivery information and/or other information to be communicated to the merchant site or recipient such that the purchasing process is simply and does not require the user to fill out fields in a payment form.

The process disclosed herein adds the cryptocurrency payment opportunity. If an altcoin payment is chosen, then the interface interacts through an API or other protocol within an application with the user's wallet to retrieve the user's private key or enable the user to enter the private key so that the cryptocurrency transaction can occur and the merchant can be paid or the other user in a social media entity can receive value. For example, a one-time use token could be generated which provides the address and/or private key to the merchant site or recipient such that it can perform the payment function. Or, the API can be used to receive from the merchant site the amount, merchant address, any other data such as tax, fees, etc., and the API can be used to receive that data and communicate with the wallet or browser to process the payment from the user's altcoin wallet. The altcoin wallet could be integrated into the browser or application such that the processing is performed by Chrome, Mozilla, Internet Explorer, Facebook, Messenger, Whatsapp, etc. If the API is between the merchant and the browser, a separate API or protocol could communicate the data between the browser and a user's altcoin wallet on their device. Again, the actual transfer of altcoin to the merchant can occur in any component that is workable. It could be through the user's altcoin wallet, an instance of the altcoin wallet incorporated into a browser, or through the merchant making the transfer.

Typically, the amount of the purchase in altcoin will have to be calculated because it originally will likely be set in dollars but will need to be converted into the corresponding value of the respective cryptocurrency that the buyer will use. The process in this regard could include accessing a data feed which provides a current value of the cryptocurrency in terms of dollars (or any other currency that the merchant or recipient is using). This access could be done in real time or near real time such that when the buyer makes the purchase or a giver makes a payment, the proper value of the cryptocurrency is applied to the purchase or transfer. That value and data feed could be presented to the user at the time of purchase and could be part of the buying interface.

The buy button or payment button and follow-on screens that are part of the purchasing process can include a blending of the interface with access to the cyptocurrency wallet for the buyer. Thus, the interface could include a portion that is connected to or triggers payment through a traditional payment account, and another portion that is associated with the buyer's wallet for cryptocurrency. The user could be presented with a buy option to pay with Visa, Mastercard or Bitcoin. If the user chooses the cryptocurrency, then the system enables the interaction with the wallet such that through accessing automatically or manually, the user's private key is provided or accessed. Passwords, fingerprint authorization, or manual entry of the private key can occur through the purchasing interface for the item, whether is it part of a merchant site, an application, a social media entity, an advertisement, a Google Shopping graphic, a Purchases on Google interface (or any search entity interface), any browser image or application interface, or the use of a payment request API developed by W3C.org. The merchant can provide their address and once the buyer provides their private key, the transmission of the cryptocurrency from the buyer to the seller for the appropriate amount for the product can be achieved. All of the processes then can follow for the product as normal, such as tracking, product delivery, communication of delivery information, cancellation, modification, etc. can occur.

In one example, to maintain the user's private key on their device in their wallet, the process could include receiving a confirmation that the user wants to provide the payment through bitcoin. Through an API, the merchant application can provide cost information, a transaction ID, merchant ID, merchant address, delivery charges, taxes, and/or discount data, etc. The API can communicate the data to the user's wallet directly or through a browser or a combination of both. The wallet can confirm and populate its fields necessary for a transaction such as the merchant address, the amount, notes, etc. The typical wallet can be modified to include transaction ID, merchant ID, user preferences (2-day shipping) etc. Much of this information, however, can also be provided through the API from an agent, the browser, a search engine, etc. Once the user's wallet is populated with the data for performing a transaction, the interface at the merchant site or application that the user is interacting with can then request a password or biometric confirmation to complete the transaction. Alternately, although less secure, the user could opt for just an automatic processing when the user clicks "pay" or a similarly styled button. With this interaction with the buying interface, through the API, a confirmation command instructs the wallet to carry out the transaction and transfer the altcoin(s) to the merchant or recipient. Where the wallet is integrated into a social media entity, there may not necessarily be an API with a protocol for communicating data between software components, but generally speaking similar processes occur between the application, a giver's wallet and a recipient wallet all within the context of the social media environment.

Currently, the payment processing systems for credit cards, debit cards and so forth are set up for use by merchants. Thus, in the standard payment approach through the API, the payment account information is passed from the browser or other agent to the merchant site through the API for payment processing. The payment account data can be transmitted to the merchant in a secure, one-time use fashion and configured such that the payment can be processed but the merchant cannot store the user's payment account data. However, if the user chooses an altcoin payment approach, it is unlikely they will want to send their private key to the merchant. Processing the altcoin payment differs from a standard Visa/Mastercard type of transaction. Accordingly, in one aspect, the API will receive from the merchant their address, amount, and/or any other data needed to complete an altcoin payment. The API can then provide that data to the user's altcoin wallet, whether the wallet is separate from a browser or other agent or integrated into the browser or other agent. The altcoin wallet then can make a payment to the merchant address of the amount of altcoin to pay for the product/service. A transaction ID can be associated with the product purchased. Notifications can then proceed to be communicated through the API back to the merchant. The user through the interface can be notified of the progress and of what is happening at the back end ("Amazon is sending data to your Bitcoin wallet for processing a payment" . . . "Payment confirmed of 1.2 Bitcoin for the Television"). If the user has multiple different altcoin wallets, they could be processed in a similar fashion in parallel. In other words, the user may be able to choose whether to pay with Bitcoin or Litecoin (or any other altcoins that they own). Depending on which is chosen, the particular processing to access that respective altcoin wallet is carried out for payment.

The above approach enables an integration of the use of cryptocurrency, even with its completely separate blockchain-based payment process, with other standard forms of payment and payment processing through an API such as the payment request API which simplifies the purchasing process by removing the need of a user to fill in payment form fields with name, address, payment account data, etc.

An example method of this approach can include receiving an indication that a purchaser has an altcoin account, presenting an option to make a payment using an altcoin account, and receiving a confirmation to use altcoin. The method includes communicating from a merchant site through an API with a browser or agent to provide information about a purchase of an item. The altcoin wallet can be configured as a separate application or integrated into a browser, application such as a social media application, or other agent process or component. The altcoin wallet receives the data about the purchase and processes the payment to the merchant or recipient. The wallet can populate its data fields with the information received through the API from the merchant. The altcoin wallet can include the ability to communicate the payment details through a protocol to the browser or through an API back to the merchant. The merchant site interface can communicate updates to the purchaser of the success/failure of using their altcoin account to make the purchase. A data feed can be accessed to provide current pricing in terms of dollars. If the item is $20 to buy, then at the time of the purchase, the user can see that it would cost say 0.02 Bitcoin to make the purchase and they have 5 Bitcoin currently. The examples can include the processing as disclosed herein from the viewpoint of the altcoin wallet, the browser, an application, an agent, a smart contract, either side of the API or APIs, and/or the merchant site. Therefore, claims can be directed to any component in this process and in any configuration (i.e., the altcoin wallet separate, or integrated into the browser, or integrated into an application, etc.). The ultimate goal is to make payment through altcoin as easy as a "one-click" purchase is for a Visa type payment.

Smart Contracts and Payment Processes

Figure 23:
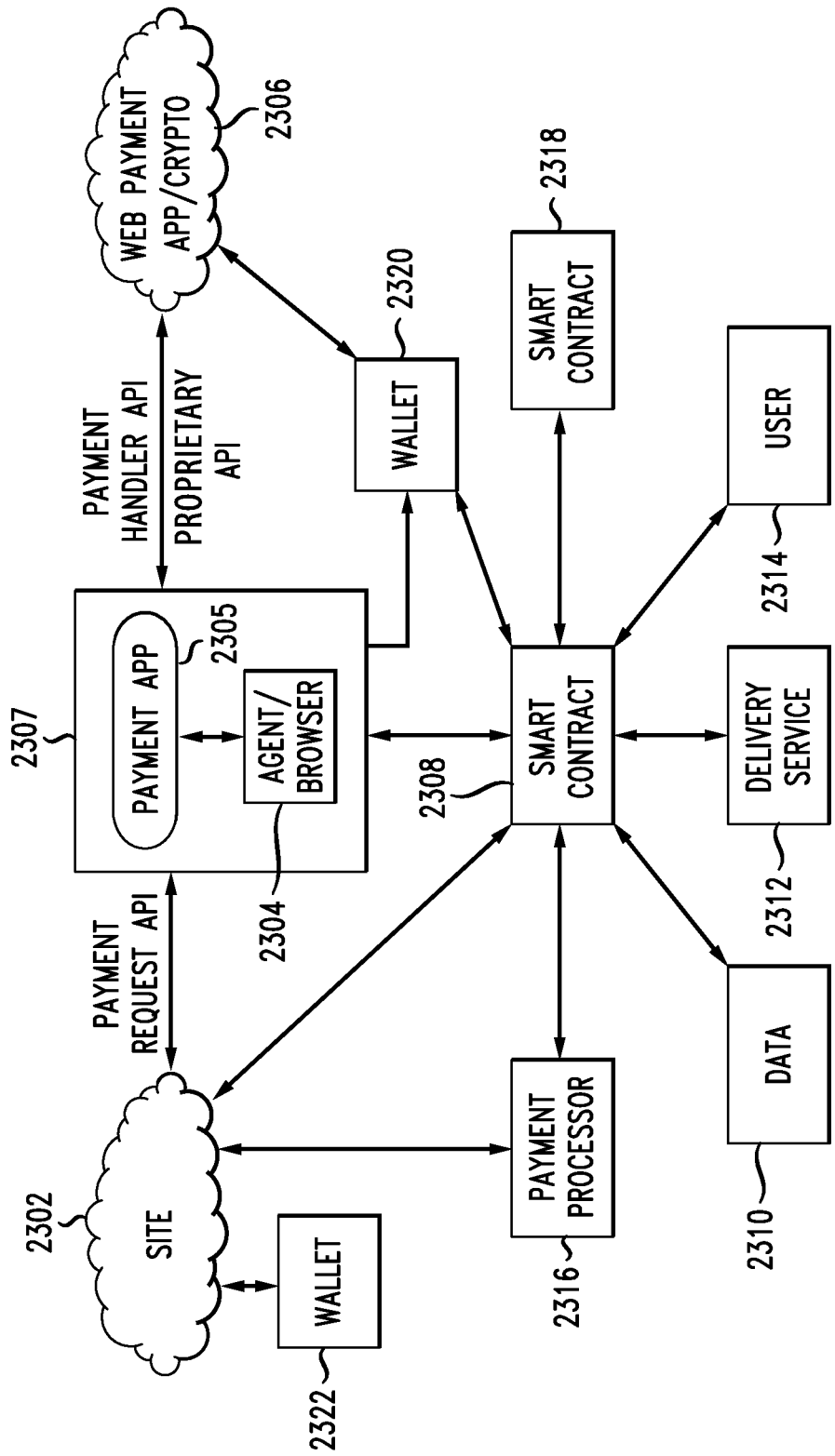
FIG. 23 illustrates a smart contract application in connection with the payment request API.

The processing for payments could also be achieved through the use of a smart contract. FIG. 23 illustrates a system 2300 in which the use of a smart contract 2308 renders a standard purchasing transaction as trustless. The smart contract 2308 is a program that can be implemented on the blockchain and that performs certain actions in a trustless manner. In other words, it performs its operations in a known and transparent way using the distributed approach of the blockchain technology. Smart contracts are autonomous, self-sufficient and decentralized. They automatically run and perform the programmed functions. There is no need to "trust" a human to perform one part of the contract. In one example, a smart contract 2308 can be used for all or part of the processing disclosed herein. Assume that the user interface viewed in a browser 2304 on their device 2307 shows a merchant site 2302 which provides an option for a user to buy an item using their altcoin. A user could also be using a social media application which provides objects with which the user can interact to make a transfer of value from one user to another of the social media application. The user confirms the purchase with a "pay" button. The amount say is 1 Bitcoin. The instruction or confirmation of that commitment by the purchaser can be transmitted with 1 Bitcoin to a smart contract 2308, operating on a blockchain technology. The seller of the item can perhaps confirm that they have the product and can deliver tomorrow. The recipient could be confirmed by the application. The smart contract 2308 can transfer the 1 Bitcoin to the merchant or recipient 2302 and send a notice to the buyer that the item is on the way based on delivery service data provided to the contract 2312. For example, if the buyer buys a pair of shoes, the system can coordinate the expected weight of those shoes to the weight of what the merchant deposits with UPS or other shipping service, much like the automated check-out in grocery stores weigh products that you scan, to confirm that the proper product is being delivered. That confirmation can be provided to the smart contract 2308. Or, the smart contract 2308 could be programmed to deliver the 1 bitcoin to the merchant wallet 2322 when a delivery confirmation occurs. At some stage, the communication and tracking of the packet can transition to a normal tracking and notification process 2312 such as is operated by Amazon.com for managing purchases made, return policies, etc. If a return is to be made, the merchant 2302 can transfer 1 Bitcoin to the smart contract 2308 which can then make a payment according to its protocol to the purchaser wallet 2320. Thus, in this respect, the disclosure covers all communications, requests, responses, and data communicated between a merchant site 2302, through an API, to a browser 2304, altcoin wallet 2320, 2322, smart contract 2308 and/or other agent to achieve a one-click purchasing option of using altcoins for payment in the same fashion as a regular payment account. Because of the different way that altcoins are used, current API's like the payment request API can be modified to accommodate the alternate payment structure of altcoins. By extending the API and including the components of the altcoin wallet and/or smart contract to carry out functions in the process, an improvement to the way purchases are made can be implemented to add the ability to pay through altcoins. These processes can also be applied to social media entities having a wallet integrated therein.

The concepts shown in FIG. 23 can also apply to an application operating on a device 2307 in which the Payment Request API operates between the app and a software module which can communicate via an API with the web payment app 2306. The app may have its associated wallet 2322 in a similar manner to the site 2302 having its associated wallet 2322.

Yet another aspect of this approach could be payments to the user's altcoins wallet 2320. For example, with the altcoins structure in place which can include the buyer's address and the merchant address, altcoins payments could flow both ways. Thus, small incentives could flow to users. Currently, if an advertisement is clicked on as part of a search engine result, the search engine gets paid. Integrating the user's wallet 2320 into the process could enable the advertiser to pay the buyer that clicks on their advertisement some altcoin. Graphics could show for example how much altcoins a user generates by clicking on the advertisement and browsing content on the merchant's site. When the user arrived at the state in the navigation where a purchase is made, the user could apply the altcoins they made via browsing to the purchase or keep them. All balances and adjustments at the conclusion of the purchase could be implemented in any fashion, including through submission to a smart contract. Special rates, discounts, incentives, etc. could be provided through credits to the user's altcoins wallet which are completed or finalized at the conclusion of a sale. Such credits could also automatically be made throughout the process. Thus, when a user clicks on an advertisement, altcoins could be transferred to their altcoin wallet automatically through the integration of their address with the browser/agent, or a promise to transfer altcoins of a certain amount could exist or be presented such that the final actual transfer occurs if the user clicks through and buys a product on the site. The transfer could even occur if the user does not buy with altcoins but with dollars or some other currency. This aspect covers all the variations on how a merchant would provide altcoins back to buyers as they interact with their site or through other means such as texting, emailing, social media interactions, and so forth. If a user likes a merchant or non-merchant site, that site can send altcoins to the user's wallet. This will enhance the user's experience and encourage them to engage more with the merchant or other site. The flow of value both ways can easily occur in the social media setting where advertisements can also be provided and where participants in the social media environment each have a cryptocurrency wallet. Then, participants can transfer value back and forth, advertisers can provide value to users, and merchants can sell products, provide points, and exchanges of value in many different ways can occur all within a single social media environment. In this regards, wallets of users can store different types of value such as cryptocurrency, fiat currency, points, airline miles, game points, etc.

Another aspect could be using the blockchain to store and maintain knowledge about transactions. A blockchain 2308 is a distributed database that maintains a continuously growing list of ordered records called blocks. Each block contains a timestamp and a link to a previous block. By design, blockchains are inherently resistant to modification of the data once recorded, the data in a block cannot be altered retroactively. Through the use of a peer-to-peer network and a distributed timestamping server, a blockchain database is managed autonomously. Blockchains are an open, distributed ledger that can record transactions between two parties efficiently and in a verifiable and permanent way. The ledger itself can also be programmed to trigger transactions automatically.

Blockchains are secure by design and an example of a distributed computing system with high byzantine fault tolerance. Decentralized consensus can therefore be achieved with a blockchain. A consensus algorithm operates to confirm a transaction which then gets recorded on the blockchain. This makes blockchains suitable for the recording of events such as purchasing transactions, tasks, or other transactions as disclosed herein.

The first blockchain was conceptualized by Satoshi Nakamoto in 2008 and implemented the following year as a core component of the digital currency bitcoin, where it serves as the public ledger for all transactions. The introduction of the blockchain for bitcoin made it the first digital currency to solve the double spending problem, without the use of a trusted authority or central server. The bitcoin design has been the inspiration for other applications.

For example, one could develop a blockchain record of all purchases made through a particular browser or in an application, for a particular user. The blockchain could also be narrowed down to tracking transactions using one payment account available through the browser API. If a user has a Visa account available on Apple Pay, all payments using the Visa account could be maintained on the blockchain. The blockchain could record purchases made through the API. In this regard, the API could be modified so that the data associated with the transaction is provided to the blockchain network. The records could relate to one or more of the pieces of information associated with the transaction (name, address, payment account, product, price, discounts provided, time of order, time of delivery, taxes paid, etc., whether it was a gift, returned items, follow on history of the purchase, context of purchase such as advertisement on Facebook, social media payment to an individual, or transition from a Google ad, etc.) The structure of such a blockchain could be accessible to other services. The management system that utilizes information about purchases to help a user can draw upon information in the blockchain for that transaction or for that browser. Other transactions such as Amazon.com purchases could also be input to the blockchain for that user or that account.

The claim could cover receiving information about a purchase made via the Internet and creating a blockchain record utilizing the information. As later purchases are made using the account, API, browser, PWA, application, person, etc. can be added to that blockchain to record and make available the information.

The problem to be solved is as users buy products across the web using the API or make payments in a social media context, how does one access the ease of managing those purchases or payments, tracking the purchases, cancelling a purchase, changing parameters (shipping model), and so forth. There is no mechanism for a person to go to one place where they can see all of their various purchases. If each purchase for a user is added to a blockchain, private or public, and there is an API or mechanism for reporting purchases across the internet to a blockchain that is continually built based on each purchase then this disclosure also provides the ability to then access that data for an individual. Access to the blockchain for that individual could be granted as part of the authorization for a purchase (fingerprint for Apple Pay or CVC code for a VISA purchase). An agreement could include that when the user authorizes the payment that includes an authorization to add to or access their blockchain of purchases or transfers.

If the user is basically accessing their purchase history to make changes or track a purchase, the user could authorize access to their data through a user interface and when that access is granted, information on the blockchain can be converted into a user interface similar to the listing of products purchased on Amazon.com but across merchants and/or apps. In one aspect, too, a user could sell access to their blockchain. Users may make money by offering people access to their blockchain. Some information in that case could be anatomized such as their name and address. The data could be provided on an anonymous basis such that the data is provided for product, time, context, and zip code but not name, address, account number, etc. In one example, a social media entity could provide value to users of the social media entity for access to their purchasing or payment history.

In one aspect, a merchant site will receive the payment information through use of the API as a tokenized payment or as a payment account number, name, expiration date, etc. The process with the blockchain can use that information in whatever form it is to identify which blockchain to access to append the data of the current transaction. It could also be accessed through some other mechanism like the user's name or another ID number associated with the browser or application.

Further, the blockchain may be identified by the user identity and thus multiple accounts could be associated with the user and stored on the same blockchain. Other data such as the user's body model which stores their shirt, pants, shoe sizes and other body related data can also be stored in the blockchain. This data could be accessible by a social media entity that is enabling a transfer of value from a user of the social media entity to another user or business.

The blockchain could be built from browser API purchases or any other purchase including brick and mortar purchases. A user could sign up for a service that would cause each purchase using their various accounts that they use to be reported to a blockchain service such that the user can access all of those purchases from a single user interface, similar to how users can access and manage the history of purchases. A blockchain service can be established with an API that companies interact with whenever the user makes a purchase, whether it is on line, at Amazon.com, through the browser API, via an application such as a social media application, etc. A parameter could be set associated with the payment account or user account such that a certain set of details associated with the purchase are communicated to the blockchain service API. Thus, if a person purchases a book on Amazon.com using their stored VISA account, the details of that purchase can be communicated through an API to a blockchain service provider who creates a block for that purchase. Next, the person buys a hammer at Home Depot using the Visa card. Because the parameter is set, the details of the purchase including one or more of the purchase of the hammer, the time, the location, etc. can be communicated to the service via the API and that purchase can be added to the blockchain. Next, the question is how does the user gain access to the data of all those purchases? The user may want to go back and return the book. Where people are making purchases across different merchants and different payment approaches (some merchants will use a shopping cart, others will use the browser API, Amazon.com, in person, etc.) users will desire to have all of their purchases available for management at one location. The blockchain service can offer a management user interface which presents to the user the purchasing history and status. The blockchain service can also receive tracking information from distribution entities (FedEX, UPS, etc.) through an API that can associate a tracking status with the particular product and include updated data on the block chain. Thus, in this respect, the blockchain can be continually updated. The blockchain service can present the information via the user interface. The access to the user interface can be via a website, an app, a browser API interface, a selectable object or a selectable menu via social media, in a digital wallet interface, or an Apple Pay interface or Android pay interface, etc. In other words, at any virtual location where the user "is", a selectable object can be presented which enables the user access to the purchase management interface. The selectable object can also be presented at multiple locations available to the user including options within the browser. For example, in Amazon Assistant or another plugin to a browser, the service can provide an updated listing of previous purchases and their status. The underlying data for this status update can be based on the blockchain. A social media entity can also provide this functionality and access to such data.

Further, the information that can be stored in the browser, such as payment account, address, etc., can be stored on the blockchain and accessed from the browser. A separate API could also be called to a service which stores that information on the blockchain and returns the payment account data, a token, address information, name, etc. Thus, the blockchain could hold the information rather than the browser, and once the browser receives an API request for payment information and/or other information associated with a purchase, the browser can access from the blockchain the necessary information. This can occur in several steps as well. Further, the merchant site could also access the information from the blockchain as well through an API directly to the blockchain rather than through the browser functionality. Using this approach, an individual could store in one blockchain their payment information, address, etc. and any site that needed that payment information could securely access it through the appropriate API. A digital wallet on a device could be the mechanism to access the blockchain with the information. The browser (any time "browser" is used it also can cover a user interface, an application, a social media entity, or an agent for the merchant), once it receives an API request, could identify that rather than having a Visa account stored in the browser, that the blockchain digital wallet (or access agent) is to be used to obtain the information. The browser communicates with the access agent to retrieve the information from the blockchain and return it to the browser. The browser communicates the information through the browser API to the merchant site for payment processing.

Another aspect of smart contracts is discussed next. The implementation of the W3C payment request API and the payment handler API is expanding. The payment request API has been implemented or is in development, for all of the major browsers in the world. A follow-on API is the payment handler API, which will enable web-based payment services such as PayPal and others to be able to tap into this payment ecosystem. The payment request API enables locally stored payment information to be accessed via the browser and transmitted to a merchant site along with any other necessary data to complete the transaction and handles the delivery of the products to a recipient. One result of this new ecosystem is that it brings a one click purchasing element, which was only previously available on Amazon.com or Apple (through a license of the Amazon one click purchasing patent). Amazon grew to be very popular because of its simplified payment process and trusted environment for handling sales and easy delivery of products.

With these new APIs, any mom and pop website can implement a similar payment functionality which can increase sales and conversions. This is particularly true on mobile purchases. Cryptocurrencies, web-based payments, peer to peer payments, basic card payments are all being handled through one or more of these APIs. In some cases, cryptocurrency wallets can be integrated into applications to enable peer to peer payments. However, there is still an issue with respect to trust. Users typically can trust the Amazon environment to provide good service and that the merchants from which purchases are made in Amazon.com are legitimate and will deliver the products and not misuse the payment information. One benefit of the APIs discussed above is that the user does not have to register their credit card at many different websites across the Internet. The APIs can provide one use token which is created for that particular transaction.

A problem still arises, however, if a small merchant site is dishonest and utilizes the API to process a purchase but then does not deliver the product. Further, buyers may inappropriately request chargebacks from small merchants which is also fraud. Internet fraud cost billions of dollars a year, and with the increase in online purchases and mobile purchases which will continue to grow with the payment request API, the problem is only going to increase. While the payment request API will help to solve some of the problems with sensitive data being stolen from online merchants, because credit card information no longer has to be registered with multiple merchants online, the problem still exists.

Fraudsters adapt to many of the previous tactics which have been deployed to try to prevent online fraud. Many companies implement expensive protection models, such as fraud scoring models address verification services, IP geolocation, and so forth. They try and study transactions to determine whether a transaction raises a red flag in an automated process that is then handed off to a review team for further analysis. Merchants also worry about fraud in terms of fraudulent chargebacks by customers. Expensive analysis occurs in which merchants try to identify patterns and fraud and such chargebacks and adjust their processes accordingly. They can gain some benefits and efficiency and customer service.

Historically, large online merchants have experienced a greater decrease in fraud compared to other merchant types. These large merchants have the resources to utilize fraud prevention practices as described above. With the implementation of the payment request API, one-click type purchasing will be available to any merchant, large or small. Thus, the need for greater fraud protection for any merchant of any size is critical. The solution proposed herein provides an inexpensive and efficient solution to product fraud prevention in online sales and can completely eliminate the large ongoing investment in fraud. Fraud prevention according to previous efforts is very costly and complicated.

For example, a company called Verifi provides fraud and risk management services and outlines a number of tools which they use, such as a fraud scoring model, multi-merchant purchase velocity, paid for public record services, card verification number, shared negative lists, social networking sites, device fingerprints results, customer order history, contact customer to verify order, payer authentication, address of verification services, two factor phone authentication, contact card issuer, and so forth. These manual processes and developed systems are very expensive to manage.

One solution which is disclosed herein for alleviating this trust issue and the high cost of fraud prevention and risk management is to implement smart contracts for transactions that occur as part of the payment request API and/or payment handler API. These APIs receive basic information about the product, the sale price, the user's address, and so forth. The information that is exchanged now, or that could be exchanged with modifications to the APIs, will enable a blockchain smart contract to manage the transaction and prevent or eliminate fraud.

A smart contract is a piece of computer code that is capable of monitoring, executing and enforcing an agreement. The code basically says if X occurs than do Y. That is not a new concept. However, the smart contract coding combined with the potential of the blockchain to interact with multiple financial systems, cryptocurrency wallets, user accounts, social media entities and so forth, enable a new era of managing financial transactions. A smart contract can be placed on a public permissionless blockchain that can control the execution of the agreement such that it is no longer in the hands of a single party in the interaction and no longer be limited to a closed system, such as a centralized bank ledger. The proper execution of the contract would be verified by the network of computers connected to the blockchain. The same network would update the blockchain to record the execution of the contract and monitor the blockchain for compliance with the terms of the smart contract. A social media entity in one aspect can run the blockchain and can confirm one or more of the various types of transactions between users of the social media entity.

The types of transactions that are envisioned here are simple sale transactions of products, although of course the principles can apply to any purchase or transfer of value between users. These transactions are typically between two private individuals such as a seller and the buyer. In one example, a smart contract can handle the sale of the car between two private individuals. Having agreed upon a price, they could use a standardized smart contract to input the price and the vehicle registration details. The smart contract can execute the agreement by verifying that the seller is the true owner of a vehicle and transferring the cash and then reregistering the vehicle in the name of the purchaser. Third party services can provide through an API or other means data needed for the smart contract.

Typical sales on the Internet are not as complicated in terms of needing to transfer title of a vehicle to a buyer. However, a smart contract could underlie every Internet purchase via the payment request API. If a user buys a pairs of shoes from small merchant.com, and via the payment request API, the user clicks on the pay button and then enters in their CVV code to complete the purchase, an aspect of this disclosure is that from that interaction, namely from the payment request API interaction, a smart contract could be created which receives the information about the sale price, receives a confirmation of the product from the seller, and could even tap into such information as delivery progress via tracking facilities which are known to those of skill the art. The smart contract could hold in escrow dollars, or hold cryptocurrency, such as bitcoin or ethereum, to the seller until after the product is confirmed to be in transit to the recipient, or completely delivered. The users could even interact with the payment request API interface with additional options for even creating the smart contract or selecting terms of the smart contract. The API could also be used to negotiate which smart contract to use based on the product, availability of delivery tracking services, verification services, and so forth. For example, if Apple Pay is used with fingerprint authorization, a certain smart contract might be applied for that transaction. An omnibus smart contract could also be used that is just passed parameters to turn on and off for that sale. Smart contracts could underly transfers of (cryptocurrency) value on a blockchain network between users of a social media entity as well.

For example, as part of the API interface in which a user is selecting their Visa card stored within the browser and selecting a delivery address, an option could be presented to manage this contract on a smart contract basis on the blockchain. Perhaps both the buyer and the seller would need to agree to such an approach at which point the details of the transaction could be accessed either via the browser or via another API, which can receive the same basic kind of data that is communicated through use of the payment request API so as to implement the contract on a smart contract and the blockchain. The browser or application again can act as an "agent" of the transaction and communicate with an API to the smart contract all of the necessary data to manage the progress of delivery of the product and distribution of the payment.

In this scenario, the buyer would then not have to trust the seller with the fact that they actually have the shoes and actually will deliver the shoes in exchange for their payment. Those terms can be exchanged properly on the blockchain and in the smart contract without the need to trust the other party. This approach is highly beneficial because there will be a shift of purchasing capability and transactions away from amazon.com and into more individual websites and sites as e-commerce continues to expand. The more trust that can be built into transactions with these various sites, the higher the likelihood of successful transactions and customer satisfaction.

In another example, a system could be implemented to evaluate a website that the user is accessing and surfing for products. If there is any question about the viability of the site, the system could cause a flag to be turned on, which would implement the potential for an interaction via the payment processing interfaces for the user to implement a smart contract to carry out the terms of the sale. A merchant website could be programmed to either automatically accept a smart contract for handling the sale or reject such an approach. Furthermore, merchants may automatically implement a smart contract approach. If that is available or possible via the payment methods that the user has available.

For example, if the user has an Ethereum wallet, then the opportunity to use a smart contract can be established and they could pay via Ether and an option could be presented. If they choose Ether over their Visa credit card for the payment for that item, the smart contract could be then used.

In another aspect, if the user does choose dollars via Visa or debit card and so forth, and yet they want the transaction to occur via a smart contract, in one aspect, the dollars to be converted into a crypto current which can then be entered into the smart contract such that the crypto currency can be delivered by the smart contract upon the confirmation of the sellers performance.

Now, one aspect of the communication between a site and a browser via the payment request API is the coordination and matching of payment methods available and used by the site and payment methods offered by the user. For example, if the site accepts bitcoin, PayPal, and Apple pay, and the user has a Visa credit card and bitcoin, then the matching payment method would be bitcoin and that's what would be presented in the API interface. In the present scenario, an exchange of information could also be provided with respect to whether the contract or the sale should be managed by a smart contract on the blockchain. For example, the site might be programmed to be able to provide data to the smart contract about the proper availability of the product and that they use a delivery service also communicating with the smart contract, but the browser may not be updated or the user may not have authorized the use of a smart contract. Accordingly, one aspect of this disclosure is the coordination and determination of whether a smart contract is available and if the technical capability exists to be able to carry out the transaction on a smart contract. This disclosure covers all of the necessary inquiries and replies, and can include the communications between a site, a browser, a separate web payment application, a smart contract, and any other services that might be associated with the transaction. This coordination will be used to evaluate whether both parties have the technical capability to implement on a smart contract. The functionality can also apply to a social media application that offers different payment mechanisms to enable users to pass value from one user to another with an underlying blockchain network used to record transactions. In some cases, the social media network can provide opportunities to make payments in any format that the user is comfortable with (as well as the recipient) and the application can handle exchanges and transfers between currency types (crypto to fiat or fiat to points) such that transfers of value are simple and convenient for users.

Assuming that the transaction will be managed on a smart contract, the following example will help establish the functionality.

FIG. 23 illustrates the basic elements 2300 of a transaction. A site or application 2302 is going to sell a product, service, software, enable a transfer between users of a value, or any other item. The buyer is using a browser 2304 that communicates with the site via the payment request API as set forth in the W3C standard. The API could also be a proprietary API such as the Apple Pay JS API. All of the details of these standards are incorporated herein by reference. The payment request API can provide payment data stored in the browser or embedded within the payment application 2305 on a device 2307 that's running the browser 104 where online payment services like PayPal, or any other payment service might be utilized, the payment handler API communicates between the browser and the web payment app 2306. Other proprietary or platform specific APIs could also be used.

Ultimately, in any of the scenarios of payment to the sites 2302 by the user, data is transmitted through the payment request, current API to the site. The API might transmit a credit card number, a token, an encrypted packet of data, and so forth which the site can utilize to process the payment for the item. The payment request API might transmit a confirmation received from the payment handler API that a web payment app 2306 has already paid the merchant for the product. This disclosure enables a variety of payment methods to be made available in one simple system and via one interface such as one website or one application.

Let's assume that the site 2302 is selling cars. The user wants to purchase a car online. The buyer through interactions with the browser and the website of the seller commits to purchase the car. If a smart contract is going to be used to manage the process, then funds from the seller are stored in a smart contract 2308. The way this could occur according to the payment request API, is that the data that is transmitted through the payment request API and/or the payment handler API that contains the token or the credit card amount, and credit card information, rather than being delivered to the site for payment processing, could be delivered and held at the smart contract 2308. In other words, the response component of the payment request API, which includes the core payment processing data which the site may either use to process the payment itself, or utilize the payment gateway such as stripe or some other service which receives the one-time use token and processes the payment, could essentially be rerouted to the smart contract for holding. This is an ideal scenario, where in many situations, the proper data associated with the payment amount, the payment method, and so forth are encrypted in the one-time use token. In some cases, using the smart contract, the data may need to be manipulated to be in the proper form and usable by the smart contract. For example, if a basic card component is used, and the payment request API is simply transmitting a credit card number, expiration date, name, and so forth, to the site, part of this process could be to preprocess that information and tokenize it into a form usable by the smart contract. Cryptocurrency could of course also be stored in the smart contract as well. Conversions from dollars to cryptocurrency or any other format used by the various payment methods could also be used. The smart contract could also be used to record a new title to the item on a blockchain network.

The smart contract could also be programmed to receive any type of payment data and store that data. For example, if the data is simply the credit card number, the smart contract can hold that number and then provide it to the site at the appropriate time, and then forget the number. The smart contract could be flexible enough to adapt to any payment approach. The payment information may also come from the web payment at 106 and be provided to the smart contract 108.

Now if the user is buying a car, assume that the buyer has seven days to have the car inspected. The smart contract holds the funds provided by the buyer. The title to the car could come from a data source 2310 and also stored in the smart contract. A digitized version of the title could be established and verified after seven days, by the smart contract 2308 which can automatically release the funds to the seller 2302 and the title to the buyer 2304. However, before seven days, if the car fails the safety inspection, or needs repairs more than, say 10% of the purchase price, the funds can be returned to the buyer and the title is returned to the seller. The data 2310 can represent input from sources associated with the transaction. For example, if the buyer mechanic agrees that the car fails the safety inspection, that information can be provided to the smart contract. If the seller manic mechanic agrees, that information would be provided to the smart contract 2308. Accordingly, data 2310 is meant to represent any authorized party that has data relevance to the transaction. The payment request API and/or payment handler API can include selectable graphical or audible options which can be included within the terms of the smart contract. Timing elements, amounts, or any term of the smart contract can be presented as an option via the payment request API.

Returning money to the buyer could be returning cryptocurrencies which are being held in the smart contract back to the buyer or could simply involve deleting the payment data stored in the contract. For example, if the smart contract 108 is storing a token which embodies the amount to be charged, and the visa account of the buyer, that information could simply be deleted and thus not charged if the terms are not met.

Where a user is purchasing a product on the Internet, one aspect of the process could include the smart contract 2308 holding the payment data for the transaction and then confirming delivery information from a delivery service 2312. For example, once the delivery service reported a package delivery at the home of the buyer, the smart contract 2308 could automatically release the payment to the merchant 2302. Again, this releasing of the payment to the merchant could embody multiple different payment methods. For example, the smart contract 2308 could provide the payment information, token, or any other form and payment data directly to a payment processor 2316. A payment gateway could be in communication with the smart contract 2308 to handle this process. Typically, it is anticipated that the smart contract 2308 would release the payment by simply providing the payment data to the site 2302 in the same structure as is being established through the protocols of the payment request API. In that manner, no other changes would have to be made to the payment infrastructure that is in existence. This process would involve only a minor modification of the process so as to include the smart contract in order to prevent fraud.

The delivery service 2312 could also include such data as a weight of the item deposited. Much like a grocery store self-service checkout that enables you to buy a can of soup by scanning it and then placing it on the scale to compare the weight of what you placed on the scale with an expected weight of a can of soup. If a user buys a pair of shows on-line and is using a smart contract, and the merchant packages up the shoes and gives the package to UPS, UPS can weigh that package and compare its weight to the expected weight of the shoes which can confirm that the proper product was deposited for delivery to the user.

Where users donate to charity, smart contracts could be requested by the user to confirm the recipient is a valid charity organization. Smart contracts can prevent much fraud in disaster funding like hurricane or flood recovery efforts. Often sites crop up to fraudulently obtain easy money. With this approach, the giver can request a smart contract for charitable donations which can include as an element a confirmation of the validity of the recipient organization.

Some of the services that were outlined above with respect to fraud prevention and risk management, such as a fraud scoring model, negative list data, payer authentication, and so forth, could be provided to the smart contract via source 2310. For example, part of the processing of the smart contract could be to receive buyer information and to communicate that data to a fraud prevention service. The fraud prevention service could return a score or a probability that the buyer is a potentially fraudulent buyer. That score could cause a number of changes to occur in the transaction. For example, if the score reveals a relative likelihood that the buyer could be a problem, a fraud prevention charge could be added to the transaction. Indeed, accessing this data could also occur outside of the context of the smart contract and in the initial process of communicating data between the site and the browser to establish the payment price shipping charges, and so forth. In other words, the payment request API could be utilized to reach out to a fraud prevention data service. Inasmuch as information about the buyer is available as part of the data communicated within the API.

It is noted that within the basic infrastructure shown in FIG. 1, that many other variations could occur. All interactions between the various components are considered as within the scope of this disclosure. For example, one aspect of this disclosure could be to establish the smart contract as part of the transaction that occurs between the payment request API and storing the payment token within the smart contract. The interaction between the site and the user via the API interface could include options to be built into the smart contract. For example, the buyer may release the funds to the seller upon deposit of the purchased item with the mail delivery service. Any selectable variation on how the smart contract should be functioning can be selected as part of the payment request API simplified interface. Thus, a user could select their Visa, their home address, expedited shipping, and smart contract parameters and then confirm the purchase.

Inasmuch as chargebacks or a fraudulent problem from the standpoint of the merchants, the smart contract could also build in protections to prevent such chargebacks. For example, the reverse process could occur where if the smart contract is utilized to implement the initial transaction, the same smart contract, or new smart contract, should be used to handle legitimate chargebacks. Thus, rather than the sites 2302 paying back the user, the money, or a token, or data packet could be stored at a smart contract 2308 and held for release until certain confirmations are provided that it is an appropriate chargeback. For example, if the user asserts that they did not receive the product, and thus want to be reimbursed, the smart contract could store and have access to the delivery service 2312 data which can confirm the position of the buyer. It is been estimated that 86% of chargebacks are dishonest. Customers often will receive a chargeback and simply keep the product that has been delivered to them. By handling chargebacks via a smart contract 2318, the money can be stored and held until confirmation is provided to the smart contract that the chargeback is appropriate. It may be as simple as the user 2314 interacting with the smart contract by confirming in some manner that the product was never received, or that the product was defective. The user may only need to use a fingerprint reader to confirm their identity. That information could include such data as photos, video of the user opening up the packages it was received, video of other people who also witnessed the situation, and so forth. Smart contract 2318 can represent any second smart contract that communicates with the first smart contract for any reason. It could be to handle a chargeback, or to coordinate between multiple transaction-smart-contracts for a user, or a defined group of users, and so forth.

Requirements such as these will inevitably reduce to some degree the amount of fraud. Thus, by providing a smart contract which requires further evidence such as video, images, testimony or data from another data service 2310, such as a local merchant who confirms the state of the product via interaction with the smart contract, a more efficient chargeback fraud prevention system can be in place.

The data 2310 shown in FIG. 23 can represent any kind of data associated with fraud prevention. Such data can include negative list or information from financial institutions in which a financial institution can cooperate or provide information to identify a fraud attempt to reduce loss and costs associated with chargebacks. IP geolocation services can also be provided which can enable proxy information via IP address. Such information can provide noninvasive insight into the risks involved with accepting transactions from a specific IP address, negative lists, digital fingerprinting, and AVS (address verification system) authentication, which allows merchants to verify the cardholder's billing address with the data on file with an issuing bank. A system can provide CVV verification data (which is the three digit code that is used as part of the payment process).

As can be appreciated, any fraud prevention or reduction methodology can be incorporated into this process and utilized by a smart contract to more efficiently and easily complete successfully a purchasing transaction utilizing the new payment request API in the payment handler API.

All of these approaches can also be applicable for preventing fraud and using smart contracts in the context of peer to peer payments between users of a social media entity. As noted above, in some cases, the communication between an application and a cryptocurrency wallet, when the cryptocurrency wallet is integrated into the application, may not be through an API but similar communications may occur within the context of the social media entity.

Note that in FIG. 23, the communication to the smart contract comes from a number of different sources. Again, for example, the actual payment data that stored in the smart contract can come directly from the browser, or it could come from the site or application. In other words, via the payment request API, the site will receive a response from a payment request, and the response will include in one aspect, the necessary payment data to process a payment for the product. Rather than actually processing the payment, the merchant could forward that data packet to the smart contract rather than processing the payment. The merchant could then ship the product and provide the information to the smart contract that the product has been shipped and identify the delivery service 2312 that will be tracked. Once the product is partially or completely delivered, as notified to the smart contract 108, the data package with the necessary payment information is delivered back to the site 2302. Again, one of the benefits of this approach is that there is no need to re-program or reinvent the basic underlying payment processing that occurs by the site 2302. Given the simplicity of the use of the payment process with the payment request API, the additional programming that might be necessary in order to manage the transaction via a smart contract would be minimal.

In another aspect, a tokenized payment for a product could be processed by a smart contract to handle a partial payment to a merchant upon an initiation of the process with a final payment made upon delivery. Thus, a token generated through a process like Apple Pay could be stored at a smart contract with partial payments made based on achieved events.

As noted above, fraud prevention using a smart contract can benefit both the merchant as well as the customer. Accordingly, in general, there is incentive on both sides to perform the transaction via a smart contract. Whether the implementation of the smart contract is required by one or more of the parties or whether it is voluntary, all of the mechanisms (processes, protocols, requests, responses, modifying of data or protocols, etc.) that are possible for providing the underlying data associated with the purchasing transaction through the use of the payment request API and/or the payment handler API are contemplated as within the scope of this disclosure. Communications within an application which have payment accounts or cryptocurrency wallets are also contemplated as within the scope of this disclosure. Indeed, the steps performed to initiate the use of the smart contract also be distributed amongst the site, the browser, an application, a web payment app, a payment processor, and so forth. To initiate the use of a smart contract, which then tracks the progress and performance associated with the transaction, the system can utilize any one or more components disclosed in FIG. 1. Other data sources or components can also be included which are not disclosed and might be necessary for a particular transaction. Thus, recording real estate deeds, medical information, software purchases, and so forth involve information and records that can be managed or recorded or tracked via a smart contract. The novelty of the concepts disclosed herein is how to initiate and implement a smart contract-based transaction in which the payment request API and/or payment handler API are utilized in connection with an interface to the user or in an environment in which a cryptocurrency wallet is integrated within an application. All of the terms and data associated with a smart contract can be of course recorded on the blockchain.

All of the basic components of smart contracts such as the use of the public key and a private key and so forth are considered within the scope of this disclosure. Ethereum was designed as a smart contract platform. In one aspect, the Ethereum Virtual Machine (EVM) would be considered as an example platform where smart contracts can be run in Ether. It is a Turing Complete programming language. As a distributed global computer, it can be the location where the smart contracts are executed. A company called Blockcat also provides an interface where smart contracts can be easily implemented. Users can simply choose some of the basic components of the smart contract and implement a smart contract for a transaction without needing to know how to actually code the contract. The user can also request a smart contract as part of the API payment interface. It is these kinds of concepts and technologies that can be modified for use in the present disclosure. Rather than the user choosing particular terms for smart contract, the data that is available via the payment request API interface can be easily accessed to essentially pre-populate necessary input in order to establish the terms of a smart contract for particular interaction. The key with this approach is that it places the creation of the smart contract in the middle of the future of on-line purchasing transactions in an efficient and effective manner.

All of the principles herein can also apply to any payment interface as well, even traditional check out processes or Amazon's one-click purchasing process. Payment interfaces built into social media networks for making payments between users can also apply. Any checkout procedure can include additional options to process the transaction via a smart contract.

Assume that the smart contract disclosed herein is run by the EVM. There must be a mechanism to limit the resources used in each contract. Every single operation that is executed inside the EVM is simultaneously executed by every node in the network. A transaction contract code can trigger data reads and writes into expensive computations like using cryptographic primitives and make calls or send messages to other contracts as well. Thus, in one aspect of this disclosure, the smart contract 2308 that is created as part of the payment request API transaction, could actually communicate with, send messages to, receive messages from, make changes to, and so forth with, other smart contracts. For example, a buyer may have multiple transactions that are occurring simultaneously and they just purchased five products from five different websites. One aspect of this disclosure could be to coordinate and communicate data between an individual's smart contracts that all are currently pending for purchases that they have made. This can increase the efficiencies of the system. A user may also have their own standard smart contract that learns through machine learning their own patterns and practices in purchasing.

Each of the operations associated with smart contracts have a cost measured in the term "gas". Based on the gas/ether price, which changes dynamically, each guest unit consumed by a transaction must be paid for in ether. This price can be deducted from the Ethereum account sending the transaction when using the EVM platform. Then, one aspect of this disclosure can be to convert from dollars to Ether in order to carry out the process on the smart contract. It is anticipated that this process would be transparent to the user. The transaction can also have a guest limits parameter as an upper bound on how much gas the transaction can consume and can be used as a safeguard against programming errors that could deplete the account. In this scenario, inasmuch as the smart contracts are initiated in order to prevent fraud, it would be anticipated that the cost of using a smart contract in order to pay for the computations necessary to perform the contract, would outweigh the cost of fraud. Paying for other project prevention services can be eliminated, fraud can be reduced, and in the end, merchants both large and small can make and increase revenue.

In some scenarios, the smart contract might need to communicate with individuals or receive data. The smart contract could be loaded with communication information such as cell phone numbers, email addresses, social media account names, and so forth. If a user buys a piece of real estate using the payment request API, there may need to be some documents scanned and provided to the smart contract which could handle recordation requirements. Thus, the communication between the smart contract 2308 and a user 2314 can represent the smart contract initiating an email or text or other communication to the user requesting certain information. An interface could be provided which enables the user to confirm data, attach data, provide a picture or photo, provide commentary via text or audio, electronically sign documents or any other function that might be necessary in order to further the process of the transaction.

One example of how smart contracts might operate could be in a sale of a patent. Assume the patent is issued, which has a general applicability and is considered essential for a transaction that is widely used across multiple websites or browsers or vehicles, and so forth. Rather than litigation, the owner of the patent could utilize a smart contract to strive to settle with the affected parties and license the patent in the end or essentially donate the patent to the public upon receiving a satisfactory settlement.

The process could proceed as follows. A smart contract could be set up which basically receives crowd funding from interested parties in the patent via a cryptocurrency such as bitcoin, Ethereum, and so forth. Assume Amazon's one-click purchasing patent was being offered by Jeff Bezos for sale to the world for anyone that wanted to use it. The contract could be set up such that upon receiving, say, $100M in value, the smart contract could automatically implement a process of abandoning the patent. This would have the effect of making the patent available for anyone to use. The smart contract could store, for example, a power of attorney and signed documents which are verified by third parties to be effective in expressly abandoning the patent. Other documents, such as covenants not to sue, and so forth that might be necessary to handle prior infringement could also be provided and store the smart contract. Upon hitting the threshold amount of money, the smart contract could email these documents to a reputable law firm who would then file the power of attorney and the express abandonment documents. The smart contract could have registered with it three other reputable firms that, upon the publication of the notice of abandonment, would review the material and confirm in their professional judgment that the cases have successfully been abandoned. Each of these law firms could then interact with the smart contract to confirm in their judgment that they have seen the notice of abandonment. A small fee could be provided for the service.

Such documentation could also be provided to the smart contract. Data 2310 could represent services provided to the smart contract such as optical character recognition services for such documents. For example, services could be provided which could review such documents, perform character recognition, analyze the contents, and also electronically confirm that the proper patent, and that the proper language is in the document, which indicates that the patent is abandoned.

Upon such proper confirmation, the smart contract could then transfer the crypto currency or any other currency or combination thereof, from the smart contract to the patent holder for payment. As noted above, this payment could be a token that is a one-time use token, credit card information, account information, crypto currency, digital assets, or any other form of payment.

The smart contract could also provide data such as videos, explanations of the patents, and so forth which can enable a potential contributor to the smart contract to understand the material. Thus, in the above scenario, if an essential patent were to be placed in such a smart contract, the businesses affected by the patent could review the material, evaluate the potential issue to their businesses, and determine to contribute in a crowd funding sense to open sourcing that patent. Businesses could be safe in knowing that if they contribute, the only way that the actual payment would be received by the patent holder would be if the threshold was met on the payment amount plus the actual confirmation of abandonment of the patents. If the threshold amount was not met, or if the patents were not successfully abandoned, then other remedies could be provided such as returning the money to the contributors or seeking to take other approaches to accomplishing the abandonment process.

Of course, rather than abandoning the patent, the smart contract could enable a licensing process in which, once the threshold is met, individuals that have paid into the smart contract could receive their license. In another scenario, no threshold could be established, and anyone who simply paid into the smart contract can receive an individual license.

In some aspects, the smart contract described above can be completely independent of the payment request API as well. Similar smart contracts could be established for any kind of transaction.

In one scenario, a family of smart contracts could be developed for all kinds of standardized transactions. As users may desire to use such smart contracts, they could simply describe their transaction and receive a default basic smart contract that the name can configure for the particular circumstances and then use. Where a transaction is occurring via the payment request API or other APIs, the API protocols can include a code or a description of the kind of transaction that is being accomplished, and the kind of infrastructure that is necessary to manage that transaction through a smart contract. This could include transactions between users of a social media entity such as transfers of value between users.

Underlying the payment request API could be a host or a group of smart contracts from which the appropriate smart contract could be selected based on the data communicated in the API. For example, if the intersect between available payment options at the merchant and the payment options available for the user only includes bitcoin, then the bitcoin product sale and delivery smart contract could be selected and utilized for that transaction. If necessary, other data can be communicated between the smart contract and the site. For example, for the transaction to be initiated upon a smart contract, just as in the situation where the payment request API confirms payment capabilities that correspond to both parties, the necessary capabilities to be able to track product through the delivery process, the ability of the merchant to take certain steps that might be necessary for the transaction, and so forth, could be preliminarily determined before the transaction gets implemented via the smart contract. Thus, assuming that the merchant utilizes a delivery system such as FedEx or UPS that provides the necessary tracking and delivery service data 2312, and assuming that the user can pay in bitcoin, then that transaction can be implemented on the Blockchain smart contract so as to be implemented in a way that does not require trust on either side of the transaction.

The various necessary requirements of receiving data, transmitting data, confirming data, processing data, analyzing data, evaluating data, communicating data, handling a payment, transmitting a payment token or packet associated with payment information, all can be performed by one or more of the entities disclosed in FIG. 1. The concepts described herein can be claimed from the standpoint of any of the components. For example, the site 2302 can perform the steps of transmitting a payment request to the browser 2304 and receiving a response according to the payment request API protocol. The site can transmit data to the smart contract 108 which can include an identification of the product, a confirmation that they have the product and have deposited the product into a delivery service. The smart contract can be claimed as an example of this disclosure in terms of receiving one or more pieces of data as described herein, and then initiating its programming to manage the transaction, and make the payment at the appropriate time when the conditions of the smart contract are met. An application such as a social media application can perform the steps of the site for accessing and using smart contracts.

Similarly, the concepts disclosed herein can also be claimed from the standpoint of the browser 2304 or device 2307 that communicates data to the site 2302 and the smart contract 2308. Processing could also be claimed from the standpoint of a web-based payment service 2306 which may provide a tokenized one-time use payment packet which could be provided to the smart contract 2308 in accordance with the principles disclosed herein. Such a web payment service 2306 could receive its initiation into the transaction, via communication from a payment handler API or a platform specific API or from an application. Those APIs could be updated in their protocols to provide the necessary information, such as that the transaction is going to occur via an identified smart contract, and that the web payment service, rather than providing a token or other data through the payment handler API to the browser 2304, which will communicate that token or data through the payment request API to the site 2302 for processing (such as delivery to a payment processor 2316, or processing on its own). Software modules communicating with applications can perform the operations of the browser and have the APIs described herein configured within the software module.

In another aspect, the data received by the payment service 2306 could indicate such information as the merchant, the amount, and any other data necessary, and instruct the payment service 2306 to deliver the payment data to the smart contract 2308. As can be appreciated, the modification of this approach involves utilizing the already developed protocols for payments using these APIs, and simply redirects them temporarily to the smart contract for managing the transaction. The same process can occur for any chargebacks or any refunds as noted above. If the user contacts the merchant and requests a chargeback or a refund, the same smart contract can be programmed to handle such refunds and confirm information in order to reduce or limit fraud. The smart contract could also communicate with a chargeback smart contract to provide all the underlying data about the transaction. Thus, the merchant could provide a data packet generated in a similar way in which the payment is to be delivered back to the recipient upon confirmation that the recipient did not receive the package, or that the package was damaged, or the product was defective, and so forth. Every hurdle that is placed to prevent fraud can reduce the number fraud experiences. Thus, by requiring the user to take the product to a local store which can confirm the status of the product, and receive a small payment for their service, information from the local store can be provided to the smart contract to confirm that the product appear to be damaged as was asserted. Any other confirmations could be built into the smart contract such as requiring the user to provide pictures of the item, video testimony, or any other evidence that the chargeback or the return is justified. Any electronic tracking devices on the product could also be scanned or communicated via Wi-Fi or any other wireless protocol a status, which can also be connected to the smart contract.

Using these general principles as well as any other specific concepts that can easily be derived therefrom, the present concepts enable the implementation of a smart contract for regular purchasing transactions in a way that can eliminate or greatly reduce fraud across the Internet. As the payment request API gets rolled out, and as small individual website owners start selling more products and are exposed to the risk involved in not being an Amazon.com, the easy implementation of smart contracts for the purpose of individual transactions can greatly reduce the amount of fraud in the overall economy.

In another aspect, the smart contract 2308 can act as any smart contract can also receive data 2310 from public sources such as public APIs which might be necessary for carrying out the particular transaction.

Another potential avenue for balancing out the needs of inventors to receive compensation and the industry being able to be free to innovate would be the use of the initial coin offering or ICO. Initial coin offering is an offering where an entity offers investors units of a new crypto currency or crypto token in exchange against cryptocurrencies like bitcoin or Ethereum. An application of the Ethereum's smart contract system could be to create a simple token which can be transacted on the blockchain if they are in bitcoin instead of ether. This can be used as a distributed platform for crowdfunding and fundraising. ICO's have been used for providing a decentralized platform for Cloud computing (Dfinity), streaming video (Singular DTV) in many other uses.

A patent transaction was discussed above. Establishing an ICO in which individuals could purchase tokens from an entity and the entity could run a smart contract which would bring stakeholders together to manage the sale of patents. For example, if an inventor conceives of an essential blockchain concept and obtains a patent that everybody would need to use for efficient or effective blockchain technologies, a "PatCoin" token be could be created and sold, which would fund the operation of a smart contract to manage the process. A mining operation for PatCoins could be processed by the smart contract such that once the inventor submits their patents to the smart contract, qualified evaluators could mine coins by providing their objective evaluation of the patent and whether it is essential to blockchain technology. A consensus could be obtained from the various participants who could each receive certain mined coins for their efforts. Other experts in patent valuation could also review the patent in the marketplace and provide their input on its value. With this information, potential buyers that are affected by the patent could pledge a certain amount of money in order to compensate the inventor.

For example, if, based on the evaluations and an amount indicated by the inventor, evaluation of $5M is arrived at, the smart contract could enable an estimated cost for each potential infringer. The smart contract could be set up where once five million dollars of value is received within the smart contract, certain functions are performed. The function may be to render the patent unenforceable, such as by affirmatively abandoning the application, or through some other legal process in which the patent would become open source and available to the community. In another aspect, the smart contract could provide licenses of the patent to those that paid into the system. The smart contract could be set up to where these operations automatically occur once the threshold amount is met to purchase the patent or to license the patent.

Imagine another scenario where a patent holder places a patent or portfolio into the smart contract with certain parameters for its sale. The patent holder may include data outlining the case for infringement or for the essential patent to the blockchain or to any other technology. A patent owner could mine PatCoins merely by submitting a patent into the system. Evaluators could review the material and provide their input on the strength of the case. Once the original evaluation is complete and a cost established in the smart contract, participants in the industry can be notified of the case and have opportunities to help fund the purchase of the patent. If the patent owner in this example is asking for $10M, various potential infringers could each evaluate the patent and contribute some money by way of crowd funding the sale. As money is provided to the smart contract, it can be held in escrow or in the manner in which it is not available for the patent owner to retrieve. If the threshold of $10M is met, then the smart contract releases the money to the patent owner and performs the necessary functionality associated with the patent to make it either open source, license to those that contributed, abandoned, and so forth. Further PatCoins could be mined for those participants who completed a successful transaction. Part of the proceeds could be used as distributions for the PatCoin holders. Thus, all the participants who submitted money into the smart contract to purchase a particular patent, could receive PatCoins if the threshold is met in the transaction occurs. The patent owner could also be given the option of accepting a lesser amount. For example, if, after six months, only $8M was provided into the fund, the patent owner may accept that amount and enter that data into the smart contract and receive that money while having the processing occur for the patent.

The above approach can bring together the various parties in patent disputes and enable a process by which they can work together to provide a fair compensation for inventors while at the same time preventing excessive patents awards. Having stakeholders including experts on valuation can aid in targeting appropriate settlement ranges. Evaluators can be ranked and receive a status that enables them to mine a higher amount of PatCoin for their efforts, the more they are trusted. A certain amount of the sale could be kept by the entity for its investors.

In some cases, like the blockchain, patents could be granted on essentially open source technology. There may be a number of participants in the standards body who would not want patents to affect the expansion of an adoption of the standard. In one scenario, an inventor of an essential patent or one related to a standards body could submit that patent to the smart contract referenced above with the dollar amount with a commitment that if the dollar amount is reached, then the patent automatically is made open source, abandoned or made unenforceable. Participants in standards bodies, usually larger companies, could each pitch in a portion of the requested amount in order to strive to make a deal.

One potential mechanism for accomplishing the affirmative abandonment of the patent, thus making it essentially "open-source" would be the following. The patent owner could submit into the smart contract signed documents such as a power of attorney and signed forms which indicates an affirmative abandonment of the patent. Subject matter experts such as reputable attorneys at patent law firms could provide a confirming consensus that the documents would properly provide a power of attorney and an abandonment of the patent if they were filed with the patent office. With these documents stored within the smart contract, the smart contract can then receive payment from those who desire that patent to be made open source. Envision Amazon's one-click purchasing patent and the interest in society for that patent to be made open source. That patent has been valued at $2.4 B and many companies would likely desire to pay a fair, small price in order for that patent to be made available to the public seventeen years ago, rather than only Sep. 12, 2017.

The smart contract would be programmed, once the desired amount is received, to release the documents to an authorized law firm. The documents could be simply transmitted via email to the listed party. The PTO website could also be reprogrammed to receive filing documents directly from a smart contract. The necessary digital signatures, login data, powers of attorney and so forth could be provided such that the functionality was automated.

The law firm could then file a power of attorney with the patent office and file, the express abandonment document. In a short period of time, the patent office would confirm abandonment of the application with a notice of abandonment. This document could be submitted to the smart contract with a confirmation from the law firm that the patent is indeed abandoned. Other reputable attorneys could also be engaged such that a consensus is input to the contract that the patent is in fact abandoned. Any one or more of these steps could be automated between the smart contract and the patent office.

With all these confirmations in place, the money would be released to the inventor. Again, the money could be provided in the form of any one or more cryptocurrencies, held as a one-time use payment token, in an escrow account, or in any other fashion. The above approach could provide a more communal way of resolving high-value patent disputes without expensive litigation. This approach requires both parties to participate, however. A patent owner that requests $2 B in value is not likely to receive such a large sum. However, it would be relatively easy to consider, particularly given the hindsight view, that if Jeff Bezos had requested $200M to make Amazon's one-click purchasing patent open source in 2000 using the smart contract approach described herein, many large companies such as Apple (The only licensee of Amazon's one-click patent), as well as many smaller companies would happily contribute enough money to arrive at $200M and thus benefit from increased conversions and sales on their respective websites.

Cryptocurrency Payments Integrated into Applications or Browsers

Another aspect of this disclosure relates to method of integrating cryptocurrency payments into applications, browsers or software modules that interact with applications to enable simplified payment processes. An example method related to website usage includes receiving, from a site, at a browser and via a payment request application programming interface that defines a protocol for communicating data between the site and the browser, a request associated with a potential purchase, wherein the request includes an identification of a cryptocurrency payment method accepted by the site and transmitting, to the site, from the browser and via the payment request application programming interface, data indicating that a user of the browser can pay for the potential purchase via the cryptocurrency payment method accepted by the site. This is a "canmakepayment" exchange in which the site and the browser determine the overlap between payment methods. In this example, a cryptocurrency is common to both the site and the browser/user. The method includes receiving, via a user interface associated with the payment request application programming interface, a confirmation from the user to process the potential purchase using the cryptocurrency payment method and retrieving, based on the confirmation from the user and via the payment request application programming interface, cryptocurrency payment information for the potential purchase. The retrieving can involve gathering the input to the transaction which can include the buyer's private key, data about the address of the person who transferred the cryptocurrency to the buyer, the seller's public key, a password and/or any other data for processing the cryptocurrency transaction. The cryptocurrency wallet can be local to the device or web-based. Such wallets in one aspect are registered with the browser, like any other payment method, such that they are usable and the necessary data for the transaction can be provided to the browser as the agent managing the transaction. The method includes, in one aspect, transmitting from the browser and via the payment request application programming interface, the cryptocurrency payment information.

The request can further be associated with a user-initiated action indicating an intent by a user to make a purchase. Transmitting the cryptocurrency payment information to the site can enable the site to process a purchase or confirms to the site that a payment service processed the purchase. In this scenario, a web-based cryptocurrency wallet for the user may have provided the input data for the transaction on the blockchain outside of the payment request API.

The request can identify a supported payment method used by the site, such as Visa and Apple Pay, for example, in addition to the cryptocurrency payment method. The cryptocurrency payment information can include a private key that identifies a user cryptocurrency wallet. The wallet can be of any type and be local or web-based. The user cryptocurrency wallet in other words can be stored on one of the device or a web-based device separate from the device.

Transmitting the cryptocurrency payment information further can include transmitting a message signed with a private key to a cryptocurrency network for verification. The message further can include an amount of cryptocurrency and a site address for receiving the amount of cryptocurrency. The amount can be obtained through data transmitted through the payment request API. A conversion might need to take place by the site or a third-party service to convert from dollars to bitcoin, or other cryptocurrency.

The message further can include a record of a cryptocurrency address used to send cryptocurrency to the user cryptocurrency wallet. The cryptocurrency payment information can be stored at the browser, accessed by the browser from a separate entity, or delivered to the site from a third party as instructed by the browser.

In another aspect, the method can include the processing from the site standpoint and include transmitting, from a site, to a browser and via a payment request application programming interface that defines a protocol for communicating data between the site and the browser, a request associated with a potential purchase, wherein the request includes an identification of a cryptocurrency payment method accepted by the site and receiving, at the site, from the browser and via the payment request application programming interface, data indicating that a user of the browser can pay for the potential purchase via the cryptocurrency payment method accepted by the site. The method can further include receiving, based on a confirmation from the user to process the potential purchase using the cryptocurrency payment method and via the payment request application programming interface, cryptocurrency payment information for the potential purchase. Receiving the cryptocurrency payment information further can include receiving a cryptocurrency payment at a site cryptocurrency wallet from a user cryptocurrency wallet. The cryptocurrency payment information can include a private key that identifies a user cryptocurrency wallet. The user cryptocurrency wallet can also be stored on one of the device, integrated into an application or can be a web-based device separate from the device. The processes described above can also apply to a software module configured to conform to a protocol for an API between the software module and an application on a device. The API processes can be similar. Further, a cryptocurrency wallet could be integrated into an application such as social media application and the processing can all occur within a social media entity environment.

Figure 24:
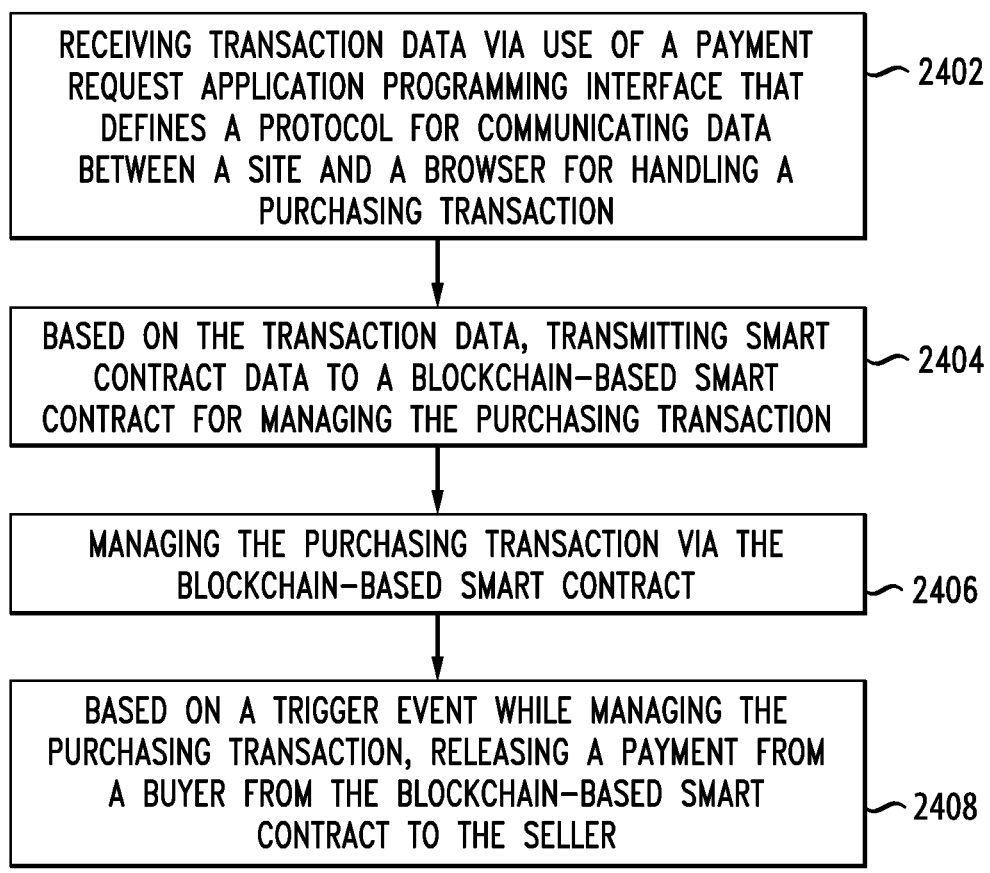
FIG. 24 illustrates a method example.

FIG. 24 illustrates a method example related to use of a smart contract. The method includes receiving transaction data via use of a payment request application programming interface that defines a protocol for communicating data between a site and a browser for handling a purchasing transaction (2402), based on the transaction data, transmitting smart contract data to a blockchain-based smart contract for managing the purchasing transaction (2404), managing the purchasing transaction via the blockchain-based smart contract (2406), based on a trigger event while managing the purchasing transaction, releasing a payment from a buyer from the blockchain-based smart contract to the seller (2408).

Built into the smart contract can be any kind of functionality necessary for a particular transaction. Titles to objects, delivery tracking, further user input, third-party input to verify an event, publicly available data via an Oracle, documents, crypto currency data, data packets that embody payment information for a one time transaction, and so forth, can be stored and managed by the smart contract 2308. For example, the smart contract could store a tokenized packet of data as part of an Apple Pay, cryptocurrency, PayPal or a Google Pay process. It could be the same type of data which would be simply delivered to a site for submission to their payment processor 2316 as part of a normal payment request API transaction. However, as part of the smart contract concept, the process can include routing that tokenized packet for storage in the smart contract until confirmation of the deposit of the product with the delivery services received.

Figure 25:
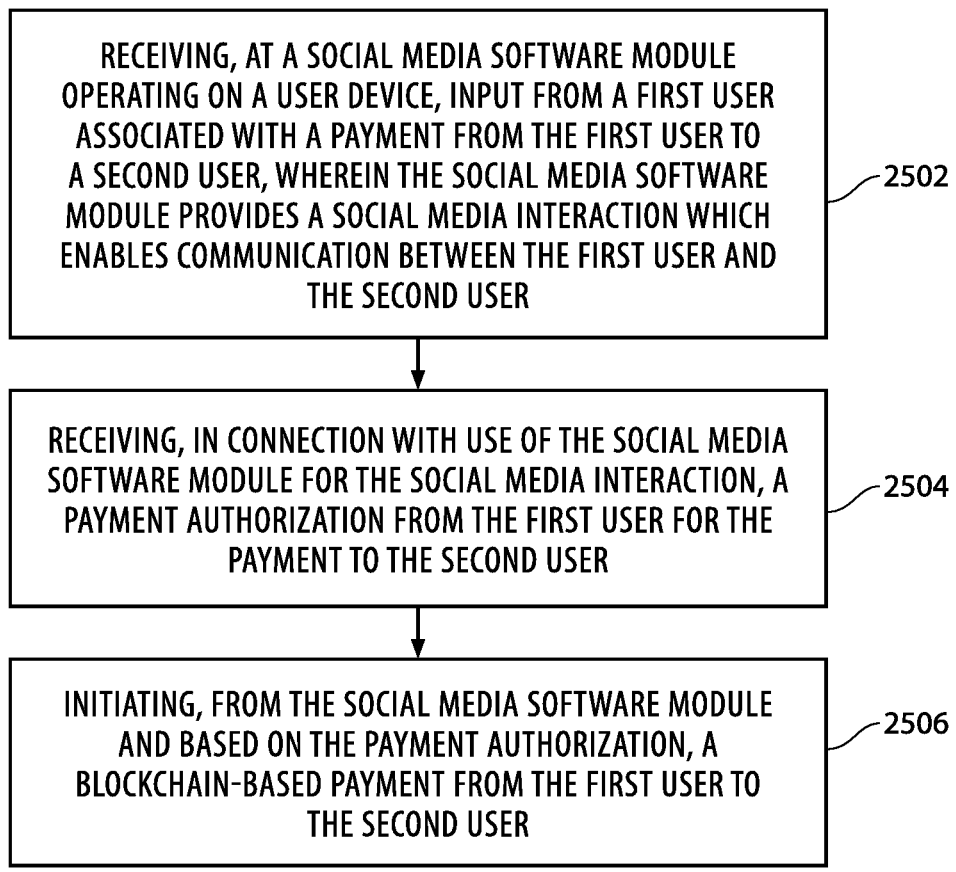
FIG. 25 illustrates an application-based method for handling cryptocurrency payments.

FIG. 25 illustrates another approach described above in which an application is integrated with a cryptocurrency wallet to reduce friction in the process of making a payment of value from one person to another person for example in a social media or messaging application. In one aspect, the application is downloaded on the user devices and the users are registered with the social media entity.

By integrating a cryptocurrency wallet into a social media application, this disclosure introduces new functionality which can greatly reduce friction in the cost of transferring value from one individual to another. In one aspect, the cryptocurrency wallet is built directly into the application or site and all the functionality needed to access the cryptocurrency wallet for purchasing currency or paying others can be accessed from within the social media application. One advantage of this approach is that it can unify the interactions such that the user does not have to go to a separate cryptocurrency wallet in order to make payments, identify recipients and so forth. In another aspect, the user may download a cryptocurrency wallet or obtain an account for a crypto occurrence wallet online and the social media application can integrate with those cryptocurrency wallets to make the transactions simple.

Methods can be performed from the standpoint of the social media entity operating a social media application or site or they can be performed from the standpoint of payor or a recipient of a payment. The payment can purely be in fiat currency from one person to another, can exclusively be in a cryptocurrency, or can be a combination of both. For example, a first user may choose to pay $10 to a second user who lives in a different country. The social media entity could manage a process of converting from a first fiat currency to a cryptocurrency for transferring the value from a first cryptocurrency wallet to a second cryptocurrency wallet after which a second exchange transaction can occur to convert from the cryptocurrency to a second fiat currency. Thus, the recipient can be paid in Yen or Pounds.

One example method from the standpoint of the social media entity includes receiving, at a social media software module operating on a user device, input from a first user associated with a payment from the first user to a second user, wherein the social media software module provides a social media interaction which enables communication between the first user and the second user (2502), receiving, in connection with use of the social media software module for the social media interaction, a payment authorization from the first user for the payment to the second user (2504) and initiating, from the social media software module and based on the payment authorization, a blockchain-based payment from the first user to the second user (2506). The users or persons described herein can be humans or one or both could be bots or computer systems.

The social media software module can be associated with one of a messaging application or an on-line social media site. The software module could also relate to other transactions such as opening garage doors, unlocking a door, turning a light on, starting a car, and so forth. Multiple task processes can also be initiated and carried out such as opening a door and making payment. The application described herein can also be one accessed via a browser in which an interface as provided and data identifying the user can be provided such that a user interface in functionality can be presented without the need of a user downloading a separate application. The transactions described herein can be payment transactions or any kind of operation in which the transaction or operation could be recorded on the blockchain-based network as described herein.

When the application is a messaging application, the messaging application can provide a message with which the first user can interact to provide the payment authorization. The payment authorization can be provided via a biometric reading associated with the first user. In one aspect, the social media software module can transmit a payment request to a second software module operating on the user device, the second software module having an application programming interface that defines a protocol for communicating data between the social media software module and the second software module for managing the payment from the first user to the second user. The social media software module can be, for example, a messenger application or a social media application downloaded on a user device. The first user can provide the payment authorization via a text in the social media software module. For example, users might be connected in communicating via a text dialogue in the messaging application. Options can be presented to users to request or make payments to the other entity within the dialogue. Because the users are already in the context of an interaction between identified individuals or entities, the ability to choose to make a payment order request a payment and then the carry out that payment transaction as described herein can reduce friction. In another aspect, the cryptocurrency wallet is built into the social media application such that the social media application is used to identify the parties to a transaction, present object for users to interact with to request or confirm a transaction or an amount of money, for example, to transfer to another user, and to carry out the transaction and record the transaction on a blockchain network or to cause the transaction to be recorded on a blockchain network.

The text can identify both the second user and an amount associated with the blockchain-based payment. The blockchain-based payment from the first user to the second user can include initiating a payment from a first user wallet associated with the first user to a second user wallet associated with the second user. The application such as a social media application can manage the wallets as they are integrated into the application.

Other aspects of this disclosure include other types of interactions or social media contexts. For example, options can be built into the graphical social media or communication applications such as Facetime or Skype. Users can be presented with options for making payments amongst each other easily. For example, the user might be engaged with the merchant via a dialogue that is textual or visual in which the user is presented with a product that they might desire to purchase. An agent for the merchant may then simply request an amount of money which the buyer can confirm and within the context of the dialogue, a payment can be made. Other features can be built-in such as the opportunity to negotiate over a price in which the buyer could offer a reduced price within the dialogue which the merchant could then have the opportunity to counter offer or except. Upon the confirmation of the final price, value can be transferred.

In another aspect, users often engage in multiuser interactions. A group chat or a group texting session could include more than just two individuals. The payment capabilities built-in to the applications can include the option of making a payment amount to each individual in the dialogue. For example, the system may present an interface that easily enables the user to see everyone participating in the dialogue and select individual amounts to be paid to each individual. Users could be texting about how much they are each individually owed and in one single interface, a payor to pay a first user $10, a second user $20 and so forth. Reduction in friction in this approach is that the group of individuals is already identified by virtue of the social media application. In one aspect, a cryptocurrency wallet is established for at least one of the users and the payment is made using at least in part a cryptocurrency.

In another aspect, refunds or other things of value can be returned within the same dialogue. For example, the user might make a payment in the context of a social media application but then receive as a reward points towards a future purchase or a refund or some other value. Thus, the payment interaction or the transaction might involve value flowing in one direction of one type (a cryptocurrency or fiat payment) with value flowing in the other direction of a second type (airline miles, points for a gas purchase, or credit card refund). Blockchain-based recordation of transactions could also flow in both directions. For example, one blockchain system might record a cryptocurrency payment transaction while a second blockchain might record the return of value or points in the return transaction. The social media application can coordinate the various transactions and ensure that the proper recordation procedure would be performed according to the transaction type.

Figure 26:
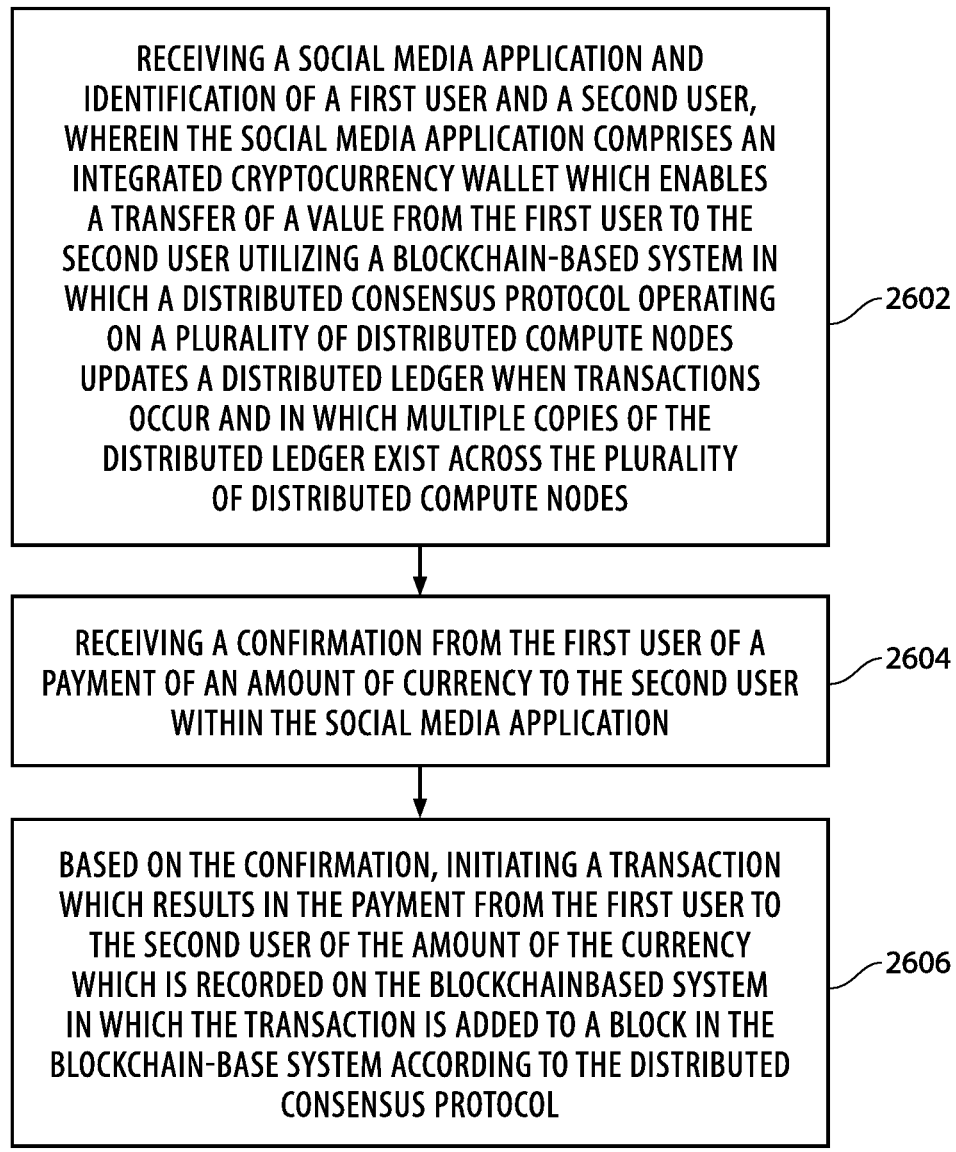
FIG. 26 illustrates another method example.

FIG. 26 illustrates another example method. A method includes receiving at a social media application and identification of a first user and a second user, wherein the social media application includes an integrated cryptocurrency wallet which enables a transfer of a value from the first user to the second user utilizing a blockchain-based system in which a distributed consensus protocol operating on a plurality of distributed compute nodes updates a distributed ledger when transactions occur and in which multiple copies of the distributed ledger exist across the plurality of distributed compute nodes (2602), receiving a confirmation from the first user of a payment of an amount of currency or of some value to the second user within the social media application (2604) and, based on the confirmation, initiating a transaction which results in the payment from the first user to the second user of the amount of the currency or value which is recorded on the blockchain-based system in which the transaction is added to a block in the blockchain-base system according to the distributed consensus protocol (2606).

Upon the confirmation, the social media application can manage signing the transaction using a private key of the first user. In this manner, the user of the social media application only needs to confirm that they desire to make the purchase or transfer and the social media application manages the technical process of signing the transaction using a private key associated with the first user. The private key is stored with the social media application in a wallet integrated into the social media application or the social media application can communicate via an API or other protocol with the cryptocurrency wallet.

Figure 27:
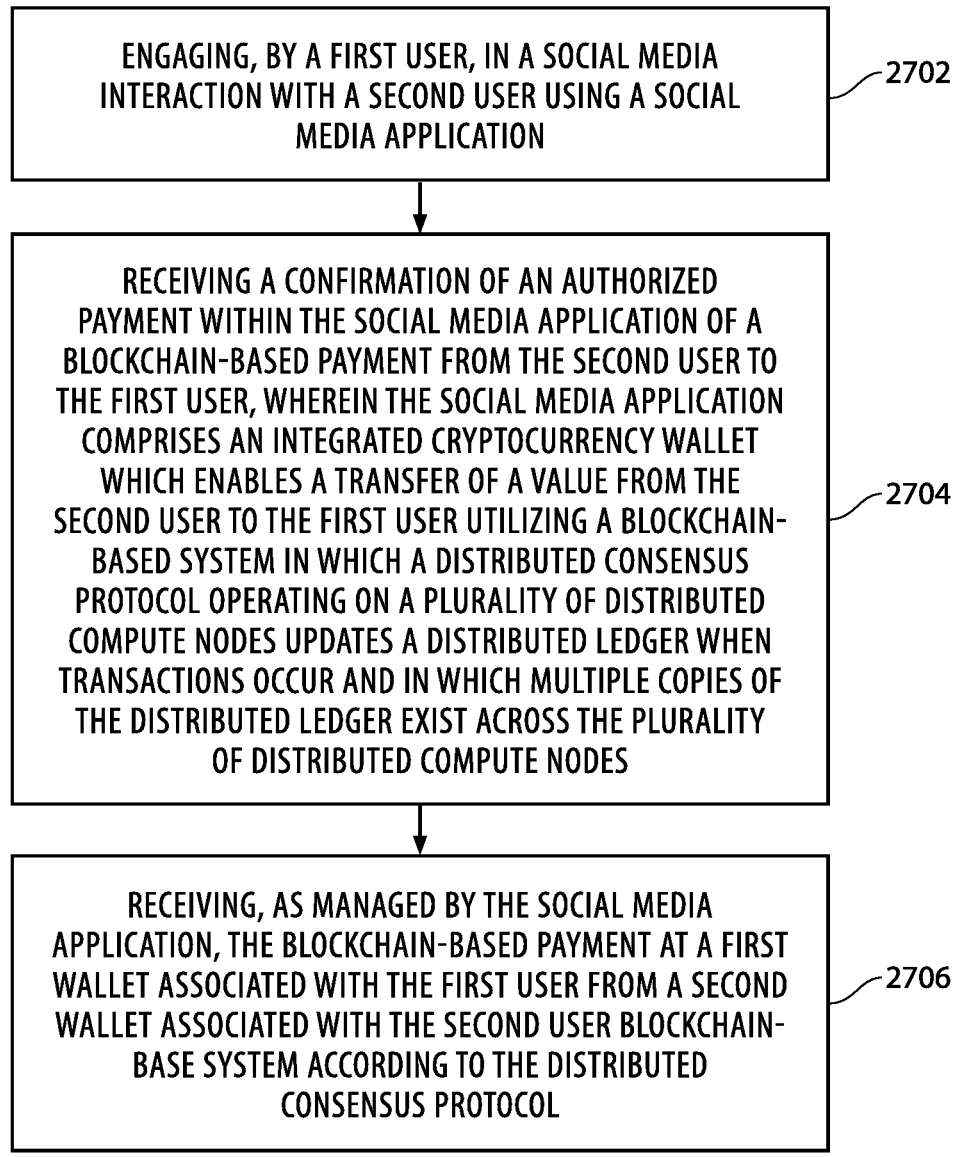
FIG. 27 illustrates yet another method example.

FIG. 27 illustrates another method which includes engaging, by a first user, in a social media interaction with a second user using a social media application (2702), receiving a confirmation of an authorized payment within the social media application of a blockchain-based payment from the second user to the first user, wherein the social media application includes an integrated cryptocurrency wallet which enables a transfer of a value from the second user to the first user utilizing a blockchain-based system in which a distributed consensus protocol operating on a plurality of distributed compute nodes updates a distributed ledger when transactions occur and in which multiple copies of the distributed ledger exist across the plurality of distributed compute nodes (2704) and receiving, as managed by the social media application, the blockchain-based payment at a first wallet associated with the first user from a second wallet associated with the second user (2706). The currency can include one of a cryptocurrency or a fiat currency and when the currency includes a fiat currency, the social media application can utilize an exchange to convert the currency from the fiat currency to the cryptocurrency. The cryptocurrency can operate as a bridge currency between different currencies of different countries respectively associated with the different users.

The method can also include transmitting, from a social media application, to a software module, a request associated with a blockchain-based payment from a first user of the social media application to a second user of the social media application, wherein the request includes information about the blockchain-based payment. The software module can be operational on a device and is configured with a software module application programming interface that defines a protocol for communicating data between the social media application and the software module. The method can include receiving, at the social media application, from the software module and via the software module application programming interface, authorized payment data for making the blockchain-based payment to the second user, wherein the software module accesses or receives, based on the request, the authorized payment data from the device or a network-based entity. The social media application in this case could also be any application and not just social media applications.

In another aspect, a method can include storing data associated with payments for a user to yield user payment data, receiving, at a software module and based on user input via a graphical user interface of an application on the device, a payment request associated with a potential payment from the application, wherein the payment request comprises information about the potential payment and wherein the software module is on the device and comprises a software module application programming interface that defines a protocol for communicating data between the application and the software module, receiving, from the user, an authorization confirmation for a payment, receiving, based on the authorization confirmation, authorized payment data for the payment from one of the device or a network-based entity, wherein at least a portion of the authorized payment data comprises the user payment data and transmitting, according to the software module application programming interface and to the application, the authorized payment data, wherein the application can use the authorized payment data in at least part of a payment process and wherein the payment process uses at least in part a cryptocurrency.

A device version of the above concept can include a device having a processor, a software module including a software module application programming interface that defines a protocol for communicating data between an application on the device and the software module and a computer readable storage medium storing instructions which, when executed by the processor, cause the processor to perform operations. The operations can include receiving, from the application, at the software module and based on user input via a graphical user interface of the application, a payment request associated with a potential payment, wherein the payment request comprises information about the potential payment, receiving, from the user, an authorization confirmation for a payment, receiving, based on the authorization confirmation, authorized payment data for the payment from one of the device or a network-based entity, wherein at least a portion of the authorized payment data comprises the user payment data; and transmitting, according to the software module application programming interface and to the application, the authorized payment data, wherein the application can use the authorized payment data in at least part of a payment process and wherein the payment process uses at least in part a cryptocurrency.

Figure 28A:
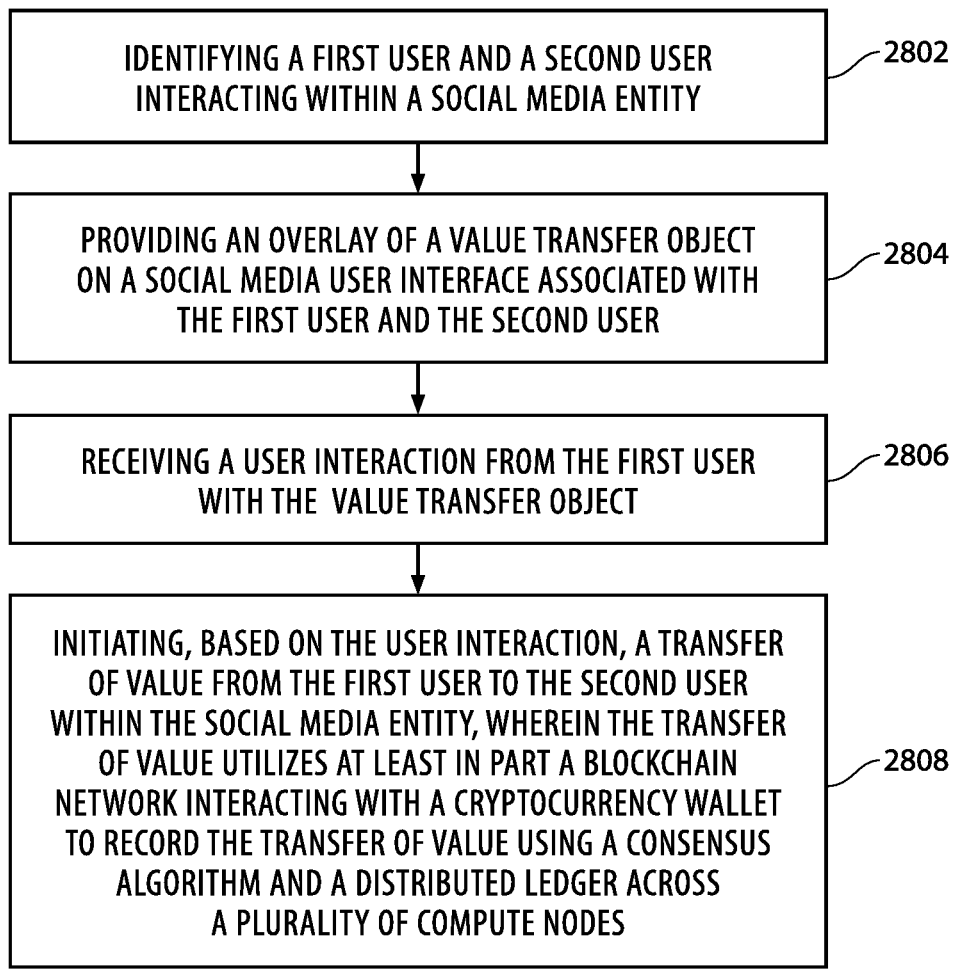
FIG. 28A illustrates anther method example.

FIG. 28A illustrates another example blockchain-based social media method. The method includes identifying a first user and a second user interacting within a social media entity (2802), providing an overlay of a value transfer object on a social media user interface associated with the first user and the second user (2804), receiving a user interaction from the first user with the value transfer object (2806), and initiating, based on the user interaction, a transfer of value from the first user to the second user within the social media entity, wherein the transfer of value utilizes at least in part a blockchain network interacting with a cryptocurrency wallet to record the transfer of value using a consensus algorithm and a distributed ledger across a plurality of compute nodes (2808). The value transfer object can be a request button to request value from another user or a transfer button to initiate a transfer of value to another person. Of course, "person" in this case can include people or an entity such as a merchant or other business.

Figure 28B:
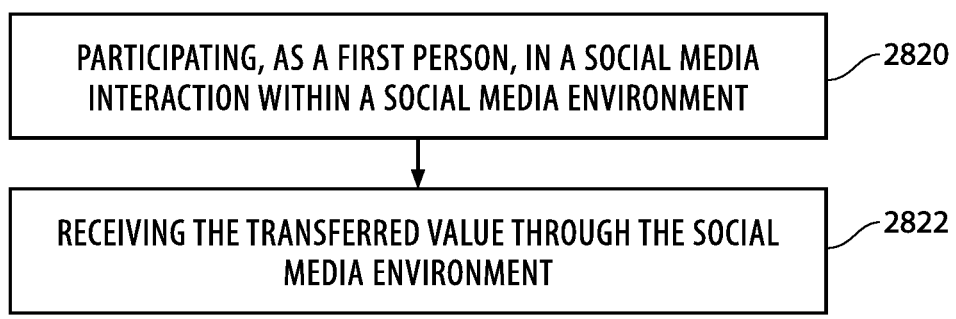
FIG. 28B illustrates another method example.

The method of FIG. 28A is from the standpoint of the social media entity. The transferring or receiving party could also perform certain steps in the process. For example, a method shown in FIG. 28B can include participating, as a first person, in a social media interaction within a social media environment (2820). The social media interaction can be with a second person. Within the context of the social media interaction, the second user can confirm, via interaction with an overlay of a value transfer object on a social media user interface associated with the first user and the second user, a transfer of value from the second person to the first person. The first user can receive the transferred value through the social media environment (2822). The transfer of value can utilize at least in part a blockchain network interacting with a cryptocurrency wallet to record the transfer of value using a consensus algorithm and a distributed ledger across a plurality of compute nodes. A separate copy of the ledger is stored on different nodes. The value transfer object can be a request button to request value from another user or a transfer button to initiate a transfer of value to another person.

The value transfer object can be directly or indirectly associated with a cryptocurrency payment. For example, users can pay in a cryptocurrency directly from one user wallet to another. Or, one user might pay in one currency type and a cryptocurrency is used as a bridge currency to convert to another currency type or to make the payment in cryptocurrency where the original payor paid in fiat currency. The social media entity handles the transactions such that the users only experience the higher level payment and receipt of value all within the context of the social media environment and without leaving the social media environment.

Near-Field Communication Tags

In yet another aspect, the initiation of the social media interactions can be triggered through the use of a QR codes or near field communication (NFC) tags. NFC tags have been developed which enable an item such as a scooter for rent or a parking place or any product to include thereon a near field communication tag that a user of a mobile device can simply tap with the mobile device. The NFC tag utilizes or transfers data to the mobile device which launches a browser which accesses the URL associated with the item. In this scenario, no application needs to be downloaded because a browser is launched to a website which returns the appropriate user interface to perform certain tasks. The question then arises how would one reduce friction in terms of using a cryptocurrency in this scenario. The answer lies in the combination of data that is coordinated in order to enable a cryptocurrency payment for a product or a rental or to perform some kind of function. The NFC tag could be used to launch the initiation of a browser, identify the user, and return a social media interface in which the user is essentially immediately engaged in a dialog with another entity.

Figure 29:
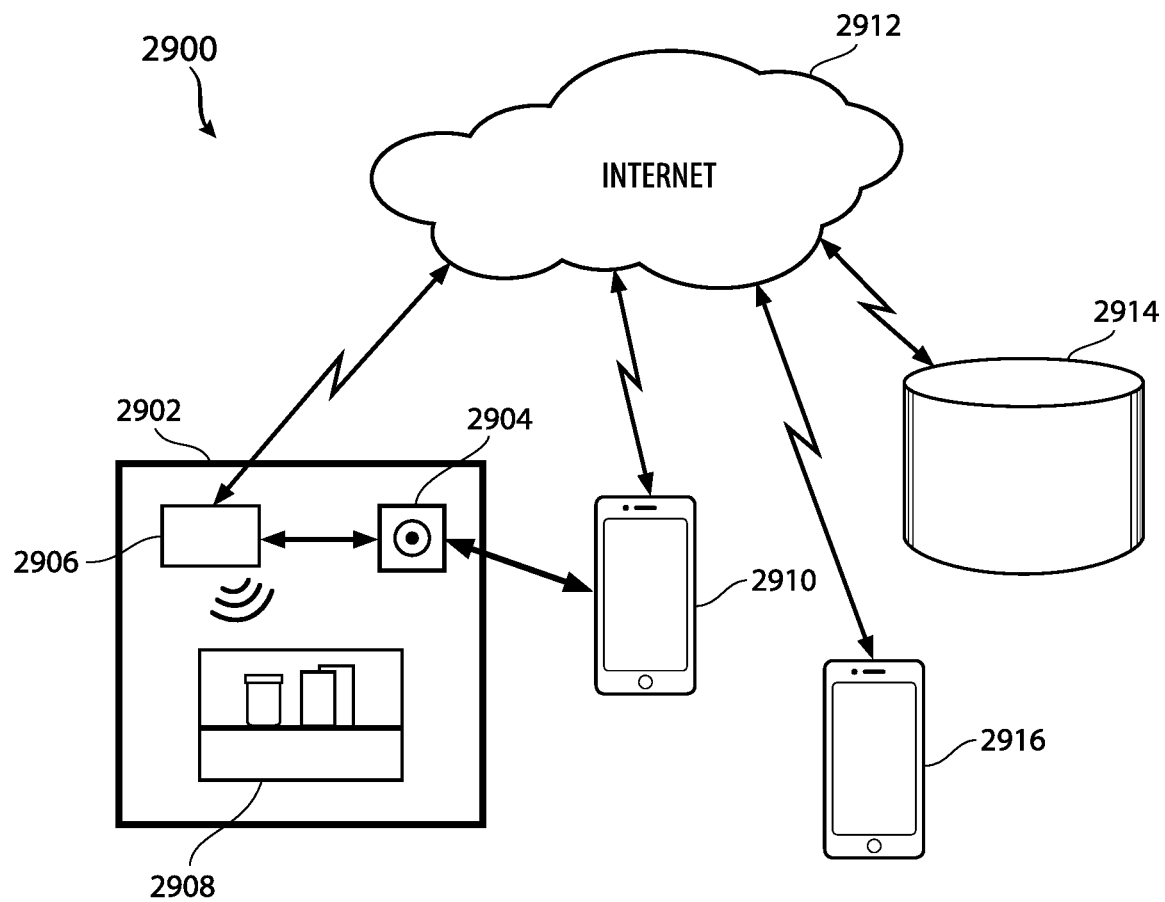
FIG. 29 illustrates a near field communication tag example.

FIG. 29 illustrates components in a network 2900 that utilize NFC tags. The tapping of an NFC tag 2904 on a device 2902 could launch a social media application on the user device 2910, such as a messaging application, and identify a second user and configured the application with an initial message to the second user. For example, the user could tap on a NFC tag on a scooter which could cause the launch of the social media application in an initial message "Hi this is Mary, can I rent your scooter?" which is configured to the owner of the scooter or the proper individual. Either through a manual process or through a bot, a response can be provided that says "Sure, do you want it for an hour? It is $5". In this manner, a social media interaction can automatically be initiated and can make the transaction more enjoyable for the user. Rather than simply engaging in a website, the user can feel like they have a more personal relationship with the other entity. A payment and can be made using any kind of value including the cryptocurrency approaches described herein. The browser in this case can coordinate through the use of the API(s) an access to cryptocurrency wallets or payment systems to coordinate a cryptocurrency payment for these services or products. Tapping on an NFC tag could also initiate an application to perform functions as well.

NFC tag-initiated functionality could include referenced to a blockchain network and could be used to identify parties to a transaction or confirm or participate in a blockchain-based transaction.

Many users are comfortable with texting friends and utilizing social media messaging application throughout the world. This approach improves the initiation of such social media applications for regular purchasing processes, payments or other transactions. The user may need to open a garage door, get into a hotel room, pay a friend some money, or rent an air BNB house, purchase a product in-store or perform some of the transaction. Each of the various kinds of transactions can be enhanced through this process of initiating easily a social media interaction with the built-in capability of performing a payment or for performing the transaction. As noted above, any transaction can be a blockchain-based transaction beyond just a cryptocurrency payment. For example, if a user's location needs to be confirmed, the fact that they closed a door or when an individual left a building can all be recorded as transactions on the blockchain-based network. Any of these transactions can be coordinated through a social media application which coordinates with a blockchain-based system. Thus, the social media application, or any application, can be the avenue through which transactions can be recorded on the blockchain even if those transactions are of different types.

Notably, the user interface for initiating social media type interactions can be app-based or can be browser-based. Any necessary protocol can be included which can have parameters for sending data to either an app or to a site. For example, as the user taps on a near field communication tag, the URL can be identified and instructions can be provided in which the user name, user address, a personal profile data, and so forth might need to be transferred to the site or to the app in order to prepare or configure the forthcoming social media interactions. Initial texts or communications can be constructed which appear to be personal and which can cause the user to immediately feel like they have just sent to an introductory text to the recipient to engage in a dialog. The system can automatically construct that initial turn in a social media dialog such that the user can be presented with the user interface that is essentially part way through a social media dialog. In this regard, the system might construct the first turn and the recipient then responds with data as described herein at which point the user can continue with a dialog, make a payment, ask questions, receive information, further data such as photos or video, and so forth. One benefit of this approach again is that it is a simplified mechanism of placing the user within a social media dialog and part way through the process of completing some kind of transaction and in which the user will be within a familiar environment. The user interface could also be modified for branding purposes such that the recipient or merchant on the other end of the dialog can be recognized in the user can learn or experience their brand while still in the context of a familiar social media dialog scenario.

The user interface or dialog functionality can also be configured for the particular task. Where payment needs to be made, buttons or links can be provided as well as drop down menus to present options to request a payment or make a payment or to perform some physical task such as opening a door.

In some scenarios, an NFC tag is programmable and can be modified such that the information that is transmitted to a mobile device upon tapping is current. For example, a refrigerator 2902 might have a near field communication tag 2904 configured thereon which can be tapped by a user for purchasing food for delivery to their home. The refrigerator can monitor what food 2908 is contained therein through a sensor 2906 and can reprogram or update its NFC tag 2904. Thus, any time the user taps on the tag 2904 with their mobile device 2910 to initiate an interface through the Internet 2912 or from an app to perform a task associated with the refrigerator 2902, the current status of the amount of food and the types of food within the refrigerator can be programmed into the NFC tag 2904. That data can then be used to initiate an efficient purchasing process for the user. The user may tap on the tag and the user interface might be presented that says "Right now you need one gallon of milk and a dozen eggs, please confirm this order." The user can then simply confirm the purchase for delivery or for pickup or in any other manner and the transaction is complete.

Thus, generally speaking, this disclosure includes the concept of configuring a device 2902 with a sensor or sensors 2906 that enable a parameter or a status associated with the device 2902 to be updated. Based on that status, the device 2902 can update an NFC tag 2904 configured thereon or somehow associated with the device. In one scenario, a home might be configured in a common area such as a kitchen with a network NFC tag which receives various updates of appliances, individuals or devices 2916, and so forth. The NFC tag 2904 can maintain updated information about the status of the air conditioning, the temperature of the home, who is in the home, how much gas is in the car, and so forth. A person in a home can tap on the NFC tag 2904 and receive an update of one or more types of information that is configured within the tag. Various wireless networks 2912 or wired networks can be utilized to communicate data from various devices 2910, 2916 are from various people in order to update the near field communication tag 2904. Tapping on the tag with a device could therefore give a report, launch and application, launch a browser and provide a user interface, and so forth which can summarize the data and present opportunities for selections to be made, purchases to be made, a garage door to be close, lights to be turned off, and so forth any home-based or other functionality could be performed or confirmed through such an interface. The NFC tag can be used to initiate a more complicated process as well. For example, protocols can be used to access other sensors or capabilities of a mobile device, such as location data or other sensor data which can be included in a package of data sent to a website for configuring a user interface. The website also can access various capabilities of the device as well.

One benefit of this approach is that while such information could also be gathered and provided to an application on a user device, the number of clicks or interactions needed to get to such information would be higher when compared with merely tapping an NFC tag which would launch the interface and provide the necessary data or the necessary configured interface for performing a certain task. Therefore, this approach reduces the friction needed to initiate an interface which can be of value for performing one or more functions. Example in this scenario could capture processes from the standpoint of the NFC tag that is configured to receive update status data and to be reprogrammed and ready to communicate data or changed functionality to a mobile device that taps the tag. Examples can include the product or device upon which the near field communication tag is configured which can include sensors and control system in order to receive sensor data and provide instructions to an NFC tag to re-configure itself and accommodate the new data.

In another aspect, the NFC tag can be static and the device that it is configured on may not be configured to make changes to the tag. However, the device might be connected to the Internet 2912 and send data to a database 2914 on a network server. The data can be accessed then in the process of a user device 2910 tapping the tag 2904, which will initiate a browser and access a URL. The data built into the tag could identify the device 2902, 2910, 2916 and identify where on the network server 2914 is the updated information that should be integrated into the user interaction. A database 2914 might have a memory location for a particular Internet of Things device 2902 and the data received from the browser can identify or request the network server 2914 to access that data and present a user interface based on the data or perform other functions. Thus, a similar experience could occur where the user sees a user interface presented in the browser which can state that the user has a need for milk and eggs 2908, should the system order that for pickup at 3 PM. This approach can simplify the infrastructure on the device to only need to send data to the network server which can then be accessed and acted upon based on the NFC tag initiation information.

Examples can also include the process from the standpoint of a mobile device which the user uses to tap on the NFC tag and have processes initiated as instructed by the data contained in the NFC tag. The mobile device would then present user interfaces and may access other capabilities of a mobile device in order to carry out the desired functions. Speech processing gesture recognition, gyroscope data, GPS or location-based data, biometric data such as fingerprint or face print, can also be incorporated into the functionality that can be initiated from the NFC tag. In another example, network-based processes such as payments, initiation of tasks such as opening doors or changing settings on heating or air-conditioning systems, can also be captured as separate examples. For example, a system may receive a query or a communication from a mobile device that is initiated based on the NFC tag as disclosed herein. The system can respond with a user interface and receive a payment or receive a confirmation to perform a task or to coordinate with other servers or other entities to perform multiple tasks as well.

It is contemplated that a QR code or other mechanism could also be altered or updated in order to interact with a mobile device and initiate the processing described herein. For example, a refrigerator could have a display which presents a QR code which gets updated based on the contents of the refrigerator. Thus, as a user scans the QR code to initiate processing as instructed, the QR code doesn't have to be fixed but can be updated both just like the near field communication tag as described herein.

From the standpoint of a network server, the use of the NFC tags can operate as follows. A server can receive data associated with the NFC tag. It can be from any number of different devices. For example, a server can receive data from an appliance. The data can be sensor data such as a condition of the appliance, an amount of items or types of items in the appliance, such as a refrigerator, or any other type of data associated with an appliance or device. The data can be location data. The data could also be other data received from a mobile device or a group of mobile devices, such as location data for each device of family members or a work group. The data is stored in connection with the server. Tapping on the NFC tag by a mobile device causes a browser to launched and a URL to populate the browser field such that a website is accessed. The server receives the request to access the URL. An API or other communication protocol can be used to pass other data to the server. The communication to the webserver can include instructions to access the recorded data associated with the NFC tag. The user interface that is returned in response to accessing the server can take into account the stored data. For example, an NFC tag in a kitchen could be associate with each member of a family of 4 people, each with their own phone. The process of tapping the NFC tag could initiate a browser, cause the browser to access a server, which server retrieves location data for each family member. The server then returns a user interface which provides the data for the location of each member of the family with objects to enable the user to call, text, email or otherwise communication with one or more family members. This approach simplifies the steps necessary between a request for all that data and providing a user interface with all of that data. A home could have a number of different NFC tags for easily accessing such data or performing some function, like opening a garage door.

When an NFC tag is on a product, and a user taps the tag, data stored about that product can be provided, even updated data. For example, if the product is a board game and the NFC tag is on the box, when the user taps the NFC tag, the user interface can provide information like "10 of your neighbors bought this board game within the past month" or "this product was just recalled, should we send you one after the problem is fixed?". Thus, data about a product could be stored and updated over time and accessed when a user taps on an NFC tag on the product for the purpose of potentially purchasing one of the same or similar product for themselves. The use of NFC tags in this approach can enable with one tap the ability to immediately or in very few iterations arrive at a stage (like within a messaging dialog, ready to one-click purchase a product, complete a task, get data about a person or object, rent an object, etc.) or state which normally takes a number of clicks or the use and downloading of an application. An application can still be launched as well from the NFC tag tap.

The data stored in connection with an NFC tag could be a video, image, a database, file, or any other type of data. A user could tap on a tag and view a video—and this approach lets the video easily be updated or changed, with the next person who taps the tag seeing the new view. The tapping of the tag could also cause an upload. For example, a user could tap a tag after a conference and the interface could be presented and coordinated with their photo application to select photos to upload to a database of people participating in the activity. The tapping of the tag could trigger an interface to enable data (of any type) to be uploaded to a particular location. An interface could be presented in which the users is asked whether they want to upload data or download data or perform some other choice of actions. The tapping of the tag triggers a particular interface that can include a number of different tasks. The interface could be based on a coordination between items like an application associated with the conference, a user's camera feature, a browser to access a site, in order to pass data between any of these entities and coordinate a user interface to achieve a task or a series of tasks.

In another example, a user could tap on a tag associated with a product or any other item, and the interface that is initiated could be a survey, with an award of points or some value at the conclusion of the survey. One benefit of this approach is that it simplifies the process of initiating or completing a task.

In another aspect, an NFC tag could be connected in a wired fashion or wirelessly with another system such that the NFC tag can be adjustable. For example, a user could order a meal at a drive through, and the system in connection with the order could configure the NFC tag for that driver such that when they drive up to get their meal, the touch the NFC tag, which is configured with information about their personal purchase, and the NFC tag could cause the launching of a browser or an app which could return a summary of the items to purchase. The user can then pay quickly using any payment mechanism such as those described herein by way of example. This simplifies the process such that the user does not need to hand over their credit card or pay cash. Indeed, this approach eliminates the need of a human to interact with the user following the taking of the order. The NFC tag would then be reconfigured for the next person. Data can flow either direction between the NFC tag (and the merchant system) and the user device.

Examples within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. Various modifications and changes may be made to the principles described herein without following the example examples and applications illustrated and described herein, and without departing from the spirit and scope of the disclosure. Claim language reciting "at least one of" a set indicates that one member of the set or multiple members of the set satisfy the claim. Notably, any feature described in any example or example can be combined with any other feature of any example of example. For example, any concept disclosed herein or in a parent application can be combined with a browser API functionality or API user interface. In another example, any feature discussed with respect to a search engine example can be applicable and interchangeable with a social media example, or a product purchase management engine example.

We claim:

1. A method comprising:
receiving, at a social media software module operating on a user device, input from a first user associated with a payment from the first user to a second user, wherein the social media software module provides a social media interaction which enables communication between the first user and the second user;

receiving, in connection with use of the social media software module for the social media interaction, a payment authorization from the first user for the payment to the second user; and initiating, from the social media software module and based on the payment authorization, a blockchain-based cryptocurrency payment from the first user to the second user, wherein the social media software module transmits a payment request to a second software module operating on the user device, the second software module having an application programming interface that defines a protocol for communicating data between the social media software module and the second software module for managing the payment from the first user to the second user.

2. The method of claim 1, wherein the second user comprises one of a person or an entity.

3. The method of claim 1, wherein the social media software module is associated with one of a messaging application or an on-line social media site.

4. The method of claim 3, wherein the messaging application provides a message with which the first user can interact to provide the payment authorization.

5. The method of claim 1, wherein the payment authorization is provided via a biometric reading associated with the first user.

6. The method of claim 1, wherein the first user provides the payment authorization via a text in the social media software module.

7. The method of claim 6, wherein the text identifies both the second user and an amount associated with the blockchain-based cryptocurrency payment.

8. The method of claim 1, wherein the blockchain-based cryptocurrency payment from the first user to the second user comprises initiating a payment from a first user wallet associated with the first user to a second user wallet associated with the second user.

* * * * *